(12) United States Patent
Li

(10) Patent No.: US 10,389,276 B2
(45) Date of Patent: Aug. 20, 2019

(54) INTEGRAL PRELOAD MECHANISM FOR PIEZOELECTRIC ACTUATOR

(71) Applicant: NEWPORT CORPORATION, Irvine, CA (US)

(72) Inventor: Hongqi Li, Redwood City, CA (US)

(73) Assignee: NEWPORT CORPORATION, Irvine, CA (US)

(*) Notice: Subject to any disclaimer, the term of this patent is extended or adjusted under 35 U.S.C. 154(b) by 116 days.

(21) Appl. No.: 15/209,639

(22) Filed: Jul. 13, 2016

(65) Prior Publication Data

US 2016/0322919 A1 Nov. 3, 2016

Related U.S. Application Data

(62) Division of application No. 14/253,087, filed on Apr. 15, 2014, now Pat. No. 9,425,711.

(51) Int. Cl.
*H01L 41/22* (2013.01)
*H02N 2/00* (2006.01)
(Continued)

(52) U.S. Cl.
CPC ............. *H02N 2/006* (2013.01); *B23H 1/00* (2013.01); *B23H 9/00* (2013.01); *B23K 26/38* (2013.01);
(Continued)

(58) Field of Classification Search
CPC .......... H02N 2/00; H02N 2/142; H02N 2/145; H02N 2/101; H02N 2/006; H02N 2/10; H01L 41/00; H01L 41/08; H01L 41/22; H01L 41/23; H01L 41/25; H01L 41/12; G03B 2205/0061; G02B 7/001; G02B 7/002; G02B 7/003; G02B 7/04; G02B 7/005; Y10T 29/42; Y10T 29/49121;
(Continued)

(56) References Cited

U.S. PATENT DOCUMENTS 3,320,580 A 5/1967 Sykes
3,902,085 A 8/1975 Bizzigotti
(Continued)

FOREIGN PATENT DOCUMENTS

CN 101470236 7/2009
CN 102565979 7/2012
(Continued)

OTHER PUBLICATIONS

Agrait, Vertical Inertial Piezoelectric translation device for a scanning tunneling microscope, Rev. Sci. Instrum., Jan. 1992; 63(1):263-264.
(Continued)

*Primary Examiner* — Thiem D Phan
(74) *Attorney, Agent, or Firm* — Schmeiser, Olsen & Watts LLP

(57) ABSTRACT

A piezoelectric actuator that may include a monolithic frame having an integral bias band that provides a resilient restoring force between a first contact surface and a second contact surface of the actuator that may be used to rotate an adjustment shaft. In some cases, a preload mechanism may also be included with the frame. Such piezoelectric actuators may be used for adjustable optical mounting devices such as optical mounting devices.

6 Claims, 28 Drawing Sheets

(51) Int. Cl.
  *G02B 7/00* (2006.01)
  *B23H 1/00* (2006.01)
  *B23K 26/38* (2014.01)
  *B24C 1/04* (2006.01)
  *H02N 2/10* (2006.01)
  *B23H 9/00* (2006.01)
  *B23H 7/02* (2006.01)

(52) U.S. Cl.
  CPC .............. *B24C 1/045* (2013.01); *G02B 7/005* (2013.01); *H02N 2/10* (2013.01); *H02N 2/101* (2013.01); *B23H 7/02* (2013.01); *Y10T 29/42* (2015.01)

(58) Field of Classification Search
  CPC ...... Y10T 29/49826; B23H 1/00; B23H 7/02; B24C 1/045; B23K 26/38; H01H 2215/052; E05B 47/0011; F16F 15/005; F16F 2224/0283; F04B 43/095
  USPC .......... 310/311, 367, 316.01, 317, 318, 328; 29/25.35, 407.01, 428, 557, 602.1
  See application file for complete search history.

(56) References Cited

U.S. PATENT DOCUMENTS

| | | | |
|---|---|---|---|
| 4,019,073 | A | 4/1977 | Vishnevsky et al. |
| 4,453,103 | A | 6/1984 | Vishnevsky et al. |
| 4,525,852 | A | 6/1985 | Rosenberg |
| 4,594,584 | A | 6/1986 | Pfeiffer et al. |
| 4,607,166 | A | 8/1986 | Tamaki |
| 4,613,782 | A | 9/1986 | Mori et al. |
| 4,622,483 | A | 11/1986 | Staufenberg, Jr. et al. |
| 4,714,855 | A | 2/1987 | Fujimoto |
| 4,647,808 | A | 3/1987 | Shibuya |
| 4,727,278 | A | 2/1988 | Staufenberg, Jr. et al. |
| 4,775,815 | A | 10/1988 | Heinz |
| 4,831,306 | A | 5/1989 | Staufenberg, Jr. et al. |
| 4,857,793 | A | 8/1989 | Okuno |
| 4,918,351 | A | 4/1990 | Kawai |
| 4,933,590 | A | 6/1990 | Inoue et al. |
| 4,975,615 | A | 12/1990 | Katahara |
| 5,017,820 | A | 5/1991 | Culp |
| 5,027,028 | A | 6/1991 | Skipper |
| 5,034,647 | A | 7/1991 | Ohtsuka |
| 5,059,850 | A | 10/1991 | Yoshimura et al. |
| 5,079,471 | A | 1/1992 | Nygren, Jr. |
| 5,140,470 | A | 8/1992 | Luecke |
| 5,394,049 | A | 2/1995 | Luecke et al. |
| 5,410,206 | A * | 4/1995 | Luecke .................. H02N 2/101 310/317 |
| 5,543,670 | A | 8/1996 | Luecke |
| 5,946,164 | A * | 8/1999 | Tracy .................. G11B 5/4833 360/244.5 |
| 6,040,643 | A | 3/2000 | Bruns |
| 6,232,700 | B1 | 5/2001 | Kosaka et al. |
| 6,548,938 | B2 | 4/2003 | Moler et al. |
| 6,759,790 | B1 * | 7/2004 | Bugel .................. F16C 11/12 310/328 |
| 6,911,763 | B2 | 6/2005 | Ziegler et al. |
| 7,119,478 | B1 | 10/2006 | Mentesana |
| 7,323,804 | B2 | 1/2008 | Williams et al. |
| 7,423,364 | B2 * | 9/2008 | Williams .............. H02N 2/043 310/323.01 |
| 8,482,868 | B2 | 7/2013 | Thomas et al. |
| 9,163,334 | B1 * | 10/2015 | Fossey .................. D01D 5/34 |
| 2003/0059194 | A1 | 3/2003 | Trzecieski |
| 2004/0017620 | A1 | 1/2004 | Kaneko et al. |
| 2004/0124744 | A1 | 7/2004 | Pease et al. |
| 2004/0124747 | A1 | 7/2004 | Bugel et al. |
| 2004/0140736 | A1 | 7/2004 | Richter |
| 2005/0006982 | A1 | 1/2005 | Williams et al. |
| 2006/0169837 | A1 | 8/2006 | Bird et al. |
| 2007/0195435 | A1 | 8/2007 | Theriault et al. |
| 2008/0198485 | A1 | 8/2008 | Kosmowski |
| 2008/0285002 | A1 | 11/2008 | Rief |
| 2008/0307786 | A1 * | 12/2008 | Hafez .................. F03G 7/065 60/527 |
| 2009/0127974 | A1 | 5/2009 | Piotr et al. |
| 2010/0053783 | A1 | 3/2010 | Murasato |
| 2010/0118421 | A1 | 5/2010 | Woodard et al. |
| 2010/0290138 | A1 | 11/2010 | Thomas et al. |
| 2011/0286122 | A1 | 11/2011 | Halpin |
| 2012/0013999 | A1 | 1/2012 | Thomas et al. |
| 2013/0271855 | A1 | 10/2013 | Thomas et al. |

FOREIGN PATENT DOCUMENTS

| | | |
|---|---|---|
| EP | 1220012 | 7/2002 |
| EP | 2676361 | 12/2013 |
| JP | H03-12143 | 5/1991 |
| JP | H04-219709 | 8/1992 |
| JP | H04-324408 | 11/1992 |
| JP | 06-141561 | 5/1994 |
| JP | H07-13061 | 1/1995 |
| JP | 08-251950 | 9/1996 |
| JP | H09-106944 | 4/1997 |
| JP | H11-344740 | 12/1999 |
| JP | 2002-148276 | 5/2002 |
| JP | 2003-241838 | 8/2003 |
| JP | 2004-205410 | 7/2004 |
| JP | 2005-352394 | 12/2005 |
| JP | 2006-522298 | 9/2006 |
| JP | 2006-345630 | 12/2006 |
| JP | 2008-116901 | 5/2008 |
| JP | 2008-135810 | 6/2008 |
| JP | 2008-215934 | 9/2008 |
| JP | 2009-050142 | 3/2009 |
| JP | 2009-518821 | 5/2009 |
| JP | 2009-268240 | 11/2009 |
| JP | 2010-96863 | 4/2010 |
| JP | 2013-174824 | 9/2013 |
| WO | WO 08/087469 | 7/2008 |
| WO | WO 12/009379 | 1/2012 |
| WO | WO 13/020873 | 2/2013 |
| WO | WO 15/160601 | 10/2015 |

OTHER PUBLICATIONS

Definition of Magnetostriction, printed from the internet on Oct. 9, 2006 located at: http://en.wikipedia.org/wiki/Magnetostriction.

Definition of Piezoelectricity, printed from the internet on Oct. 9, 2006. located at: http://en.wikipedia.org/wiki/Piezoelectricity.

Howald et al, Piezoelectric Inertial Stepping Motor with Spherical Rotor, Rev. Sci. Instrum., 63(8):3909-3912 1992.

Skipper, Piezoelectric Traction Motor Delivers High Torque, High Power at Low Speed, PCIM Jun. 1992 36-40.

International Search Report and Written Opinion dated Aug. 20, 2008 in International Application No. PCT/IB2007/00602 filed on Jan. 18, 2007 and published as WO 08/087469 on Jul. 24, 2008.

International Preliminary Report on Patentability dated Jul. 30, 2009 in International Application No. PCT/IB2007/00602 filed on Jan. 18, 2007 and published as WO 08/087469 on Jul. 24, 2008.

International Preliminary Report on Patentability dated Jan. 15, 2013 in International Application No. PCT/US2011/043754 filed on Jun. 12, 2011 and published as WO 12/009379 on Jan. 19, 2012.

International Search Report and Written Opinion dated Feb. 9, 2012 in International Application No. PCT/US2011/043754 filed on Jun. 12, 2011 and published as WO 12/009379 on Jan. 19, 2012.

International Search Report and Written Opinion dated Jul. 14, 2015 in International Application No. PCT/US2015/025006 filed on Apr. 8, 2015 and published as WO 2015/160601 on Oct. 22, 2015.

International Search Report and Written Opinion dated Apr. 14, 2016 in International Application No. PCT/US2016/015219 filed on Jan. 27, 2016.

International Preliminary Report on Patentability dated Oct. 18, 2016 in International Application No. PCT/US2015/025006 filed on Apr. 8, 2015 and published as WO 2015/160601 on Oct. 22, 2015.

(56) References Cited

OTHER PUBLICATIONS

Extended European Search Report dated Nov. 9, 2017 in European Patent Application No. EP15780497.2, filed: Apr. 8, 2015 base on International Application No. PCT/US2015/025006 filed on: Apr. 8, 2015 and published as: WO/2015/160601 on Oct. 22, 2015.

* cited by examiner

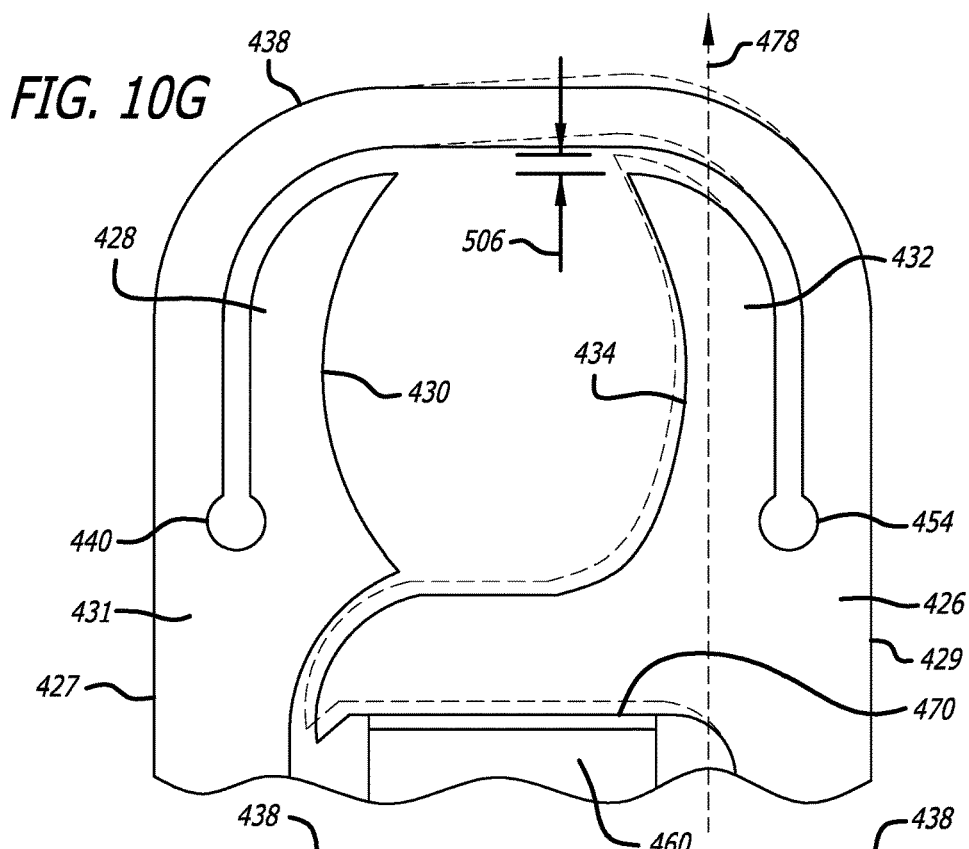
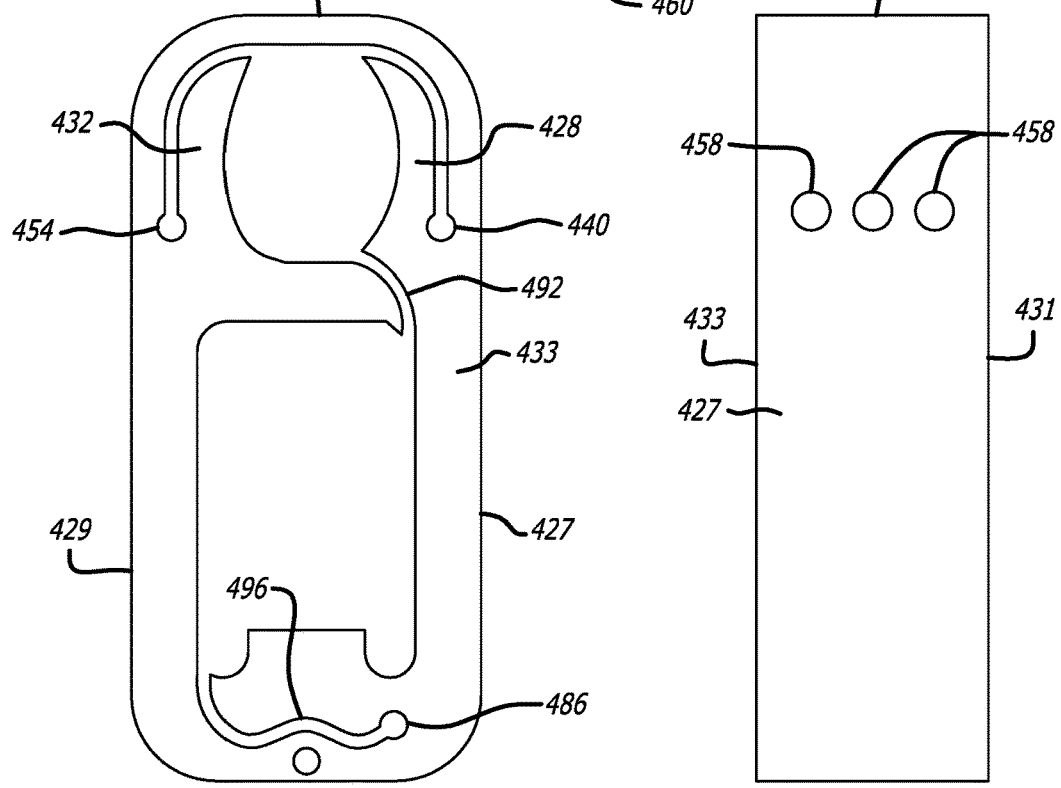
FIG. 10G
FIG. 10H
FIG. 10I

INTEGRAL PRELOAD MECHANISM FOR PIEZOELECTRIC ACTUATOR

RELATED PATENT APPLICATION

This patent application is a divisional of U.S. patent application Ser. No. 14/253,087, filed Apr. 15, 2014, naming Hongqi Li as inventor, entitled INTEGRAL PRELOAD MECHANISM FOR PIEZOELECTRIC ACTUATOR, the entirety of which is incorporated by reference herein, including all text and drawings.

BACKGROUND

Optical devices or elements such as lenses, mirrors, wave plates, filters, volume Bragg gratings, prisms and the like are often mounted to an optical system, and particularly an experimental optical system, with an adjustable optical mount. An example of an optical system may include an optical bench or base having multiple optical devices and components mounted to the base with an orientation so as to provide an optical path which directs a light beam from one optical device to the next. Beams from lasers or other light sources are generally used for such applications. For such arrangements, an adjustable optical mount provides a mechanism to securely fasten an optical element to the optical bench or other component of the optical system and still allow for some adjustment of the orientation of the optical element.

Existing adjustable optical mounts may include embodiments having a first plate configured to have an optical element secured thereto. A second plate is disposed adjacent the first plate and includes three contact points extending from the second plate to the first plate. One or more of the contact points may be disposed on the end of an adjustment shaft, such as an adjustment screw, which is threaded to the second plate. The contact points may also be disposed in a detent on the first plate which allows rotation of the contact point relative to the first plate, but prevents the contact point from sliding or being transversely displaced along the first plate. One or more retractive members, such as springs or magnets, are fastened between the first and second plates so as to force the plates to be drawn together with the restorative force of the spring, springs, magnet or magnets. The attractive force generated by the retractive members between the plates is resisted by the three contact points against the respective detents of the first plate. In such an arrangement, rotation of an adjustment screw or shaft moves the adjustment screw relative to the second plate in order to adjust the separation between the plates at the adjustment screw position and thus the relative orientation of the first plate to the second plate.

In some cases, a piezoelectric type actuator may be used to rotate the adjustment screws. A reciprocating motion of abutting jaw elements against the threaded shaft of the adjustable optical mount in a first direction may be converted to a simple rotary motion of the threaded shaft when the reciprocating motion is slow enough such that the coefficient of friction between the threaded shaft and the abutting jaws transmits the motion of the jaws to the threaded shaft. The rotational motion of the threaded shaft results in a translational motion of the threaded shaft and respective movement of the first plate and any element such as an optical element secured thereto. The reciprocating motion of the abutting jaw elements against the threaded shaft in a second direction may be relatively fast such that the inertia of the threaded shaft prevents it from engaging with the reciprocating motion of the abutting jaw elements thereby resulting in the preservation of the position of the threaded shaft. In some instances, the restoring force which each jaw applies to the threaded shaft may be provided by a separate preload mechanism such as a clamp spring which may be coupled to each jaw element.

Variations in the restoring force between the threaded shaft and abutting jaws as applied by the clamp spring can result in variations in the static and dynamic torque measured by rotating the threaded shaft with a torque measurement device. This may negatively affect the performance of the mount. Variations in the restoring force applied to the abutting jaws by the clamp spring may be caused by the deformation of the clamp spring during assembly, variations in manufacturing, processing or materials of the clamp spring or the like. What has been needed is a preload mechanism which supplies a consistent restoring force between contact surfaces of the abutting jaws and the threaded shaft.

SUMMARY

Some embodiments of a piezoelectric actuator include an actuator frame with a monolithic configuration with all of the elements of the actuator frame being formed from a continuous uninterrupted piece of material. The actuator frame includes a first support element having a first contact surface, and a second support element having a second contact surface. The second contact surface is disposed in a spaced and substantially opposite relation to the first contact surface. The actuator frame may also include an optional hinge section of reduced material cross section which is disposed and coupled between the first support element and the second support element. The hinge section is configured to allow for the relative reciprocating parallel displacement between the first contact surface and the second contact surface by the deformation of the actuator frame material in the hinge section. The actuator frame also includes a bias band which is disposed between the first support element and the second support element. The bias band is configured to provide a resilient restoring force that resists the perpendicular displacement of the first contact surface away from the second contact surface. The actuator frame may also include a piezoelectric element cavity which is disposed between a first mount surface and a second mount surface. The piezoelectric actuator also includes a piezoelectric element which is disposed within the piezoelectric element cavity. The piezoelectric element has a first end which is secured to the first mount surface and a second end which is secured to the second mount surface. The piezoelectric element is configured to expand and contract in response to an electrical driver signal which is sent to the piezoelectric actuator such that an expansion or contraction of the piezoelectric element results in the respective substantially parallel reciprocating displacement between the first contact surface and the second contact surface.

Some embodiments of a piezoelectric actuator include an actuator frame with a monolithic configuration with all of the elements of the actuator frame being formed from a continuous uninterrupted piece of material. The actuator frame includes a first support element having a first contact surface, and a second support element having a second contact surface. The second contact surface is disposed in a spaced and substantially opposite relation to the first contact surface. The actuator frame may also include an optional hinge section of reduced material cross section which is disposed and coupled between the first support element and the second support element. The hinge section is configured to allow for the relative reciprocating parallel displacement between the first contact surface and the second contact surface by the deformation of the actuator frame material in the hinge section. The actuator frame also includes a bias band which is configured to provide a restoring force that resists the perpendicular displacement of the first contact surface away from the second contact surface or vice versa. The bias band extends distally from a distal portion of the first support element and extends around a space disposed between the first contact surface and the second contact surface. The bias band also extends around a distal portion of the second support element around an outer surface of the second support element which is disposed substantially opposite the second contact surface. The bias band also terminates at the second support element at a band hinge section which is located on a back side of the second support element. The actuator frame may also include a piezoelectric element cavity which is disposed between a first mount surface and a second mount surface. The piezoelectric actuator also includes a piezoelectric element which is disposed within the piezoelectric element cavity. The piezoelectric element has a first end which is secured to the first mount surface and a second end which is secured to the second mount surface. The piezoelectric element is configured to expand and contract in response to an electrical driver signal which is sent to the piezoelectric actuator such that an expansion or contraction of the piezoelectric element results in the respective substantially parallel reciprocating displacement between the first contact surface and the second contact surface.

Some embodiments of a piezoelectric actuator include an actuator frame with a monolithic configuration with all of the elements of the actuator frame being formed from a continuous uninterrupted piece of material. The actuator frame includes a first support element having a first contact surface, and a second support element having a second contact surface. The second contact surface is disposed in a spaced and substantially opposite relation to the first contact surface. The actuator frame may also include an optional hinge section of reduced material cross section which is disposed and coupled between the first support element and the second support element. The hinge section is configured to allow for the relative reciprocating parallel displacement between the first contact surface and the second contact surface by the deformation of the actuator frame material in the hinge section. The actuator frame also includes a bias band which is configured to provide a restoring force that resists the perpendicular displacement of the first contact surface away from the second contact surface or vice versa. The bias band extends distally from the first support element around a distal portion of the first support element and along an outer surface of the first support element, the outer surface being substantially opposite the first contact surface. The bias band also extends around a space which is disposed between the first contact surface and the second contact surface and a distal portion of the second support element along an outer surface of the second support element which is disposed substantially opposite the second contact surface. The bias band terminates at a band hinge section which is located on a back side of the second support element. The actuator frame may also include a piezoelectric element cavity which is disposed between a first mount surface and a second mount surface. The piezoelectric actuator also includes a piezoelectric element which is disposed within the piezoelectric element cavity. The piezoelectric element has a first end which is secured to the first mount surface and a second end which is secured to the second mount surface. The piezoelectric element is configured to expand and contract in response to an electrical driver signal which is sent to the piezoelectric actuator such that an expansion or contraction of the piezoelectric element results in the respective substantially parallel reciprocating displacement between the first contact surface and the second contact surface.

Some embodiments of an adjustable optical mount include an optical mount device which is configured to receive an optical element and secure the optical element thereto. The adjustable optical mount also includes a base which is configured to be securely mounted to a stable surface and which is coupled to the optical mount device by an adjustable optical mount mechanism. The adjustable optical mount mechanism is configured to allow relative and adjustable displacement between the optical mount device and the base along at least one degree of freedom. The adjustable optical mount also includes a piezoelectric actuator assembly which is operatively coupled to the adjustable optical mount mechanism. The piezoelectric actuator assembly includes an actuator frame which has a monolithic configuration with all of the elements of the actuator frame being cut from a single contiguous piece of material. The piezoelectric actuator assembly also includes a first support element having a first contact surface and a second support element having a second contact surface. The second contact surface is disposed in a spaced and substantially opposed relation relative to the first contact surface. The actuator frame may also include an optional hinge section of reduced material cross section which is disposed between the first support element and the second support element. The hinge section is configured to allow for the relative displacement between the first contact surface and the second contact surface by the elastic deformation of the actuator frame material in the hinge section. The actuator frame also includes a bias band which is coupled between the first support element and the second support element and which is configured to provide a resilient restoring force for a relative displacement between the first contact surface and the second contact surface. The actuator frame may also include a piezoelectric element cavity disposed between a first mount surface and a second mount surface. The piezoelectric actuator assembly may also include a piezoelectric element which is disposed within the piezoelectric element cavity, with a first end of the piezoelectric element secured to the first mount surface and a second end of the piezoelectric element secured to the second mount surface. The piezoelectric element is also configured to expand and contract in response to an electrical driver signal which is transmitted to the piezoelectric element. The piezoelectric actuator assembly is configured such that an expansion or contraction of the piezoelectric element results in the respective substantially parallel displacement between the first contact surface and the second contact surface.

Certain embodiments are described further in the following description, examples, claims and drawings. These features of embodiments will become more apparent from the following detailed description when taken in conjunction with the accompanying exemplary drawings.

BRIEF DESCRIPTION OF THE DRAWINGS

The drawings illustrate embodiments of the technology and are not limiting. For clarity and ease of illustration, the drawings may not be made to scale and, in some instances, various aspects may be shown exaggerated or enlarged to facilitate an understanding of particular embodiments.

FIG. 10G is an elevation view of the piezoelectric actuator and the actuator frame both of FIG. 10F, showing the piezoelectric actuator in an elongated state and the actuator frame in a deformed state.

FIG. 10H is an elevation view of the actuator frame of FIG. 10A.

FIG. 10I is an elevation view of the actuator frame of FIG. 10A.

DETAILED DESCRIPTION

Embodiments discussed herein are directed toward compact motorized driving mechanisms including piezoelectric actuators which may provide translational and/or rotational adjustments of optical devices and/or optical elements secured to an optical mount in some cases. Such an exemplary optical mount may be configured to have little or no angular range limitations, an availability of a central aperture through the optical mount, positional stability in case of a loss of power to the optical mount, a good sensitivity and low cost relative to other motorized adjustable optical mounts for optical adjustment. Examples of optical mounts which may be driven by such piezoelectric actuators may include rotary optical mounts such as rotation stages, optical mounts which are pivoted or jointed and configured for angular tilt such as a kinematic optical mounts, translation mounts which may include translation stages and the like. Piezoelectric actuator embodiments may be suitably disposed within a given optical mount and may be configured such that they provide for translational and/or rotational motion of the optical devices or components which are secured to the mount. Exemplary embodiments of piezoelectric actuators are discussed in U.S. Pat. No. 5,410,206, filed Apr. 6, 1993, by Luecke et al., titled Piezoelectric Actuator for Optical Alignment Screws, which is incorporated by reference herein in its entirety. Any suitable feature, dimension or material of the embodiments discussed in the incorporated U.S. Pat. No. 5,410,206 may be used in conjunction with any of the embodiments discussed herein.

Figure 1:
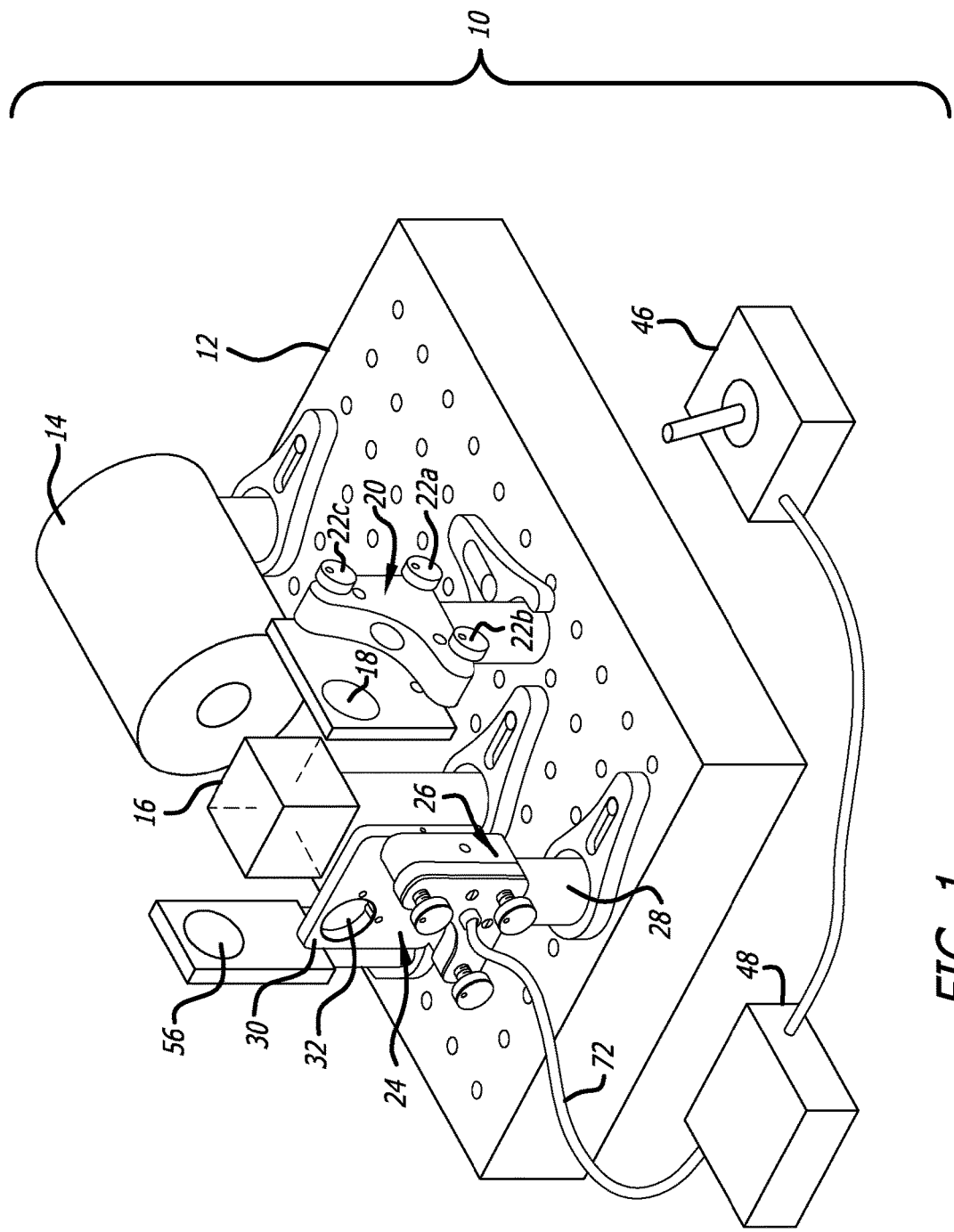
FIG. 1 is a perspective view of an optical assembly that incorporates an adjustable optical mount.
Figure 2:
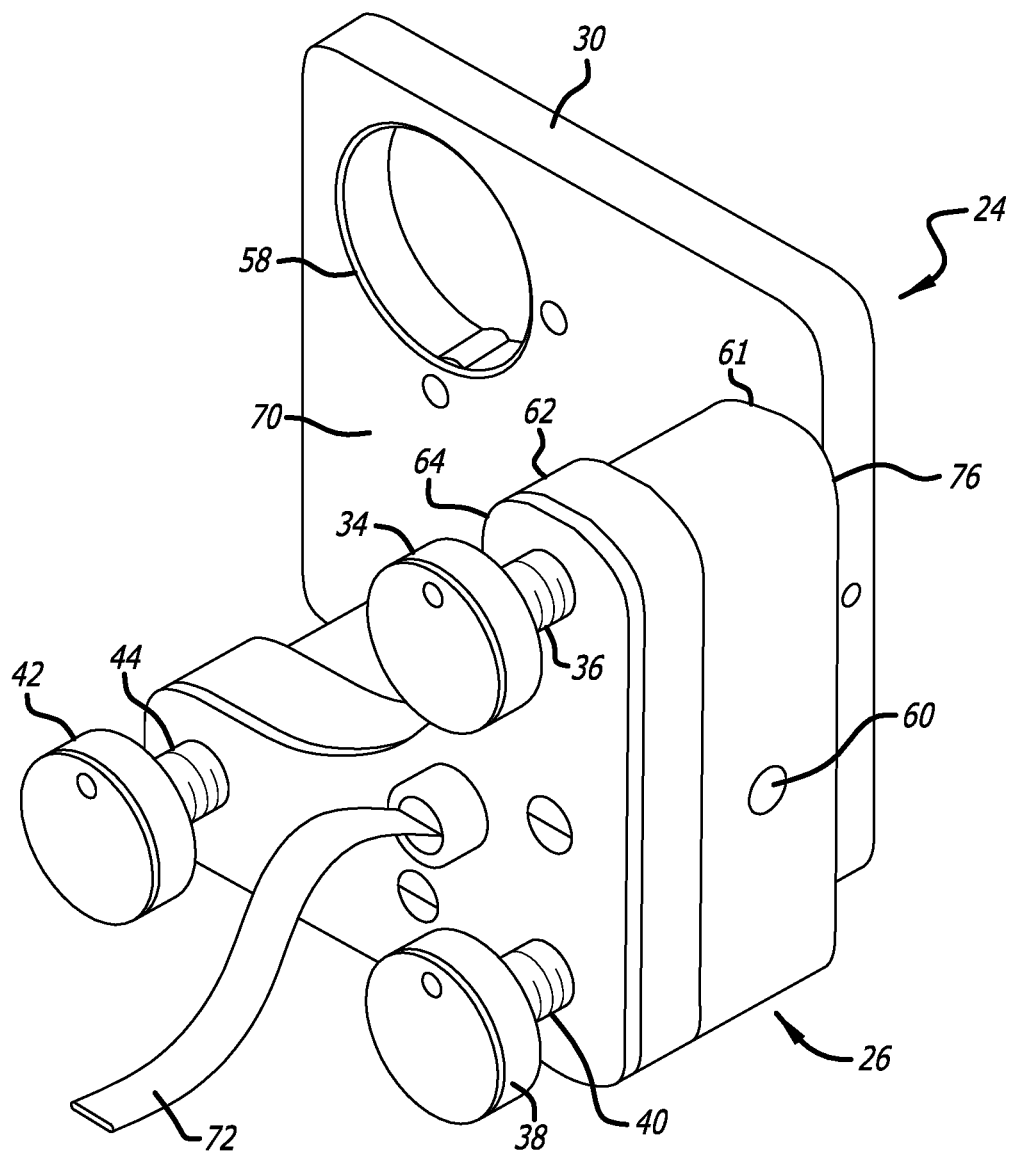
FIG. 2 is a perspective view of the adjustable optical mount of FIG. 1 showing an actuator cover plate and actuator retention housing.

The optical assembly 10 shown in FIG. 1 is an embodiment of a Michelson inferometer system which is being shown as an example of a system that utilizes piezoelectric actuators. The optical assembly 10 may include an optical bench 12 that provides a stable platform for other optical elements which may be secured to the optical bench 12. The optical assembly 10 may also include radiation source 14 in the form of a laser or the like which may be directed toward a beam splitting cube 16. The optical assembly 10 may also include a first mirror 18 which is secured to a manual optical mount 20. The position of the first mirror 18 may be manually adjusted by a first manual knob 22a, a second manual knob 22b, or a third manual knob 22c all of which are rotationally secured to the manual optical mount 20.

The optical assembly 10 may also include an adjustable optical mount 24 which is configured to receive an optical element and to secure that optical element to the adjustable optical mount 24. An embodiment of an adjustable optical mount 24 is shown in FIGS. 1-5. The adjustable optical mount 24 may include an adjustable mount mechanism 26 which is secured to a base 28 of the adjustable optical mount 24 which is in turn secured to the optical bench 12. The adjustable optical mount 24 may also include an optical mount device 30 which is rotationally and translationally coupled to the adjustable mount mechanism 26 which is configured to allow for the relative and adjustable displacement between the optical mount device 30 and the base 28 along at least one degree of freedom.

Figure 3:
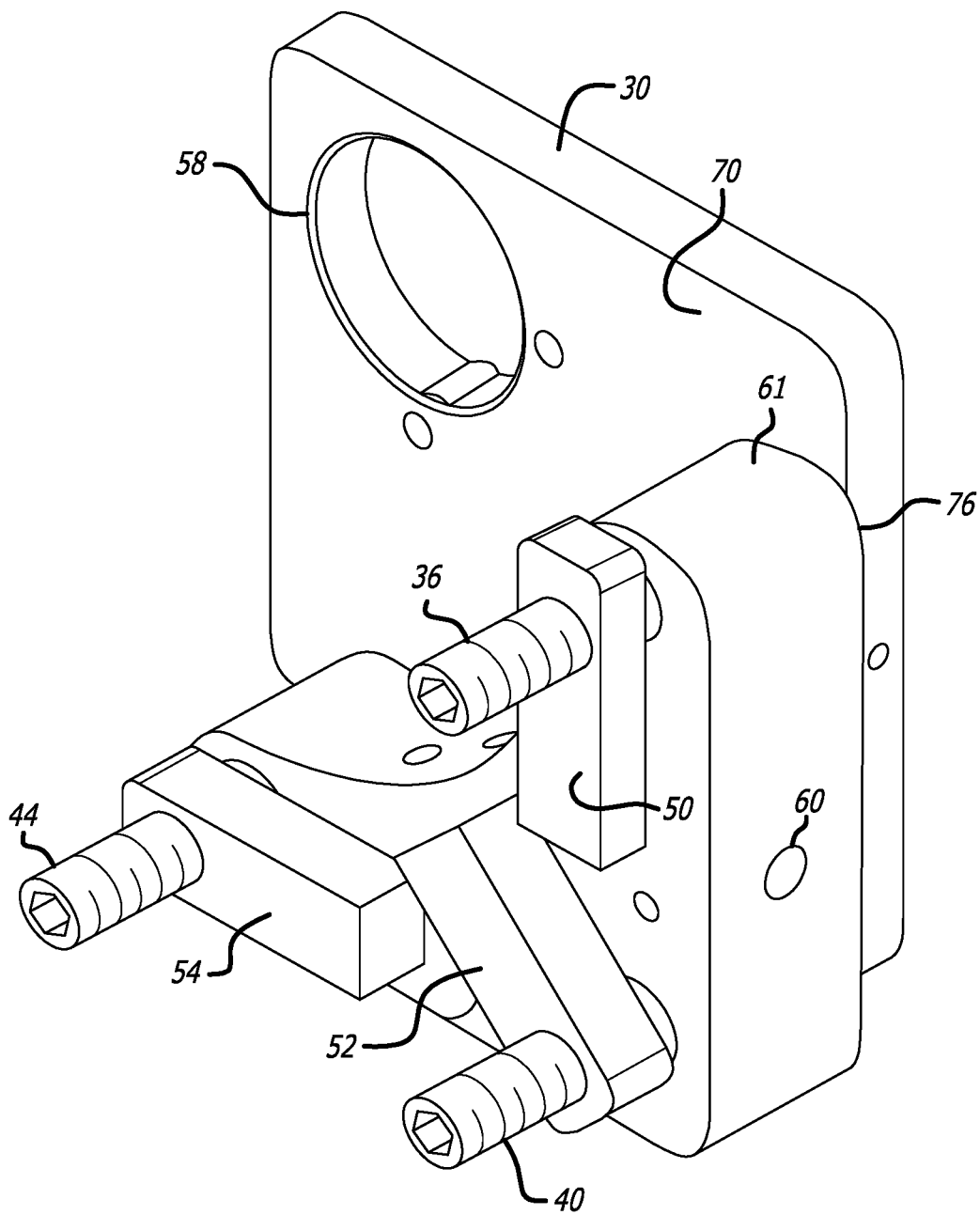
FIG. 3 is a perspective view of the adjustable optical mount of FIG. 1 with the actuator cover plate and the actuator retention housing hidden showing multiple piezoelectric actuators which are disposed within the actuator retention housing.

A second mirror 32 may be secured to the optical mount device 30. The adjustable mount mechanism 26 may include a first drive knob 34 which is secured to a first threaded shaft 36, a second drive knob 38 which is secured to a second threaded shaft 40, and a third drive knob 42 which is secured to a third threaded shaft 44 as shown in FIG. 3. The position of the second mirror 32 may be adjusted by using joystick control device 46 which is operatively coupled to an electronic controller 48 which is in turn operatively coupled to a first piezoelectric actuator 50, a second piezoelectric actuator 52, and a third piezoelectric actuator 54 (see FIG. 3) disposed within the adjustable mount mechanism 26. When they are activated by the electronic controller 48, the first piezoelectric actuator 50 drives the first threaded shaft 36, the second piezoelectric actuator 52 drives the second threaded shaft 40, and the third piezoelectric actuator 54 drives the third threaded shaft 44. Any one or combination of the three piezoelectric actuators can be activated by the electronic controller 48 in order to drive any respective combination of threaded shafts in order to provide for the translational and/or rotational motion of the second mirror 32 disposed within the optical mount device 30.

An incident beam which is generated by the laser 14 may be split at the beam splitting cube 16 such that a first beam portion of the incident beam is sent to the first mirror 18 and second beam portion of the incident beam may be sent to the second mirror 32. The first beam portion of the incident beam and the second beam portion of the incident beam may be reflected from the first mirror 18 and the second mirror 32 respectively, and then the first beam portion and second beam portion may be recombined in the beam splitting cube 16 and then directed to a viewing screen 56. In this case the direction of the first beam portion of the incident beam may be adjusted by adjusting the first mirror 18 using the first manual knob 22a, the second manual knob 22b, and/or the third manual knob 22c. The direction of the second beam portion of the incident beam may be adjusted by using the joystick controller 46, which instructs or otherwise provides an information signal to the electronic controller 48 to activate any desired combination of movement or position of the first piezoelectric actuator 50, second piezoelectric actuator 52, or third piezoelectric actuator 54 which are disposed within the adjustable mount mechanism 26 and which are operatively coupled to the first threaded shaft 36, the second threaded shaft 40, and the third threaded shaft 44 respectively.

The optical mount device 30 incorporates a mounting area 58 which is configured to receive an optical element (such as second mirror 32) and to secure to that optical element. The mounting area 58 is configured to couple with a variety of lenses, filters, mirrors, or any other suitable optical elements. The adjustable mount mechanism 26 may include mounting holes 60 for attachment to the base 28 which is in turn secured to the optical bench 12. The adjustable mount device may include a base plate 61. The adjustable mount mechanism 26 may include an actuator housing 62 and actuator housing cover 64 which are secured to the base plate 61. The actuator housing 62 may be secured to the actuator housing cover 64 with screws 66 or any other suitable fastener. The optical mount device 30 may be attached to the adjustable mount mechanism 26 by a spring 68 (not shown), the spring 68 allowing for the rotation and translation of the optical mount device 30 with respect to the adjustable mount mechanism 26 and the base 28. The first threaded shaft 36, second threaded shaft 40, and third threaded shaft 44 may contact the optical mount device 30 in shallow receptacles (not shown) located on a front surface 70 of the optical mount device 30. A cable 72 which operatively couples the electronic controller 48 to the mount mechanism 26 may be fed through the actuator housing cover 64 through a cable aperture 74.

FIG. 3 depicts the adjustable optical mount 24 with the actuator housing cover 64 removed thereby revealing the first piezoelectric actuator 50, the second piezoelectric actuator 52, and the third piezoelectric actuator 54. The first threaded shaft 36 is disposed between opposed contact surfaces of the first piezoelectric actuator 50, the second threaded shaft 40 is disposed between opposed contact surfaces of the second piezoelectric actuator 52, and the third threaded shaft 44 is disposed between opposed contact surfaces of the third piezoelectric actuator 54. When a respective threaded shaft is driven in rotational movement by a respective piezoelectric actuator, the respective threaded shaft may rotate within the respective piezoelectric actuator and within a respective threaded bore of the base plate 61 and may then push on the front surface 70 of the optical mount device 30 thereby increasing a gap 76 between the optical mount device 30 and base plate 61 of the adjustable mount mechanism 26. Alternatively, when a respective threaded shaft is driven by a respective piezoelectric actuator in an opposite direction, the respective threaded shaft may rotate within the respective piezoelectric actuator and respective threaded bore of base plate 61 and may allow the spring to retract the front surface 70 of the optical mount device 30 thereby decreasing the gap 76 between the optical mount device 30 and the adjustable mount mechanism 26. It should be noted that any of the piezoelectric actuators 50, 52 or 54 may include any combination of the piezoelectric actuator embodiments discussed herein for the same purposes and controlled by the same methods and devices.

Figure 4A:
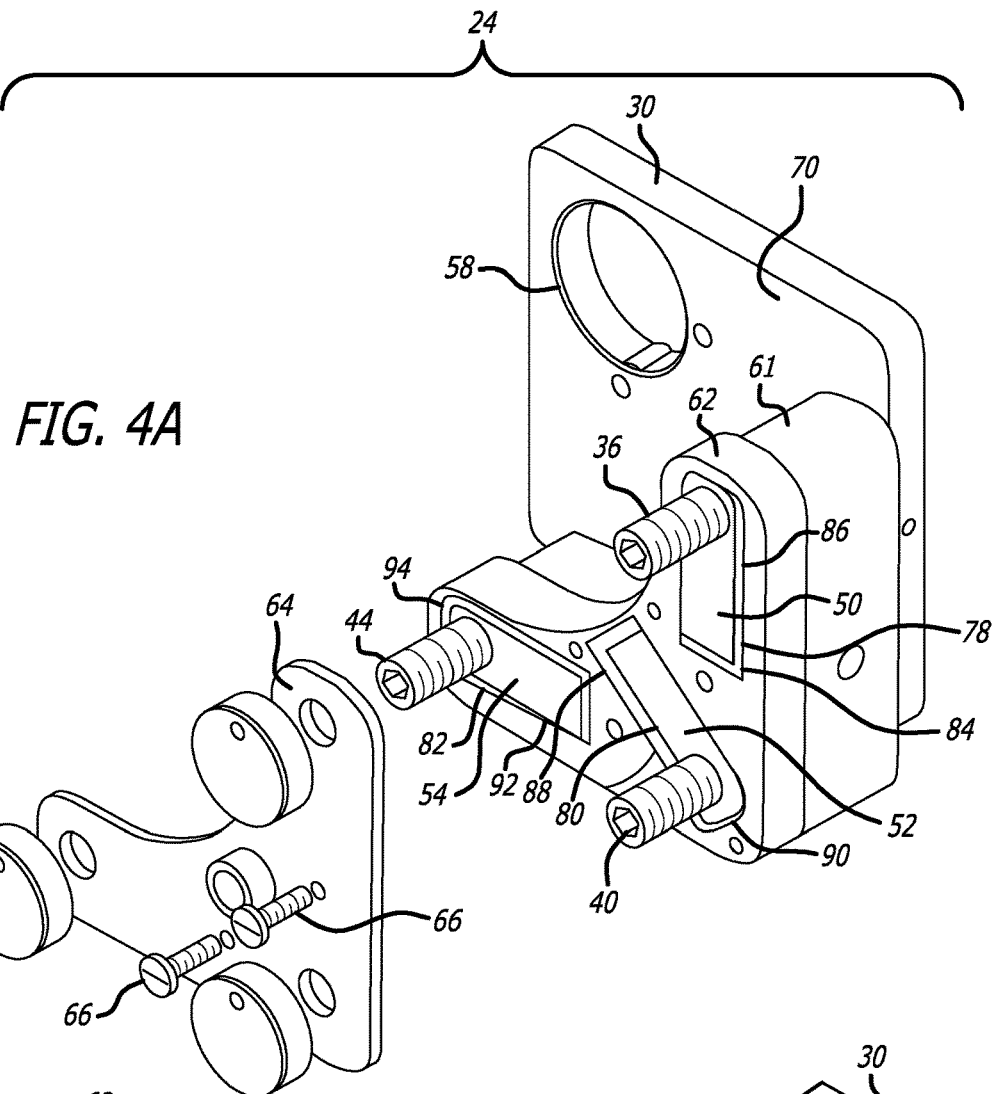
FIG. 4A is an exploded perspective view of the adjustable optical mount of FIG. 1 showing the actuator retention housing, the actuator cover plate, and multiple piezoelectric actuators disposed within the actuator retention housing.
Figure 4B:
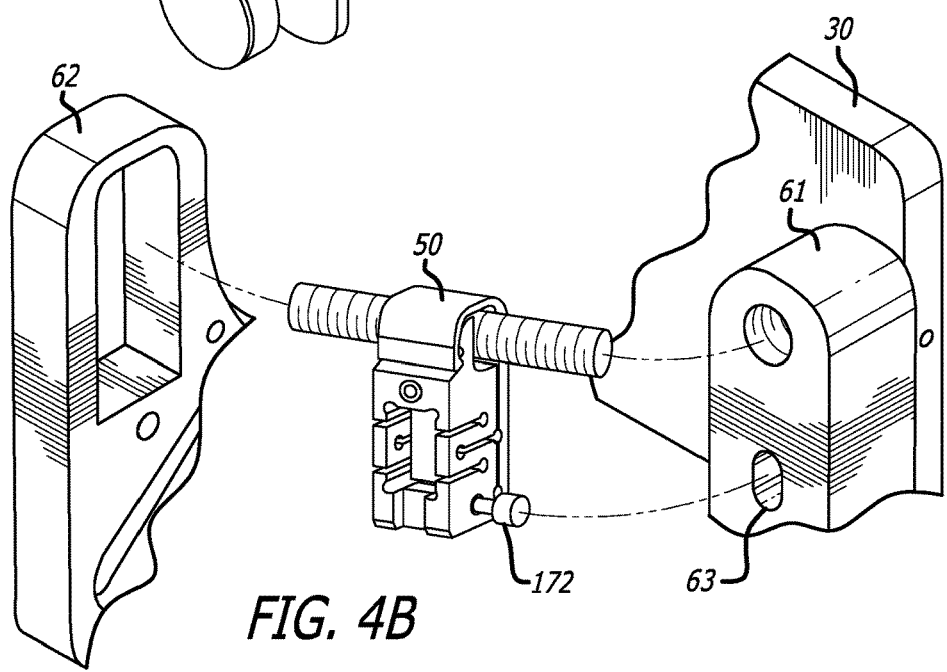
FIG. 4B is an exploded view showing the optical mount device, the base plate, the actuator housing, a piezoelectric actuator, and frame guide of the piezoelectric actuator which couples to a slot of the base plate.

FIG. 4A is an exploded view of the adjustable optical mount 24. The first piezoelectric actuator 50 is disposed within a first actuator aperture 78 of the actuator housing 62, the second piezoelectric actuator 52 is disposed within a second actuator aperture 80 of the actuator housing 62, and the third piezoelectric actuator 54 is disposed within a third actuator aperture 82 of the actuator housing 62. The first piezoelectric actuator 50 may have a snug fit in region 84 to prevent rotation of the first piezoelectric actuator 50 with respect to the actuator housing 62, and the first piezoelectric actuator 50 may have a loose fit in region 86 in order to allow for the deformation of the first piezoelectric actuator 50 as it is being driven by the electronic controller 48. Similarly, the second piezoelectric actuator 52 may have a snug fit in region 88 to prevent rotation of the second piezoelectric actuator 52 with respect to the actuator housing 62, and the second piezoelectric actuator 52 may have a loose fit in the region 90 in order to allow for the deformation of the second piezoelectric actuator 52 as it is being driven by the electronic controller 48. Similarly, the third piezoelectric actuator 54 may have a snug fit in region 92 to prevent rotation of the third piezoelectric actuator 54 with respect to the actuator housing 62, and the third piezoelectric actuator 54 may have a loose fit in the region 94 in order to allow for the deformation of the third piezoelectric actuator 54 as it is being driven by the electronic controller 48.

Figure 5:
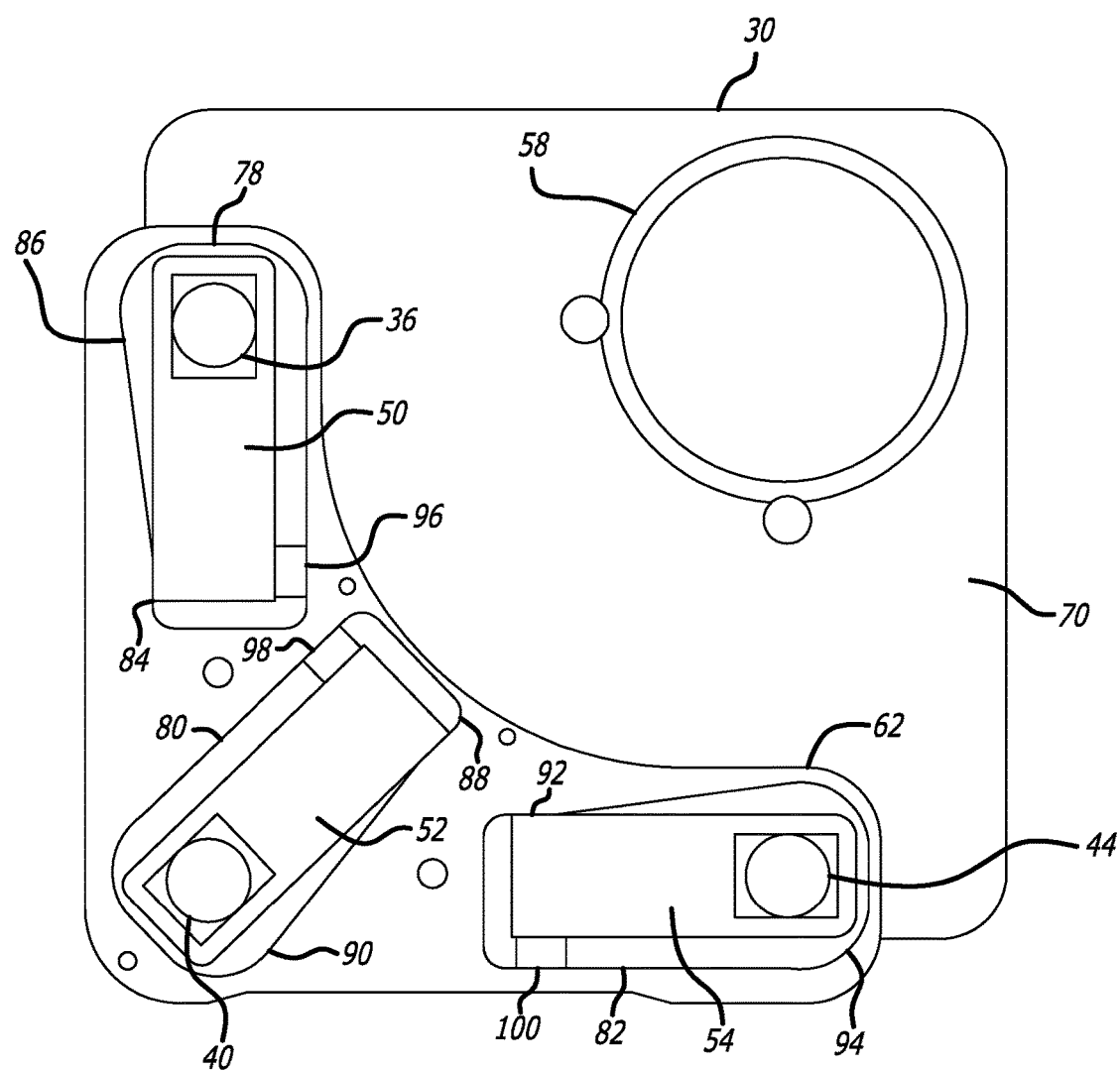
FIG. 5 is an elevation view of the adjustable optical mount of FIG. 1 with the actuator cover plate hidden showing multiple piezoelectric actuators which are disposed within the actuator retention housing.

FIG. 5 is an elevation view of the adjustable optical mount 24 with the actuator housing cover 64 removed showing a first resilient pad 96 of elastomeric material, a second resilient pad 98 of elastomeric material, and a third resilient pad 100 of elastomeric material. The first resilient pad 96 is located between the first actuator aperture 78 and the first piezoelectric actuator 50, with the first resilient pad 96 acting to prevent the first piezoelectric actuator 50 from rotating within the first actuator aperture 78 when it is activated. Similarly, the second resilient pad 98 is located between the second actuator aperture 80 and the second piezoelectric actuator 52, with the second resilient pad 98 acting to prevent the second piezoelectric actuator 52 from rotating within the second actuator aperture 80 when it is activated. Similarly, the third resilient pad 100 is located between the third actuator aperture 82 and the third piezoelectric actuator 54, with the third resilient pad 100 acting to prevent the third piezoelectric actuator 54 from rotating within the third actuator aperture 82 when it is activated.

The adjustable optical mount discussed above as well as other suitable optical embodiments may include any suitable piezoelectric actuator in order to drive the threaded shafts or other portions of the optical mount. One issue for such piezoelectric actuator embodiments is the importance of consistent force at the contact surfaces of the actuator against the threaded shafts of the adjustable optical mount.

Figure 6A:
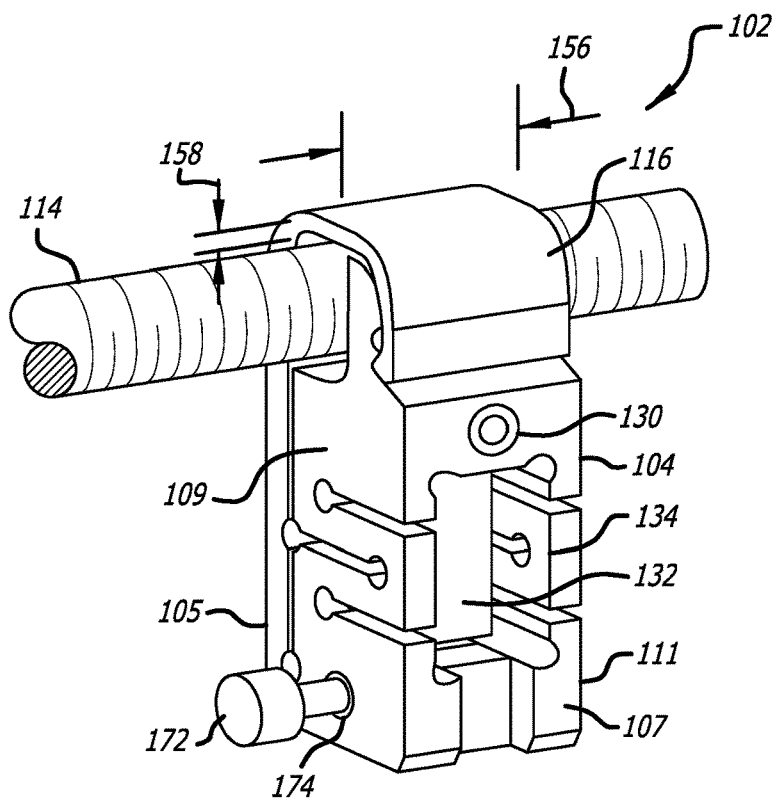
FIG. 6A is a perspective view that depicts a piezoelectric actuator assembly embodiment comprising an actuator frame, an actuator shaft, and a piezoelectric actuator.
Figure 6B:
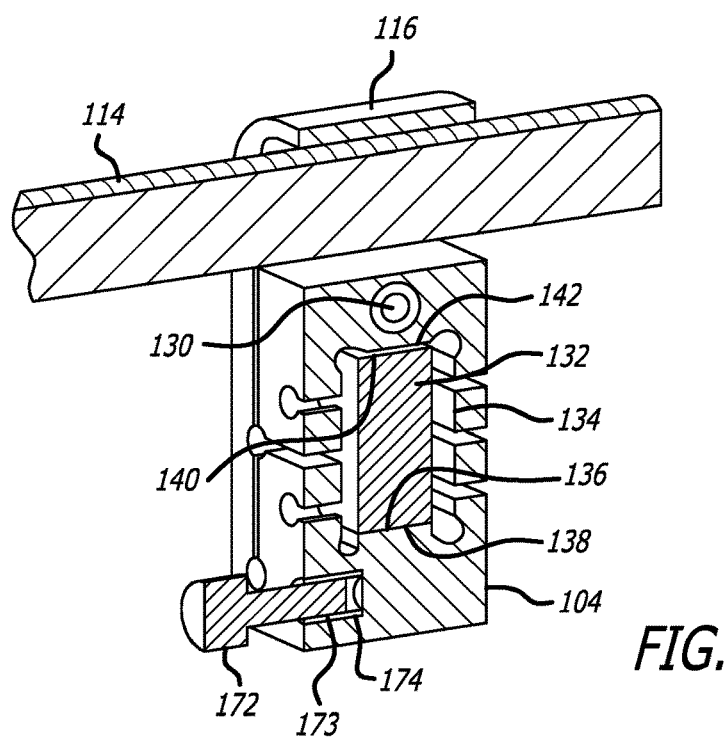
FIG. 6B is a perspective view in section of the piezoelectric actuator assembly of FIG. 6A.
Figure 6C:
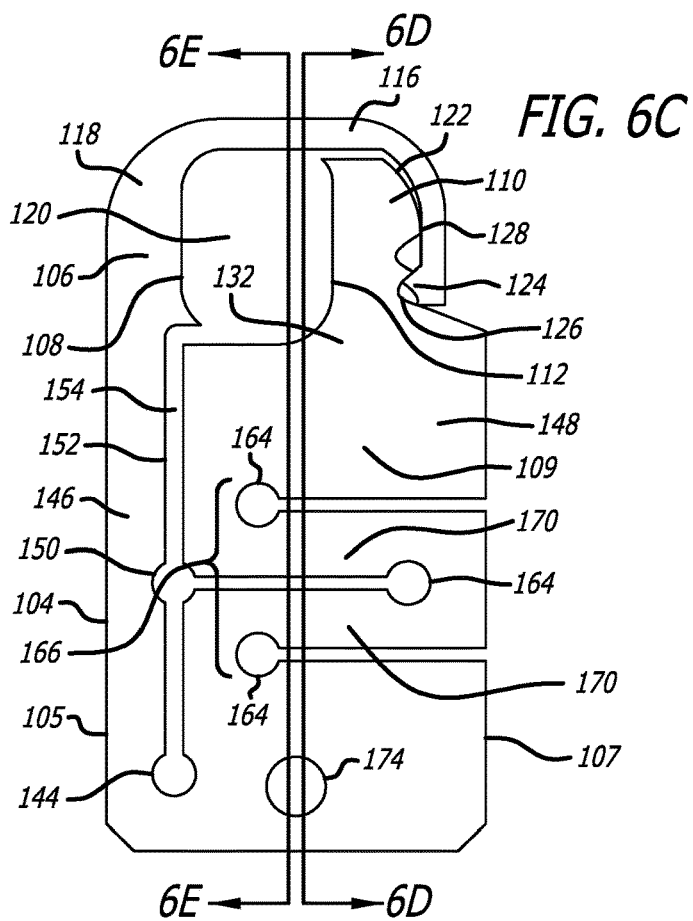
FIG. 6C is an elevation view of an embodiment of an actuator frame showing a first support element, a second support element, a hinge section, and a bias band.
Figure 6D:
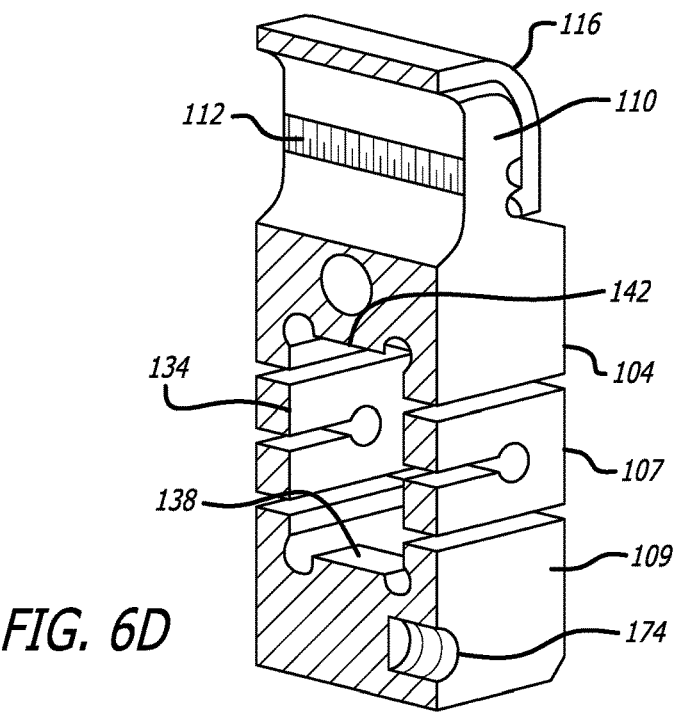
FIG. 6D is a perspective view in section of the actuator frame embodiment of FIG. 6C showing a second contact surface.
Figure 6E:
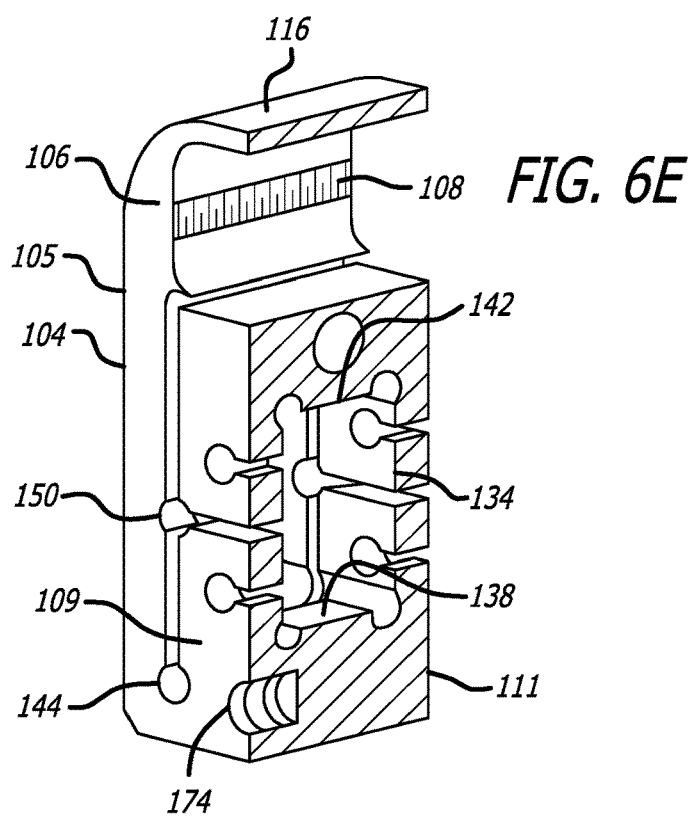
FIG. 6E is a perspective view in section of the actuator frame embodiment of FIG. 6C showing a first contact surface.

An embodiment of a piezoelectric actuator 102 that is configured to provide a consistent and/or controlled restoring force is shown in FIGS. 6A-6I. As discussed above, piezoelectric actuators with separate clip type springs used to create a restoring force for gripping a surface such as a threaded shaft may be prone to certain design difficulties. The piezoelectric actuator embodiment 102 shown in FIGS. 6A-6G may include an actuator frame 104 which has a monolithic configuration with all of the elements of the actuator frame 104 being formed from a single piece of continuous uninterrupted material. The actuator frame may include first support element 106 having a first contact surface 108 and a second support element 110 having a second contact surface 112. The first contact surface 108 is disposed in a spaced and substantially opposed relation relative to the second contact surface 112. The first contact surface 108 and the second contact surface 112 may be configured to selectively engage a threaded shaft 114 of an optical mount which may be rotationally secured between the first contact surface 108 and the second contact surface 112. The first contact surface 108 and the second contact surface 112 may optionally be configured as threaded surfaces as is shown in FIGS. 6D and 6E in order to effectively engage the threaded shaft 114. A relative reciprocating motion of the first contact surface 108 and the second contact surface 112 may be used to selectively engage with and rotate the threaded shaft 114.

Some exterior surfaces of the actuator frame 104 may be used as reference surfaces in order to discuss features of and/or dimensions of the actuator frame embodiment 104. In this case, the actuator frame 104 may incorporate a front exterior surface 105 of the actuator frame 104 and a back exterior surface 107 of the actuator frame 104. The front exterior surface 105 of the actuator frame 104 may be disposed in a spaced and substantially opposite relation relative to the back exterior surface 107 of the actuator frame 104. The front exterior surface 105 may also be substantially parallel to the back exterior surface 107. The actuator frame 104 may also incorporate a first lateral exterior surface 109 which is disposed such that it is substantially perpendicular to both the front exterior surface 105 and the back exterior surface 107. The actuator frame 104 may also incorporate a second lateral exterior surface 111 which is disposed in a spaced and substantially opposite relation relative to the first lateral exterior surface 109. The first lateral exterior surface 109 may also be substantially parallel to the second lateral exterior surface 111.

The actuator frame 104 may have any suitable configuration such as square, rectangle or the like. In some cases, the transverse dimension of the actuator frame 104 from the first lateral exterior surface 109 to the second lateral exterior surface 111 may be about 0.1 inches to about 0.33 inches, more specifically, about 0.11 inches to about 0.22 inches. Further, the transverse dimension of the actuator frame 104 from the front exterior surface 105 to the back exterior surface 107 may be about 0.15 inches to about 0.45 inches, more specifically, about 0.27 inches to about 0.33 inches. Further, the height of the of the actuator frame 104 may be from about 0.3 inches to about 1 inches, more specifically, about 0.54 inches to about 0.66 inches.

As discussed above, a consistent restoring force between the first contact surface 108 and the second contact surface 112 may be required in some cases in order to allow for the selective engagement of the contact surfaces with the threaded shaft 114 to provide rotational motion in a desired direction. The actuator frame 104 of the piezoelectric actuator embodiment 102 of FIGS. 6A-6G incorporates an integral bias band portion 116 which may be disposed between and coupled to the first support element 106 and the second support element 110 and which may be configured to provide restoring force which will resist the perpendicular relative displacement of the second contact surface 112 away from the first contact surface 108. In some cases, the integral bias band 116 may provide a more consistent restorative force between the contact surfaces as compared to some previous piezoelectric actuator embodiments.

The perpendicular displacement of the second contact surface 112 away from the first contact surface 108 results in a deflection of the bias band 116 which behaves in a manner similar to a conventional spring as it deflects and subsequently returns to its neutral state. The restoring force which the bias band 116 provides to the second contact surface 112 may be substantially proportional to the magnitude of the deflection, the moment of inertia of the bias band 116, and to the elastic modulus of the actuator frame 104 material from which the bias band 116 is formed in some cases. The bias band 116 may be configured as a region of the material of the actuator frame 104 which is several times more wide than it is thick as is shown in FIG. 6A. An increase in the width or the thickness of the bias band 116 will lead to an increase in the moment of inertia of the bias band 116, and thus to an increase in the restoring force which the bias band 116 provides to the contact surfaces.

Figure 11:
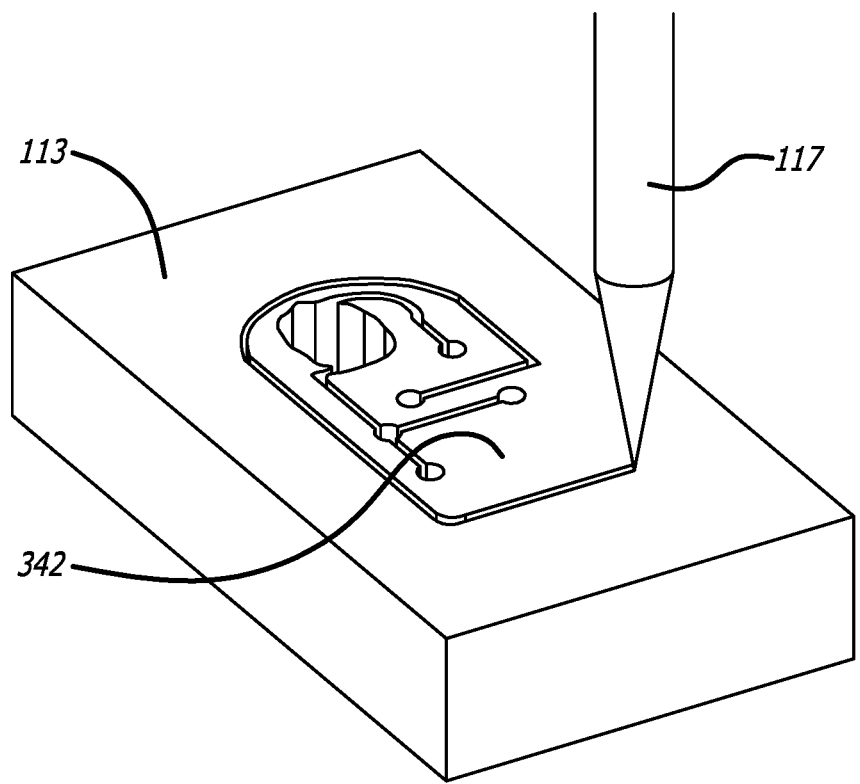
FIG. 11 is a perspective view of a manufacturing process.

Because the restoring force provided by the bias band 116 is dependent upon the cross sectional dimension of the bias band 116, consistent dimensions of the bias band 116 may provide a consistent restoring force to the contact surfaces. The bias band 116 is manufactured as a continuous region of the monolithic actuator frame 104. A manufacturing process such as wire electrical discharge machining (EDM) may be used to process or otherwise cut the actuator frame 104 (as well as any of the actuator frame embodiments discussed herein such as actuator frame 342 discussed below) from a continuous piece of high strength resilient material 113 as shown in FIG. 11. Cutting and machining processes such as EDM generally produce precise dimensional tolerances that are useful for generating consistent and controllable restoring force on the contact surfaces of the actuator frame 104. In addition to EDM, the actuator frame 104 may be manufactured or otherwise cut using any suitable cutting tool 117 such as used in conventional machining including CNC machining, water jet cutting, laser cutting or any other suitable fabrication and machining process. In some cases, it may be desirable to use a cutting process that does not induce heat affected zones that might affect the modulus properties of the resilient material being cut. Water jet cutting and EDM might suffice for such a requirement in some cases.

The restoring force of the bias band 116 may also be dependent upon the elastic modulus of the actuator frame 104 material. An actuator frame 104 manufactured from a high elastic modulus material will have a larger restoring force than an actuator frame 104 manufactured from a lower elastic modulus material assuming the same dimensions for the actuator frame 104. This may be beneficial for the consistency of the restoring force to tightly control of the elastic modulus of the actuator frame 104 material. For the embodiment shown in FIGS. 6A-6I, the actuator frame 104 maybe manufactured from any suitable resilient material. For example the actuator frame 104 may be manufactured from any stainless steel such as stainless steel 406, aluminum, titanium, brass, copper, any suitable composite material or the like. In Some cases, it may be desirable to cut or otherwise form the actuator frame from a continuous piece of composite material such as a carbon fiber composite or the like. Further, the actuator frame 104 may be configured such that the nominal transverse distance between the first contact surface 108 and the second contact surface 104 may be from about 2 mm to about 20 mm, more specifically, from about 5 to about 10 mm.

As shown in FIGS. 6A-6I, the bias band 116 extends distally from a distal portion 118 of the first support element 106, extends around both a space 120 disposed between the first contact surface 108 and the second contact surface 112 and around a distal end 122 of the second support element 110. The bias band 116 may also include a transverse extension 124 which is engaged with a mating transverse groove 126 disposed on the second support element 110, with the transverse groove 126 being disposed on outer surface 128 of a proximal portion 129 of the second support element 110 substantially opposite the second contact surface 112.

The bias band 116 may also be configured such that the restoring force which it provides to the contact surfaces during a drive cycle can be adjusted with a bias adjust mechanism. One embodiment of a bias adjust mechanism would be an adjustable set screw 130 which is disposed in contact with the bias band 116. The adjustable set screw 130 is shown in FIG. 6A.

The piezoelectric actuator 102 may also include a piezoelectric element 132 which is configured as a piezoelectric crystal. The piezoelectric element 132 may have any suitable configuration, such as rectangular, square, cylindrical or the like. In some cases, the piezoelectric element 132 may have an axial length of about 1 mm to about 20 mm, more specifically about 4 mm to about 6 mm. Further the piezoelectric element 132 may have a transverse dimension of about 1 mm to about 5 mm, more specifically about 2 mm to about 4 mm. The piezoelectric element 132 is shown in FIG. 6B disposed within the actuator frame 104 in a piezoelectric element cavity 134 of the actuator frame 104. The piezoelectric element 132 has a first end 136 which is secured to a first mount surface 138 of the actuator frame 104 and a second end 140 which is secured to a second mount surface 142 of the actuator frame 104. The space between the first mount surface 138 and second mount surface 142 may serve to define the piezoelectric element cavity 134 in some cases. The piezoelectric element 102 may be fabricated from any suitable piezoelectric materials. For example, the piezoelectric element may be fabricated from quartz, berlinite, tourmaline, barium titanate, lithium tantalate or any other suitable piezoelectric material.

The actuator frame embodiment 104 may also include one or more hinge sections of reduced material cross section which may generally be a reduced material cross section of the actuator frame 104. The reduced material cross section is reduced relative to the cross section of the actuator frame 104 immediately adjacent the hinge section 144. In some cases for any of the actuator frame embodiments discussed herein, the reduction of the material cross section of the hinge sections with respect to the nominal adjacent actuator frame material cross sections may be about 1% reduction in cross section to about 30% reduction in cross section, more specifically, about 5% reduction in cross section to about 25% reduction in cross section. A first arm hinge section 144 may be disposed between a frame arm section 146 of the actuator frame 104 and a frame body section 148 of the actuator frame 104 so as to allow a hinged-type rotational displacement between the frame arm section 146 and frame body section 148. The actuator frame embodiment 104 may also include a second arm hinge section 150 which is disposed between the first arm hinge section 144 and the first support element 106. The actuator frame 104 may also include a frame slot 152 which is disposed distally of the first arm hinge section 144. The frame slot 152 includes a gap 154 in the actuator frame 104 material between the frame arm section 146 and the frame body section 148 so as to allow substantially independent relative motion between the frame arm section 146 and frame body section 148.

The hinge sections of the actuator frame embodiment 104 are configured to allow for the relative reciprocating parallel displacement between the first contact surface 108 and the second contact surface 112 by the elastic deformation of the actuator frame 104 material in the hinge sections (and possibly elsewhere in the frame structure to a lesser degree). The first arm hinge section 144 may be formed by a reduced cross section or moment of inertia of material in the frame structure at the first arm hinge section 144. The reduced cross section provides a section in which strain of the frame structure as a result of forces applied to the frame structure by the expansion or contraction of the piezoelectric element 132 may be concentrated. The concentration of strain at the reduced cross section of material may result in a known or predictable movement between the various components of the actuator frame such as the first contact surface 108 and the second contact surface 112. The first arm hinge section 144 only allows for the hinged type rotational displacement of the frame body section 148 with respect to the frame arm section 146, the rotational displacement being centered around the first arm hinge section 144 where a concentration of strain will occur.

For the piezoelectric actuators discussed herein, all or most of the displacement of the components of the actuator frame occur substantially in a single plane because the pivoting or hinging portions of the frame structure as well as the bias band have a width that is substantially greater than a thickness such that there is a preferred plane of deformation of the frame. As an example, FIG. 6A shows a perspective view of the bias band 116 of the piezoelectric actuator embodiment 102. The bias band 116 can be seen to have a width (dimension 156 which runs from the first exterior lateral surface 109 to the second exterior lateral surface 111) that is substantially greater than its thickness (dimension 158). The dimensional configuration of the bias band 116 allows it to deflect along a first plane which is parallel to the first lateral exterior surface 109 of the actuator frame 104 more easily than deflection along a second plane which is parallel to back external surface of 107 of the actuator frame 104. This is because the bending moment of the bias band 116 with respect to the first plane is much lower than the bending moment of the bias band 116 with respect to the second plane.

The frame body section 148 includes a plurality of body hinge sections 164 in a zig-zag portion 166 that are configured to facilitate axial expansion and contraction of the frame body section 148 along a longitudinal axis 168 (see FIGS. 6F and 6G) of the body section 148. The body hinge sections 164 may be formed by a reduced cross section of material of the actuator frame 104 and function as discussed above with respect to the first arm hinge section 144. The body hinge sections 164 may be disposed on the frame structure which extends from the first mount surface 138 to the second mount surface 142. This zig-zag portion 166 of the frame structure of the frame body section 148 may include flexible connector sections 170 disposed between the body hinge sections 164. The body hinge sections 164 allow for the deflection (such as axial extension or contraction) of the frame body section 148 along the longitudinal axis 168 through the elastic deformation of the body hinge sections 164 as well as flexible connector sections 170 which are relatively thin frame elements that extend between body hinge sections 164. In some cases, the axial extension and contraction of the frame body section 148 may include elastic deformation of the body hinge sections 164, the flexible connector sections 170 or such deformation of both the body hinge sections 164 and flexible connector sections 170. Axial stress on the frame body section 148 due to actuation of the piezoelectric element 132 may result in deformation of the flexible connector sections 170. This stress on the flexible connector sections 170 may also result in a concentration of strain at each body hinge section 164. The deflection (such as axial expansion or contraction) of the frame body section 148 along the longitudinal axis 168 is substantially isolated from the frame arm section 146 by the frame slot 152, which allows the frame arm section 146 to remain relatively motionless during the deflection of the frame body section 148. In some cases for actuator frame embodiments discussed herein, the zig-zag portion of the frame body section of the actuator frame may be configured to be substantially less stiff along the longitudinal axis thereof than the corresponding piezoelectric element which is disposed within the frame body section. This configuration may allow the piezoelectric element to freely expand and contract without substantial constraint by the actuator frame.

For some embodiments of the actuator frame 104, the torque generated by the reciprocating movement of the contact surfaces on the threaded shaft may result in a torque of the actuator frame 104 about a longitudinal axis 115 of the threaded shaft 114. A frame guide 172 which extends between the actuator frame 104 and the base plate 61 prevents rotation of the actuator frame 104 around the longitudinal axis 115 of the threaded shaft 114 such that all of the torque from the contact surfaces results in rotation of the threaded shaft 114 relative to the base plate 61 of the optical mount 24. The frame guide 172 may be secured between the actuator frame 104 and the optical mount 24 in a variety of suitable configurations. For the embodiment shown, the frame guide 172 is a rigid elongate pin of high strength material, such as steel or the like, and is secured to the actuator frame 104 by securing the frame guide 172 into a frame guide hole 174 of the actuator frame 104. The frame guide 172 also includes a tip section having an enlarged transverse dimension that is configured to slidingly engage a portion of the base plate 61. The frame guide 172 may be slidably disposed within any suitable portion of the optical mount 24 such as within a slot 63 of the base plate 61 (see FIG. 4B), such that the frame guide 172 (and therefore the actuator frame 104) is free to move axially along the longitudinal axis 168. The frame guide 172 may also be disposed within the optical mount 24 such that the frame guide 172 minimizes or eliminates the rotation of the actuator frame 104 due to the torque generated by the reciprocating contact surfaces during the expansion or contraction of the frame body section 148.

The frame guide 172 may be secured to the frame guide hole 174 by any suitable means such as a threaded joint, adhesive bonding, welding, integral formation with the actuator frame 104 or the like. For example, a threaded outer surface of the frame guide 172 may be secured to a threaded inner surface of the frame guide hole 174. In addition a thin layer of adhesive 173 (as shown in FIG. 6B) may be used to bond the threaded outer surface of the frame guide 172 to the threaded inner surface of the frame guide hole 174. Any suitable adhesive 173 such as a cyanoacrylate thread lock may be used to secure the frame guide 172 to the frame guide hole 174.

For the embodiment shown, the second support element 110 extends distally from the frame body section 148 and the first support element 106 extends distally from the frame arm section 146. Because the second support element 110 is contiguous with the frame body section 148, a deflection of the frame body section 148 along the longitudinal axis 168 results in a motion of the second support element 110 along the longitudinal axis 168. Because the first support element 106 is contiguous with the frame arm section 146 which is substantially isolated from a deflection of the frame body section 148 along the longitudinal axis 168 by the frame slot 152, a deflection of the frame body section 148 along the longitudinal axis 168 may be transmitted as a minimal rotation of the frame arm section 146 by the first arm hinge section 144. The frame arm section 146 may undergo a nominal amount of rotation caused by the deflection of the frame body section 148 along the longitudinal axis 168 which may be transmitted through the first arm hinge section 144. The result of a deflection of the frame body section 148 along the longitudinal axis 168 is a net reciprocating motion of the first support element 106 and the second support element 110, and therefore a net reciprocating motion between the first contact surface 108 and the second contact surface 112. The bias band 116, which connects the first support element 106 to the second support element 110, is also deflected and provides a resilient elastic or substantially elastic restoring force to counter separation of the first contact surface 108 and the second contact surface 112 as well as a resilient elastic or substantially elastic restoring force which resists this reciprocating motion of the first contact surface 108 and the second contact surface 112.

Figure 6F:
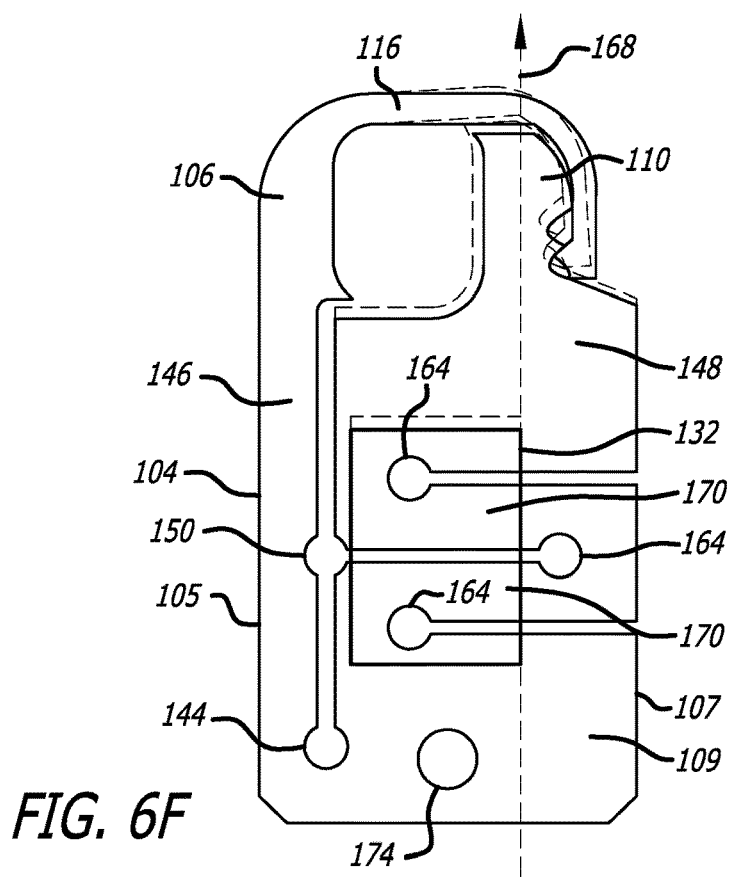
FIG. 6F is an elevation view of the piezoelectric actuator and the actuator frame both of FIG. 6A, showing the piezoelectric actuator in a neutral state and the actuator frame in a neutral state.
Figure 6G:
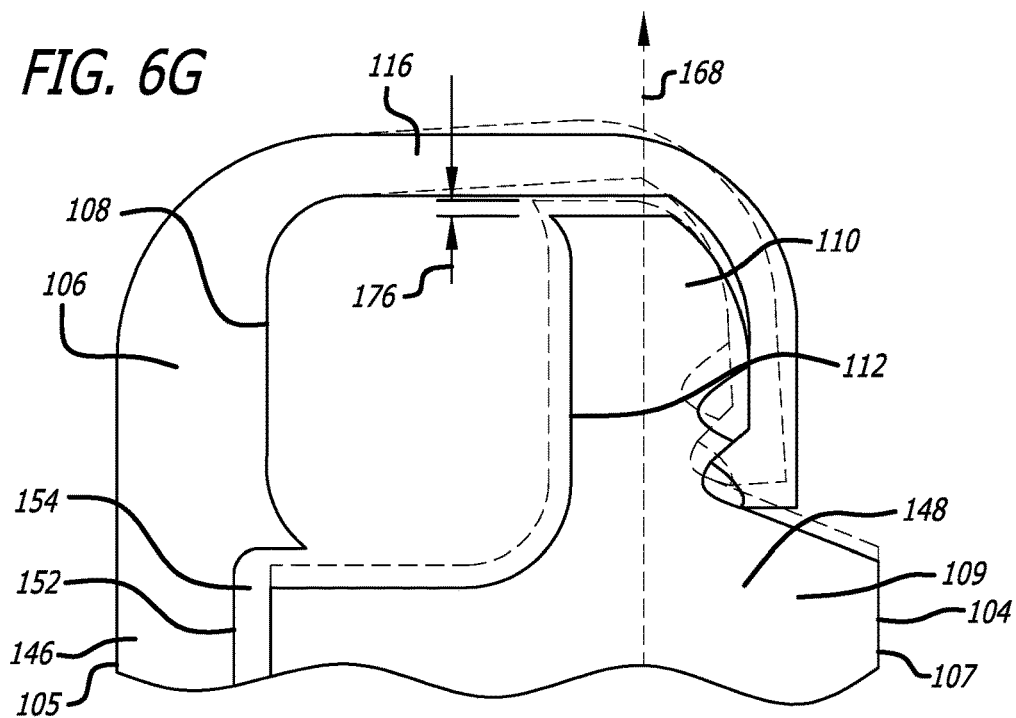
FIG. 6G is an elevation view of the piezoelectric actuator and the actuator frame both of FIG. 6F, showing the piezoelectric actuator in an elongated state and the actuator frame in a deformed state.
Figure 6H:
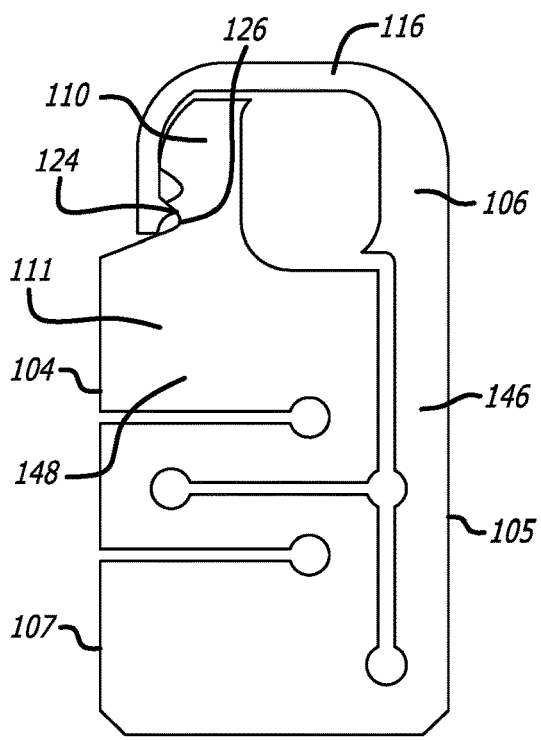
FIG. 6H is an elevation view of the actuator frame of FIG. 6A.
Figure 6I:
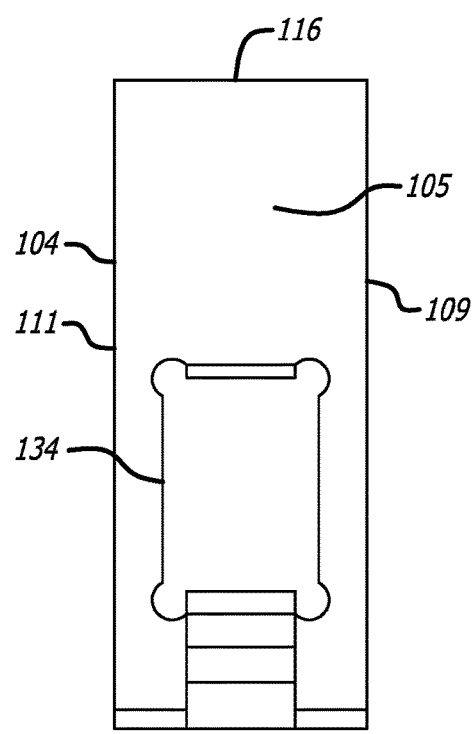
FIG. 6I is an elevation view of the actuator frame of FIG. 6A.

The elastic deformation of the actuator frame 104 from a neutral state to a deflected state is illustrated in FIGS. 6F and 6G. The actuator frame 104 is shown with the piezoelectric element 132 disposed within the piezoelectric element cavity 134, but for purposes of clarity the threaded shaft 114 of the adjustable optical mount is not shown in FIG. 6F or FIG. 6G. If a first electrical driver signal is transmitted to the piezoelectric element 132 from the electronic controller 48 shown in FIG. 1, the piezoelectric element 132 (which is secured to the second mount surface 142) may expand which in turn causes additional separation and displacement between the first mount surface 138 and the second mount surface 142. The displacement of the second mount surface 142 results in the deflection of the frame body section 148 along the longitudinal axis 168 which causes a motion of the second support element 110 along the longitudinal axis 168 while relative motion of the first support element 106 is minimized. This results in a relative reciprocating motion between the first contact surface 108 and the second contact surface 112 as is indicated by the dashed lines in FIGS. 6F and 6G. The magnitude of the deflection of the second support element is indicated by dimension 176 in FIG. 6G. During such a drive cycle, other portions of the actuator frame 104 and particularly the hinge sections of the actuator frame 104 may also be undergoing elastic or substantially elastic deformation and may also contribute to restorative forces on the actuator frame 104.

A second electrical driver signal transmitted to the piezoelectric element 132 from the electronic controller 48 may cause the piezoelectric element 132 to return to its neutral state, which results in the frame body section 148 reverting to its neutral state as indicated by the solid lines in FIGS. 6F and 6G. The bias band 116 recovers from its deflected state (indicated by the dashed lines in FIGS. 6F and 6G) and provides a restoring force to the second support element 110 such that the second support element 110 returns to its neutral position as indicated by the solid lines in FIGS. 6F and 6G. A single expansion and subsequent single contraction of the piezoelectric element 132 as driven by the electronic controller 48 will be referred to as a drive cycle.

The configuration of electrical driver signals which are sent to the piezoelectric element 132 by the electronic controller 48 may determine the extent to which the first contact surface 108 and the second contact surface 112 interact with the threaded shaft 114 of the adjustable optical mount 24 during a given drive cycle. A first drive cycle may be configured to rotate the threaded shaft 114 of the adjustable optical mount 24 in a first angular direction during relative reciprocating motion between the first contact surface 108 and the second contact surface 112. The first drive cycle may include a first electrical driver signal which is configured such that the first contact surface 108 and the second contact surface 112 engage with and rotate the threaded shaft 114 of the adjustable optical mount 24 in a first angular direction. The first drive cycle may also include a second electrical driver signal which is configured such that the first contact surface 108 and the second contact surface 112 slip over the threaded shaft 114 of the adjustable optical mount 24 which remains motionless or substantially motionless due to the inertia of the threaded shaft 114 being greater than the rotational force applied to the threaded shaft 114 by the contact surfaces.

A second drive cycle may be configured to rotate the threaded shaft 114 of the adjustable optical mount 24 in a second angular direction. The second drive cycle may include a first electrical driver signal which is configured such that the first contact surface 108 and the second contact surface 112 slip over the threaded shaft 114 of the adjustable optical mount 24 which remains motionless. The second drive cycle may also include a second electrical driver signal which is configured such that the first contact surface 108 and the second contact surface 112 engage with and rotate the threaded shaft 114 of the adjustable optical mount 24 in a second angular direction.

In order for the first contact surface 108 and the second contact surface 112 to properly and controllably engage with and rotate the threaded shaft 114 of the adjustable optical mount 24, the electrical drive signal may be configured such that the magnitude of an applied voltage increases or decreases slowly until a maximum or minimum respective applied voltage is reached. The relatively slow reciprocating motion of the first contact surface 108 and the second contact surface 112 results in the restoring force applied by the bias band 116 overcoming the inertial force of the threaded shaft 114 of the adjustable optical mount 24 thereby resulting in engagement between the first contact surface 108 and the second contact surface 112 and the threaded shaft 114 of the adjustable optical mount 24, with the subsequent rotation of the threaded shaft 114.

In order for the first contact surface 108 and the second contact surface 112 to slip over the threaded shaft 114 of the adjustable optical mount 24, the electrical drive signal may be configured such that the magnitude of an applied voltage increases or decreases quickly. The relatively quick reciprocating motion of the first contact surface 108 and the second contact surface 112 may be configured to result in the inertial force of the threaded shaft 114 overcoming the restoring force applied by the bias band 116. This causes slipping between the first contact surface 108 and the second contact surface 112 and the threaded shaft 114, with the threaded shaft 114 subsequently remaining stationary.

The dimensions, manufacturing methods, and materials of the bias band may significantly improve consistence in the restoring force generated. The bias band configuration may eliminate inelastic deformation of the material of the bias band during the manufacturing process. Some bias band configurations may also allow for the adjustment of the restoring force during manufacturing for more consistent and controlled results. The integral bias band configuration of the actuator frame is compact and cost efficient for manufacturing.

Another embodiment of a piezoelectric actuator 178 which may be used in the adjustable optical mount 24 discussed above as well as in other suitable optical embodiments is shown in FIGS. 7A-7I. The piezoelectric actuator 178 may have similar features, materials and/or dimensions to those of the piezoelectric actuator embodiment 102 discussed above and shown in FIGS. 6A-6I.

Figure 7A:
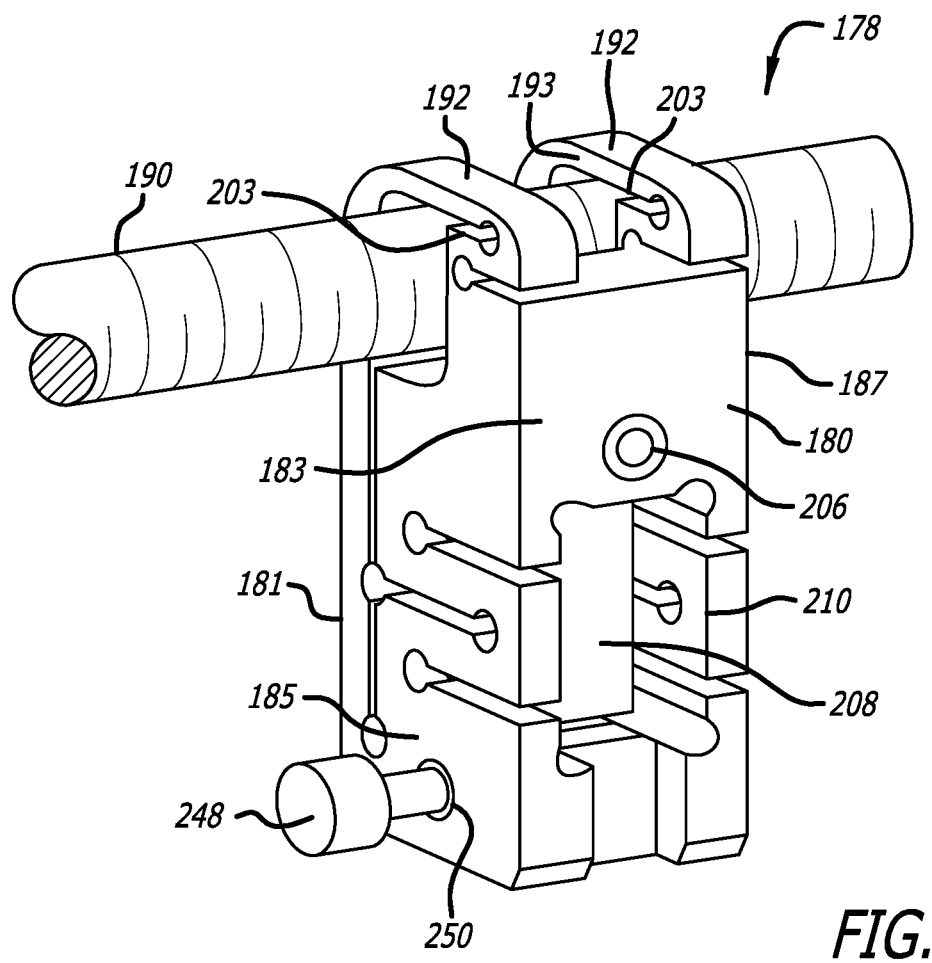
FIG. 7A is a perspective view that depicts a piezoelectric actuator assembly embodiment comprising an actuator frame, an actuator shaft, and a piezoelectric actuator.
Figure 7B:
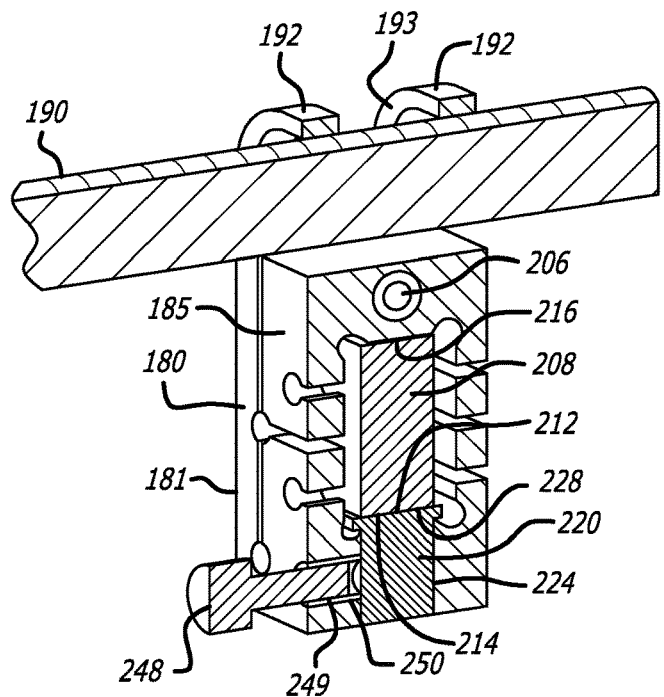
FIG. 7B is a perspective view in section of the piezoelectric actuator assembly of FIG. 7A.
Figure 7C:
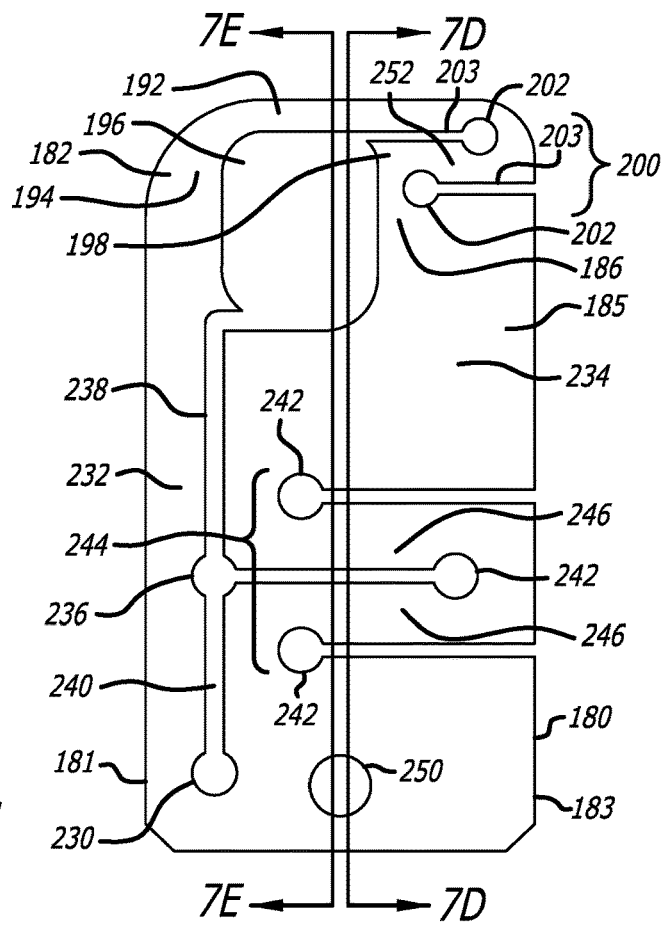
FIG. 7C is an elevation view of an embodiment of an actuator frame showing a first support element, a second support element, a hinge section, and a bias band.
Figure 7D:
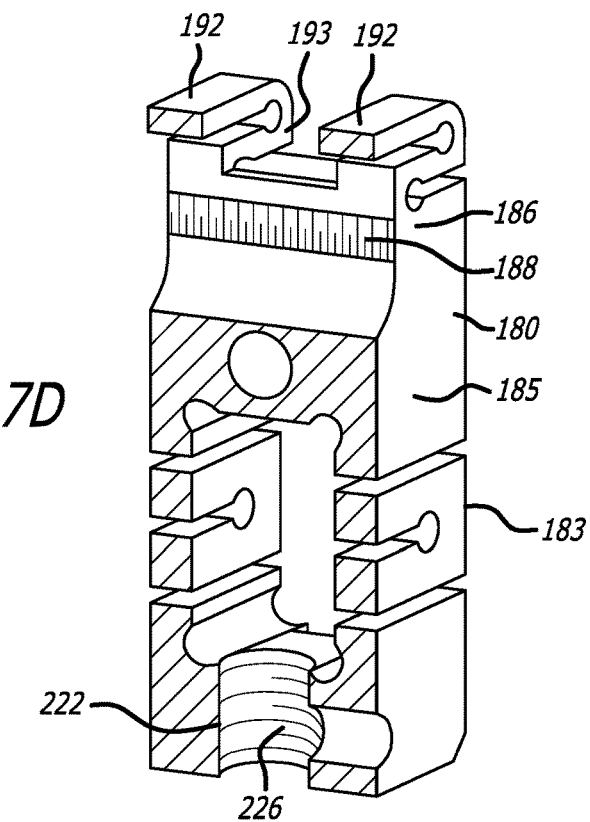
FIG. 7D is a perspective view in section of the actuator frame embodiment of FIG. 7C showing a second contact surface.
Figure 7E:
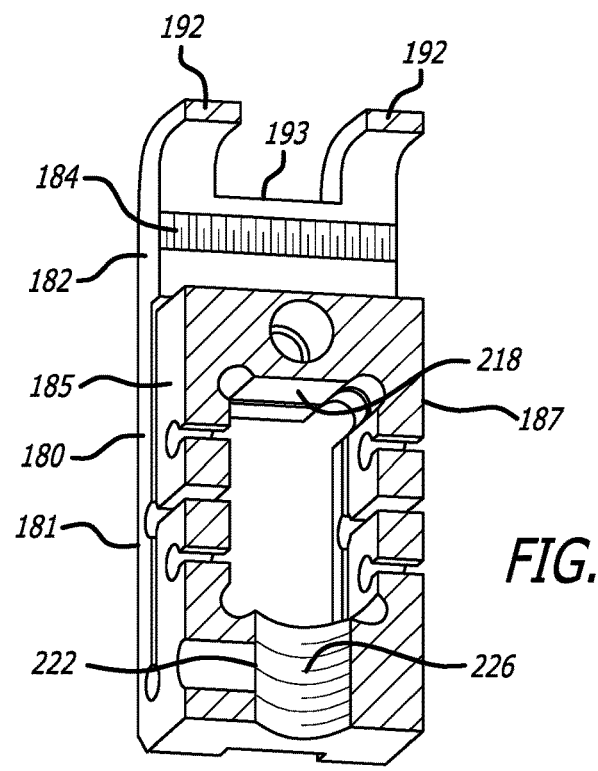
FIG. 7E is a perspective view in section of the actuator frame embodiment of FIG. 7C showing a first contact surface.

The piezoelectric actuator embodiment 178 shown in FIGS. 7A-7G may include an actuator frame 180 which has a monolithic configuration with all of the elements of the actuator frame 180 being formed (such as by cutting methods discussed above) from a single piece of continuous uninterrupted material. The actuator frame 180 may include first support element 182 having a first contact surface 184 and a second support element 186 having a second contact surface 188. The first contact surface 184 is disposed in a spaced and substantially opposed relation relative to the second contact surface 188. The first contact surface 184 and the second contact surface 188 may be configured to selectively engage a threaded shaft 190 of an optical mount which may be rotationally secured between the first contact surface 184 and the second contact surface 188. The first contact surface 184 and the second contact surface 188 may optionally be configured as threaded surfaces as is shown in FIGS. 7D and 7E in order to effectively engage the threaded shaft 190. A reciprocating motion of the first contact surface 184 and the second contact surface 188 may be used to selectively engage with and rotate the threaded shaft 190.

Some exterior surfaces of the actuator frame 180 may be used as reference surfaces in order to discuss features of and/or dimensions of the actuator frame embodiment 180. In this case, the actuator frame 180 may incorporate a front exterior surface 181 of the actuator frame and a back exterior surface 183 of the actuator frame. The front exterior surface 181 of the actuator frame 180 may be disposed in a spaced and substantially opposite relation relative to the back exterior surface 183 of the actuator frame 180 and may also be substantially parallel to the back exterior surface 183. The actuator frame 180 may also incorporate a first lateral exterior surface 185 which is disposed such that it is substantially perpendicular to both the front exterior surface 181 and the back exterior surface 183. The actuator frame 180 may also incorporate a second lateral exterior surface 187 which is disposed in a spaced and substantially opposite relation relative to the first lateral exterior surface 185 and may also be substantially parallel to the first lateral exterior surface 185.

As with the previous embodiments a consistent restoring force between the first contact surface 184 and the second contact surface 188 may be required in some cases in order to allow for the selective engagement of the contact surfaces with the threaded shaft 190 to provide rotational motion in a desired direction. The actuator frame 180 of the piezoelectric actuator embodiment 178 of FIGS. 7A-7G incorporates an integrally formed bias band portion 192 which may be disposed between and coupled to the first support element 182 and the second support element 186 and which may be configured to provide restoring force which will resist the perpendicular displacement of the second contact surface 188 towards or away from a neutral position with respect to the first contact surface 184. The bias band 192 is configured to provide a consistent elastic or substantially elastic restorative force between the contact surfaces.

As shown in FIGS. 7A-7I, the bias band 194 extends distally from a distal portion 194 of the first support element 182 around a space 196 which is disposed between the first contact surface 184 and the second contact surface 188 to a distal portion 198 of the second support element 186. The bias band 192 includes a band zig-zag portion 200 which may be disposed at the apex of the space 196 between the contact surfaces. The band zig-zag portion 200 may include at least one band hinge section 202 which may be configured to facilitate the flexure of the bias band 192 along a longitudinal axis 204 shown in FIGS. 7F and 7G. The hinge sections of the actuator frame 180 may have features and functions which are similar to the hinge sections of actuator frame 104 discussed above.

The piezoelectric actuator embodiment 178 incorporates two band hinge sections 202 disposed at opposite ends of the band zig-zag portion 200. For the embodiment shown, the bias band 192 incorporates a bias band slot 193. The bias band slot 193 transverses the bias band 192 from the front exterior surface 181 of the actuator frame 180 to the back exterior surface 183 of the actuator frame 180 as shown in FIG. 7A. The bias band slot 193 may substantially bisect the bias band 192 such that the sum of the widths of the remaining portions of the bias band 192 are substantially equal in width to the width of the bias band slot 193.

The bias band 192 may also be configured such that the nominal restoring force which it provides to the contact surfaces 184 and 188 can be adjusted with a bias adjust mechanism. One embodiment of such a bias adjust mechanism could include one or more adjustable set screws 206 which are disposed in contact with the bias band 192 or which are disposed between other components of the actuator frame 180 such as a frame arm section 232 and frame body section 234 discussed below. The adjustable set screw 206 is shown in FIG. 7A.

The piezoelectric actuator 178 may also include a piezoelectric element 208 which is configured as a piezoelectric crystal as discussed above. The piezoelectric element 208 is shown disposed within the actuator frame 180 in a piezoelectric element cavity 210 of the actuator frame 180 of FIG. 7B. The piezoelectric element 208 has a first end 212 which is secured to a first mount surface 214 and a second end 216 which is secured to a second mount surface 218 of the actuator frame 180. The space between the first mount surface 214 and second mount surface 218 may serve to define the piezoelectric element cavity 210 in some cases. The piezoelectric actuator 178 may also include an adjustable piezoelectric mount support 220 which is also shown in FIG. 7B. The adjustable piezoelectric mount support 220 may be threadably engaged within a threaded channel 222 of the actuator frame 180. The threaded channel 222 of the actuator frame 180 has a longitudinal axis that is parallel to or coextensive with the longitudinal axis 204 of the actuator frame 180. The adjustable piezoelectric mount support 220 may be rotated within the threaded channel 222 with the threaded outer surface 224 of the mount support engaged with the threaded inner surface 226 of the threaded channel 222. Such relative rotation may be used to position the first mount surface 214 (which is disposed on a flat distal surface 228 of the mount support 220 in this embodiment) relative to the second mount surface 218 before, during and after assembly of the piezoelectric element 208 into the piezoelectric element cavity 210.

Such an arrangement may be useful in order to provide a piezoelectric cavity that is longer than the piezoelectric element for insertion of the piezoelectric element and any desired adhesives etc. Thereafter, the adjustable piezoelectric mount support 220 may be rotated so as to reduce the effective axial length of the piezoelectric element cavity 210 and bring both the first mount surface 214 and second mount surface 218 into contact with corresponding surfaces of the piezoelectric element 208 with a desired amount of preload or clamping type force, if any. The contact force which is applied to the piezoelectric element 208 by the mount surfaces can be adjusted by altering the position of the adjustable piezoelectric mount support 220 within the threaded channel 222 along a central axis of the threaded channel 222 which is parallel to the longitudinal axis 204.

The actuator frame embodiment 178 may also include one or more hinge sections of reduced material cross section of the actuator frame 180. For example, a first arm hinge section 230 may be disposed between a frame arm section 232 of the actuator frame 180 and a frame body section 234 of the actuator frame 180 so as to allow a hinged-type rotational displacement between the frame arm section 232 and frame body section 234. The actuator frame embodiment 180 may also include a second arm hinge section 236 which is disposed between the first hinge section 230 and the first support element 182. The actuator frame 180 may also include a frame slot 238 which is disposed distally of the first arm hinge section 230. The frame slot 238 includes a gap 240 in the frame material between the frame arm section 232 and the frame body section 234 so as to allow substantially independent relative motion between the frame arm section 232 and frame body section 234.

The hinge sections of the actuator frame embodiment 180 are configured to allow for the relative reciprocating parallel displacement between the first contact surface 184 and the second contact surface 188 by the elastic deformation of the actuator frame 180 material in the hinge sections (and possibly elsewhere in the frame structure to a lesser degree). The first arm hinge section 230 may be formed by a reduced cross section or moment of inertia of material in the frame structure at the first arm hinge section 230. The reduced cross section provides a section in which strain of the frame structure as a result of forces applied to the frame structure by the expansion or contraction of the piezoelectric element 208 may be concentrated. The concentration of strain at the reduced cross section of material may result in a known or predictable movement between the various components of the actuator frame such as the first contact surface 184 and the second contact surface 188. The first arm hinge section 230 only allows for the hinged type rotational displacement of the frame body section 234 with respect to the frame arm section 232, the rotational displacement being centered around the first arm hinge section 230 where a concentration of strain will occur.

The frame body section 234 includes a plurality of body hinge sections 242 in a zig-zag portion 244 that are configured to facilitate axial expansion and contraction of the frame body section 234 along the longitudinal axis 204 of the frame body section 234. The body hinge sections 242 may be formed by a reduced cross section of the material of the actuator frame 180 and function as discussed above with respect to the first arm hinge section 230. The body hinge sections 242 may be disposed on the frame structure which extends from the first mount surface 214 to the second mount surface 218. The zig-zag portion 244 of the frame structure of the frame body section 234 may include flexible connector sections 246 disposed between the body hinge sections 242. The body hinge sections 242 allow for the deflection (such as axial extension or contraction) of the frame body section 234 along the longitudinal axis 204 through the elastic deformation of the body hinge sections 242 as well as flexible connector sections 246 which are relatively thin frame elements that extend between body hinge sections 242. In some cases, the axial extension and contraction of the frame body section 234 may include elastic deformation of the body hinge sections 242, the flexible connector sections 246 or such deformation of both the body hinge sections 242 and flexible connector sections 246. Axial stress on the frame body section 234 due to actuation of the piezoelectric element 208 may result in deformation of the flexible connector sections 246. This stress on the flexible connector section 246 may also result in a concentration of strain at each body hinge section 242. The deflection (such as axial expansion or contraction) of the frame body section 234 along the longitudinal axis 204 is substantially isolated from the frame arm section 232 by the frame slot 238, which allows the frame arm section 232 to remain relatively motionless during the deflection of the frame body section 234.

As discussed above, the torque generated by the reciprocating movement of the contact surfaces on the threaded shaft 190 may result in a torque on the actuator frame 180 about a longitudinal axis of the threaded shaft 190. A frame guide 248, which may have the same or similar features, dimensions and materials as frame guide 172 discussed above, may be used to counteract the this torque on the actuator frame 180. The frame guide 248 may be secured within a frame guide hole 250 of the actuator frame 180 using any suitable method, such as the methods discussed above with regard to frame guide 172. For example, any suitable adhesive or epoxy 249 may be used as is shown in FIG. 7B. The frame guide 248 may be coupled between the optical mount 24 and the actuator frame 180 such that the frame guide 248 effectively eliminates or at least minimizes any rotation of the actuator frame 180 about the threaded shaft 190 with respect to the optical mount 24. The frame guide 248 may also be coupled to the optical mount 24 such that the frame guide 248 allows for the axial displacement (axial expansion and contraction) of the frame body section 234 along the longitudinal axis 204. The configuration of the connections between the frame guide 248, the actuator frame 180, and the slot 63 (see FIG. 4B) of the base plate 61 of the optical mount 24 may be the same as or similar to the configuration of the connections between the frame guide 172, the actuator frame 104, and the slot 63 discussed above for the embodiments shown in FIGS. 6A-6I and in FIG. 4B.

For the embodiment shown, the second support element 186 extends distally from the frame body section 234, and the first support element 182 extends distally from the frame arm section 232. Because the second support element 186 is contiguous with the frame body section 234, a deflection of the frame body section 234 along the longitudinal axis 204 results in a motion of the second support element 186 along the longitudinal axis 204. Because the first support element 182 is contiguous with the frame arm section 232 which is substantially isolated from a deflection of the frame body section 234 along the longitudinal axis 204 by the frame slot 238, a deflection of the frame body section 234 along the longitudinal axis 204 may be transmitted as a minimal rotation of the frame arm section 232 by the first arm hinge section 230. The frame arm section 232 may undergo a nominal amount of rotation caused by the deflection of the frame body section 234 along the longitudinal axis 204 which may be transmitted through the first arm hinge section 230. The result of a deflection of the frame body section 234 along the longitudinal axis 204 is a net reciprocating motion of the first support element 182 and the second support element 186, and therefore a net reciprocating motion between the first contact surface 184 and the second contact surface 188. The bias band 192, which connects the first support element 182 to the second support element 186, is also deflected and provides a restoring force to counter separation of the first contact surface 184 and the second contact surface 188 as well as a restoring force which resists this reciprocating motion of the first contact surface 184 and the second contact surface 188.

During a deflection of the bias band 192, the band zig-zag portion 200 facilitates the flexure and elastic deformation of the bias band 192 in the direction of the deflection of the bias band 192. For the actuator frame embodiment 180 shown, the band zig-zag portion 200 of the bias band 192 contains two band hinge sections 202. The band hinge sections 202 include band hinge slots 203 which are also disposed in the bias band 192. The band hinge slots 203 extend transversely across the bias band 192 from the first lateral exterior surface 185 of the actuator frame 180 to the second lateral exterior surface 187 of the actuator frame 180. A band flexible connector section 252 is disposed between the band hinge sections 202. A deflection of the bias band 192 results in the band flexible connector section 252 elastically deforming thereby resulting in strain at the band hinge sections 202. The reduced thickness configuration of the band hinge sections 202 may then result in a concentration of strain in the band hinge sections 202. The concentration of strain at the band hinge sections 202 facilitates the deflection of the bias band 190 by reducing the bending moment of the bias band 190 in the direction of the deflection of the bias band 190.

Figure 7F:
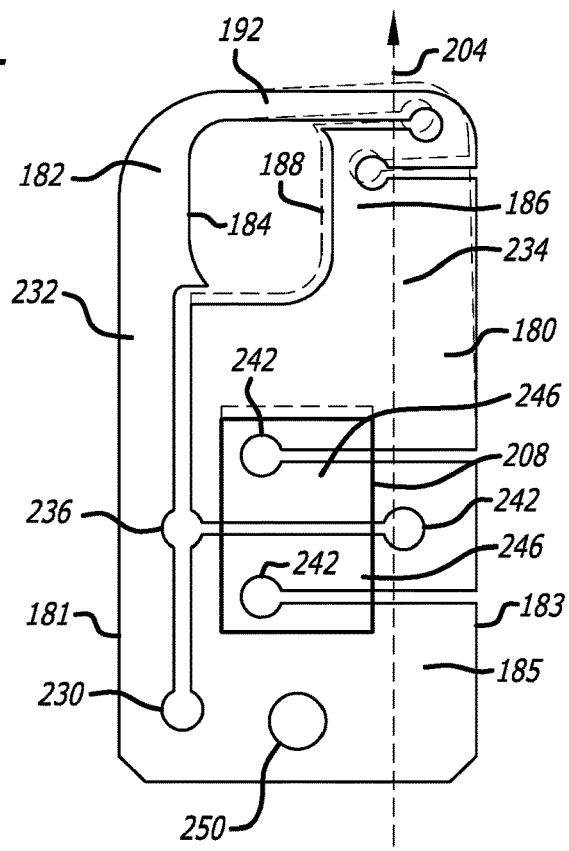
FIG. 7F is an elevation view of the piezoelectric actuator and the actuator frame both of FIG. 7A, showing the piezoelectric actuator in a neutral state and the actuator frame in a neutral state.
Figure 7G:
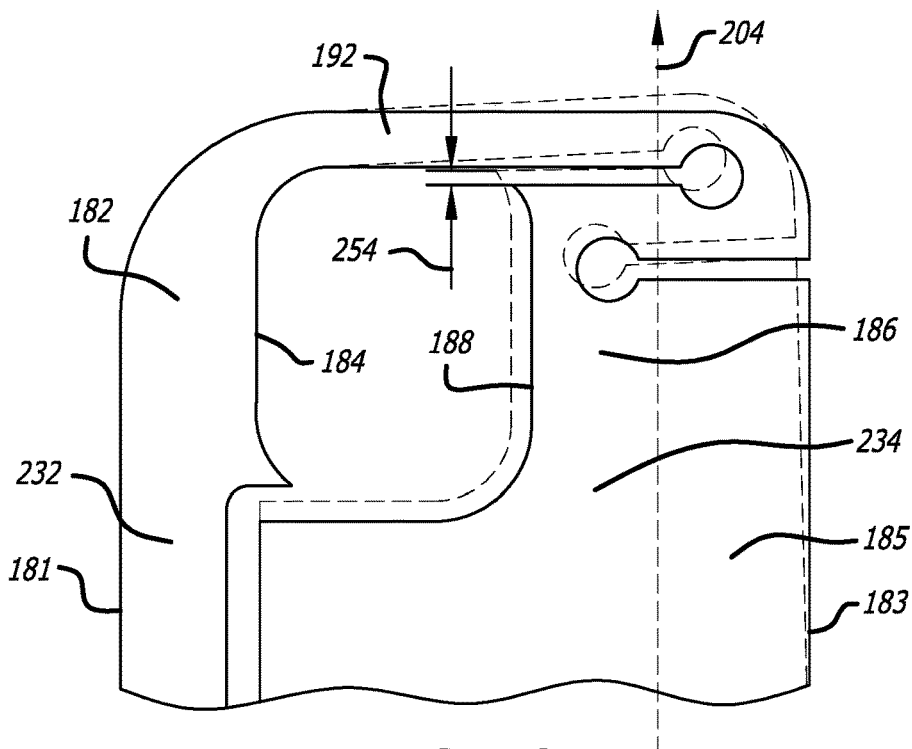
FIG. 7G is an elevation view of the piezoelectric actuator and the actuator frame both of FIG. 7F, showing the piezoelectric actuator in an elongated state and the actuator frame in a deformed state.
Figure 7H:
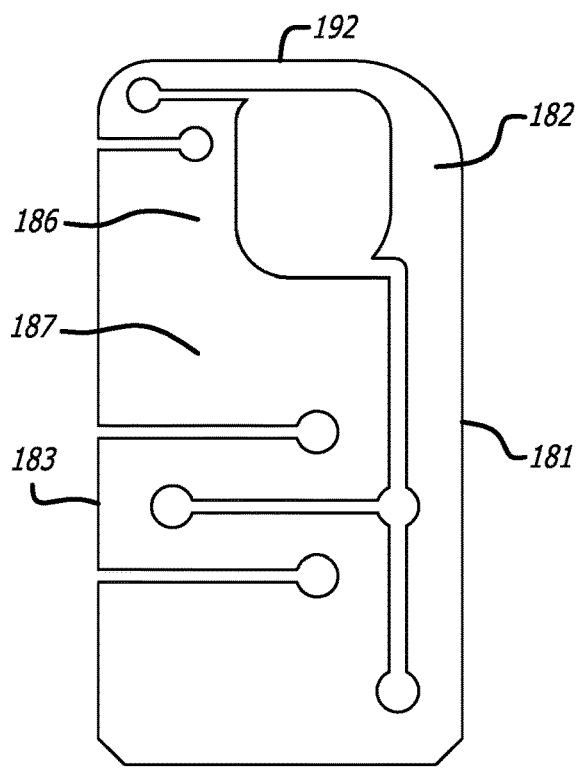
FIG. 7H is an elevation view of the actuator frame of FIG. 7A.
Figure 7I:
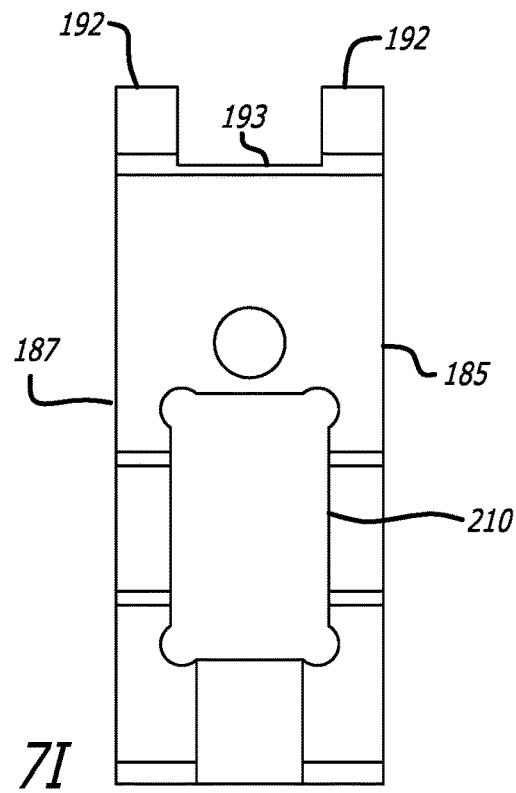
FIG. 7I is an elevation view of the actuator frame of FIG. 7A.

The elastic deformation of the actuator frame 180 from a neutral state to a deflected state is illustrated in FIGS. 7F and 7G. The actuator frame 180 is shown with the piezoelectric element 208 disposed within the piezoelectric element cavity 210, but for purposes of clarity the threaded shaft 190 of the adjustable optical mount is not shown in FIG. 7F or FIG. 7G. If a first electrical driver signal is transmitted to the piezoelectric element 208 from the electronic controller 48 shown in FIG. 1, the piezoelectric element 208 (which is secured to the second mount surface 218) may expand which in turn causes additional separation and displacement between the first mount surface 214 and the second mount surface 218. The displacement of the second mount surface 218 results in the deflection of the frame body section 234 along the longitudinal axis 204 which causes a motion of the second support element 186 along the longitudinal axis 204 while the first support element 182 remains substantially motionless. This results in a relative reciprocating motion between the first contact surface 184 and the second contact surface 188 as is indicated by the dashed lines in FIGS. 7F and 7G. The magnitude of the deflection of the second support element is indicated by dimension 254 in FIG. 7G.

A second electrical driver signal transmitted to the piezoelectric element 208 from the electronic controller 48 may cause the piezoelectric element 208 to return to its neutral state, which results in the frame body section 234 reverting to its neutral state as indicated by the solid lines in FIGS. 7F and 7G. The bias band 192 recovers from its deflected state (indicated by the dashed lines in FIGS. 7F and 7G) and provides a resilient restoring force to the second support element 186 such that the second support element 186 returns to its neutral position as indicated by the solid lines in FIGS. 7F and 7G.

Another embodiment of a piezoelectric actuator 256 which may be used in the adjustable optical mount 24 discussed above as well as in other suitable optical embodiments is shown in FIGS. 8A-8I. The piezoelectric actuator 256 may have similar features, materials and/or dimensions to those of the piezoelectric actuator embodiment 102 discussed above and shown in FIGS. 6A-6I.

Figure 8A:
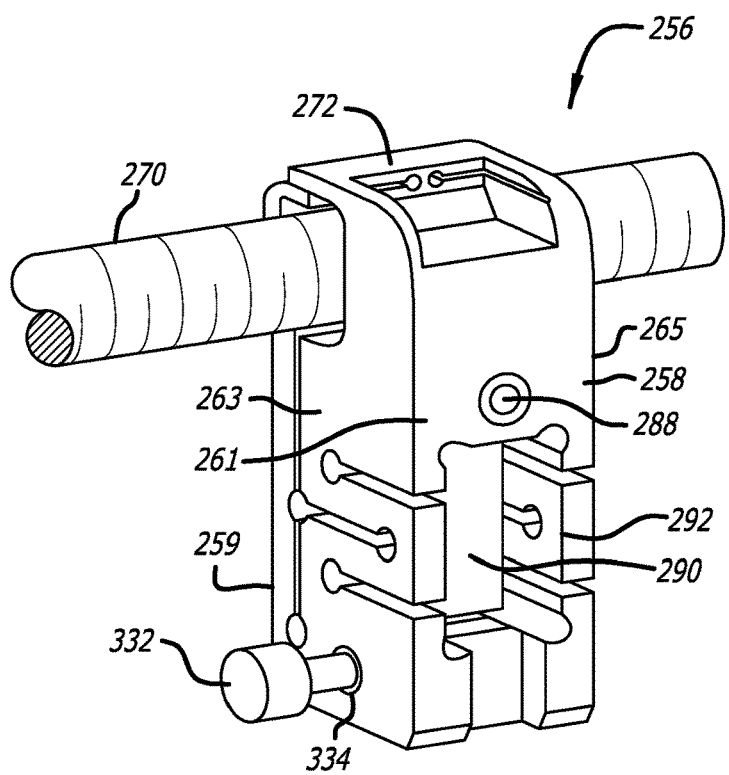
FIG. 8A is a perspective view that depicts a piezoelectric actuator assembly embodiment comprising an actuator frame, an actuator shaft, and a piezoelectric actuator.
Figure 8B:
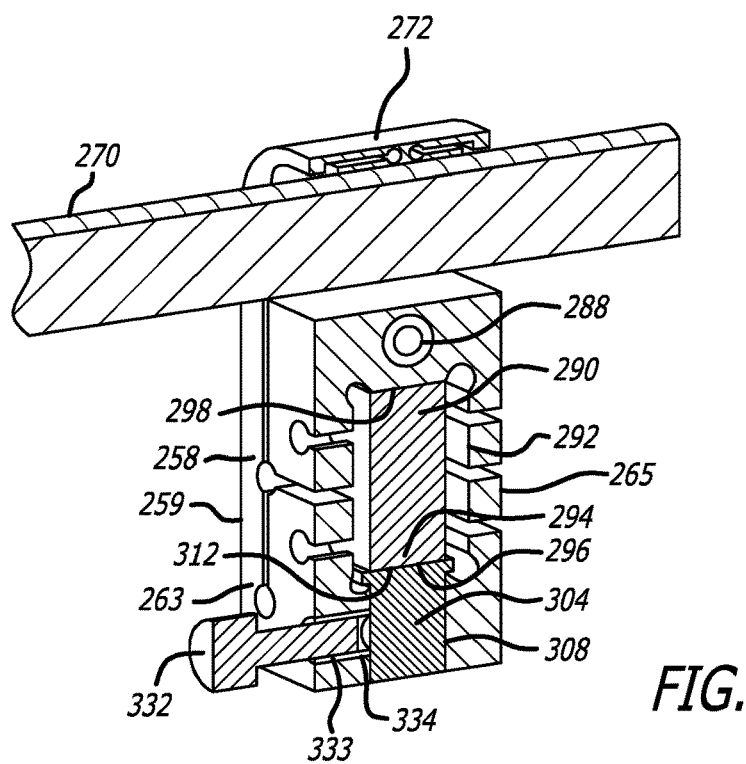
FIG. 8B is a perspective view in section of the piezoelectric actuator assembly of FIG. 8A.
Figure 8C:
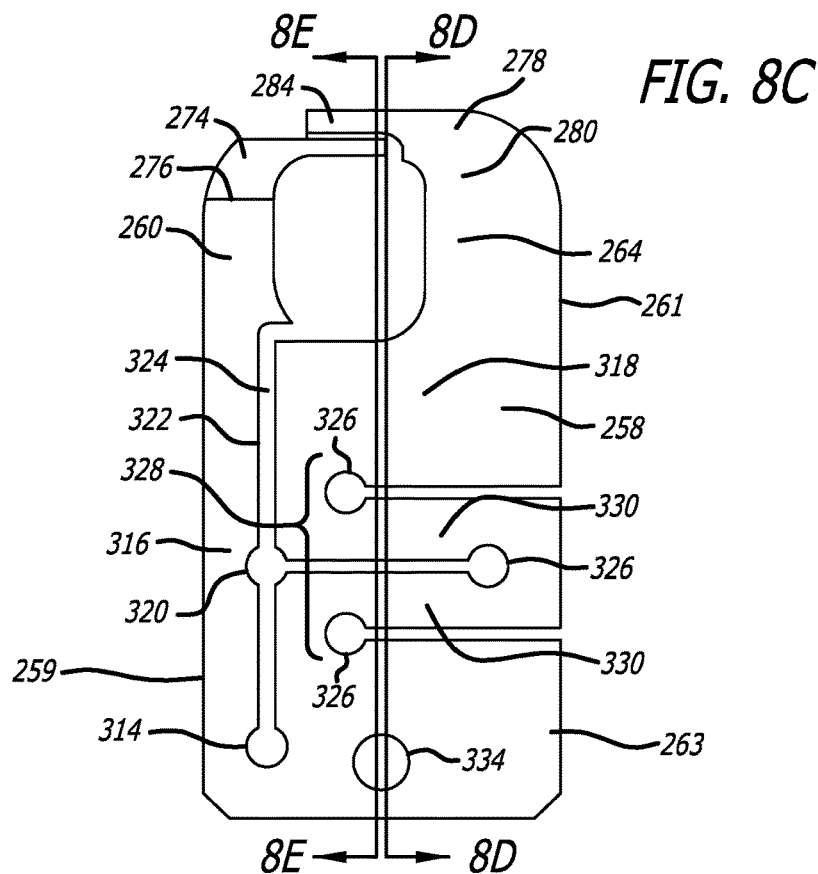
FIG. 8C is an elevation view of an embodiment of an actuator frame showing a first support element, a second support element, a hinge section, and a bias band.
Figure 8D:
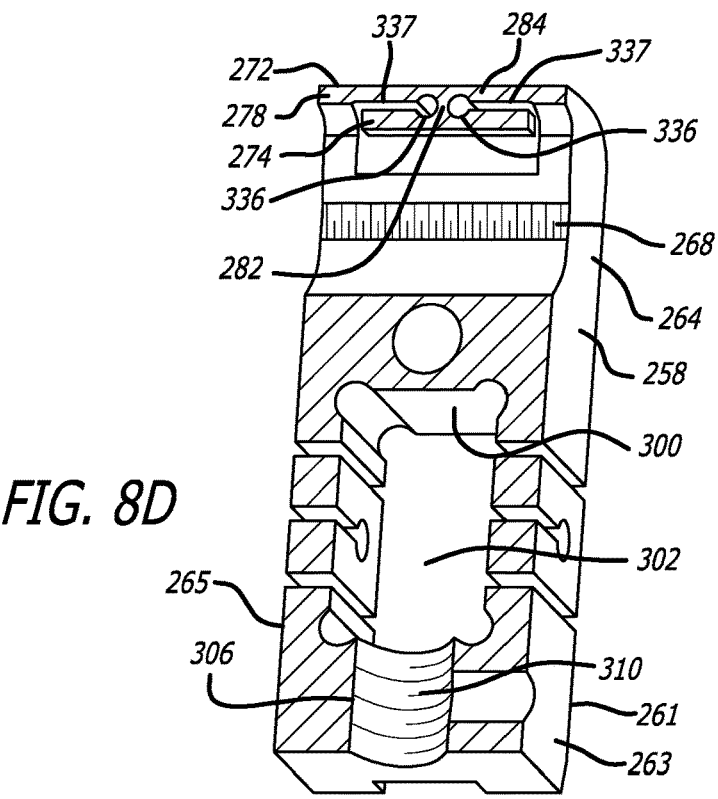
FIG. 8D is a perspective view in section of the actuator frame embodiment of FIG. 8C showing a second contact surface.
Figure 8E:
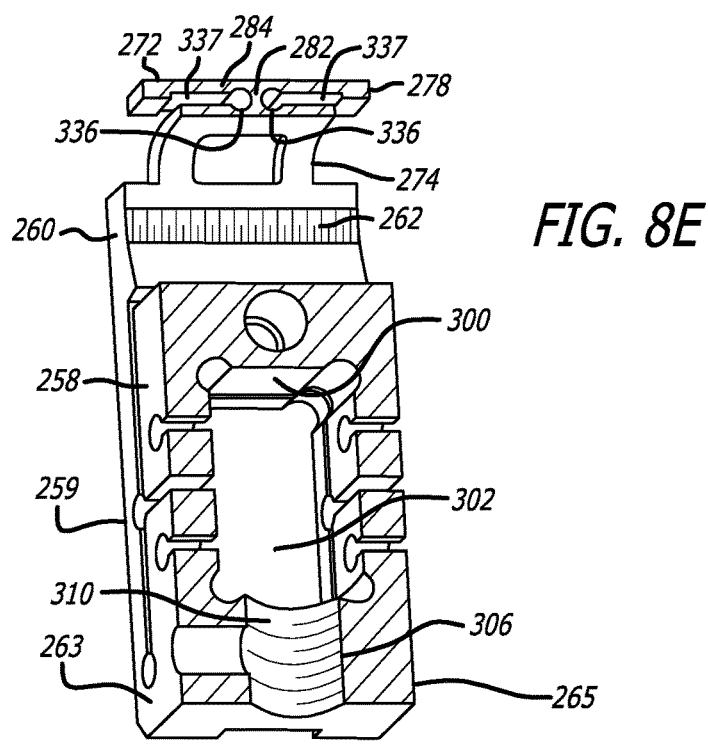
FIG. 8E is a perspective view in section of the actuator frame embodiment of FIG. 8C showing a first contact surface.

The piezoelectric actuator embodiment 256 shown in FIGS. 8A-8I may include an actuator frame 258 which has a monolithic configuration with all of the elements of the actuator frame 258 being formed (such as being cut) from a single piece of continuous uninterrupted material as discussed above. The actuator frame 258 may include first support element 260 having a first contact surface 262 and a second support element 264 having a second contact surface 268. The first contact surface 262 is disposed in a spaced and substantially opposed relation relative to the second contact surface 268. The first contact surface 262 and the second contact surface 268 may be configured to selectively engage a threaded shaft 270 of an optical mount which may be rotationally secured between the first contact surface 262 and the second contact surface 268. The first contact surface 262 and the second contact surface 268 may optionally be configured as threaded surfaces as is shown in FIGS. 8D and 8E in order to effectively engage the threaded shaft 270. A reciprocating motion of the first contact surface 262 and the second contact surface 268 may be used to selectively engage with and rotate the threaded shaft 270.

Some exterior surfaces of the actuator frame 258 may be used as reference surfaces in order to discuss features of and/or dimensions of the actuator frame embodiment 258. In this case, the actuator frame 258 may incorporate a front exterior surface 259 of the actuator frame 258 and a back exterior surface 261 of the actuator frame 258. The front exterior surface 259 of the actuator frame 258 may be disposed in a spaced and substantially opposite relation relative to the back exterior surface 261 of the actuator frame 258 and may also be substantially parallel to the back exterior surface 261. The actuator frame 258 may also incorporate a first lateral exterior surface 263 which is disposed such that it is substantially perpendicular to both the front exterior surface 259 and the back exterior surface 261. The actuator frame 258 may also incorporate a second lateral exterior surface 265 which is disposed in a spaced and substantially opposite relation relative to the first lateral exterior surface 263 and may also be substantially parallel to the first lateral exterior surface 263.

As with the previous embodiments a consistent resilient restoring force between the first contact surface 262 and the second contact surface 268 may be required in some cases in order to allow for the selective engagement of the contact surfaces with the threaded shaft 270 to provide rotational motion of the threaded shaft 270 in a desired direction. The actuator frame 258 of the piezoelectric actuator embodiment 256 of FIGS. 8A-8G incorporates an integral bias band portion 272 which may be disposed between and coupled to the first support element 260 and the second support element 264 and which may be configured to provide restoring force which will resist the perpendicular displacement of the second contact surface 268 towards or away from a neutral position of the first contact surface 262. The bias band 272 is configured to provide a consistent resilient restorative force between the contact surfaces.

Figure 8F:
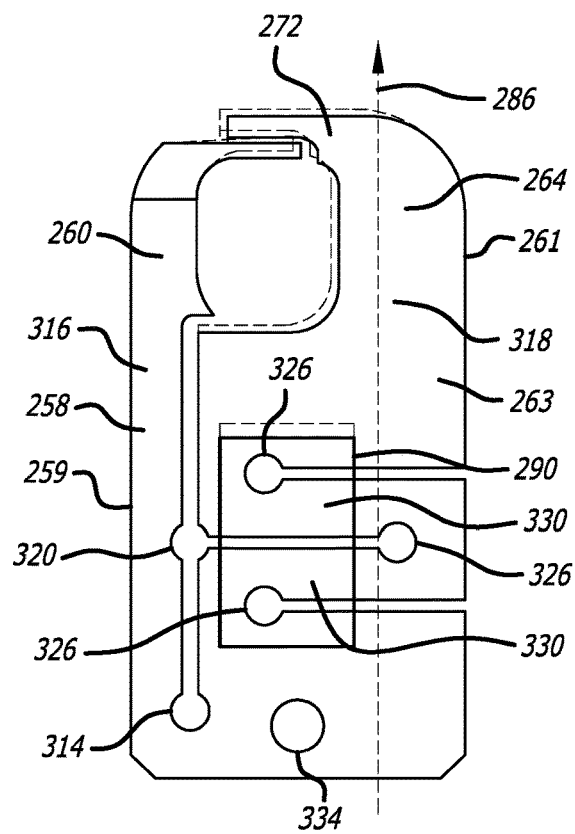
FIG. 8F is an elevation view of the piezoelectric actuator and the actuator frame both of FIG. 8A, showing the piezoelectric actuator in a neutral state and the actuator frame in a neutral state.
Figure 8G:
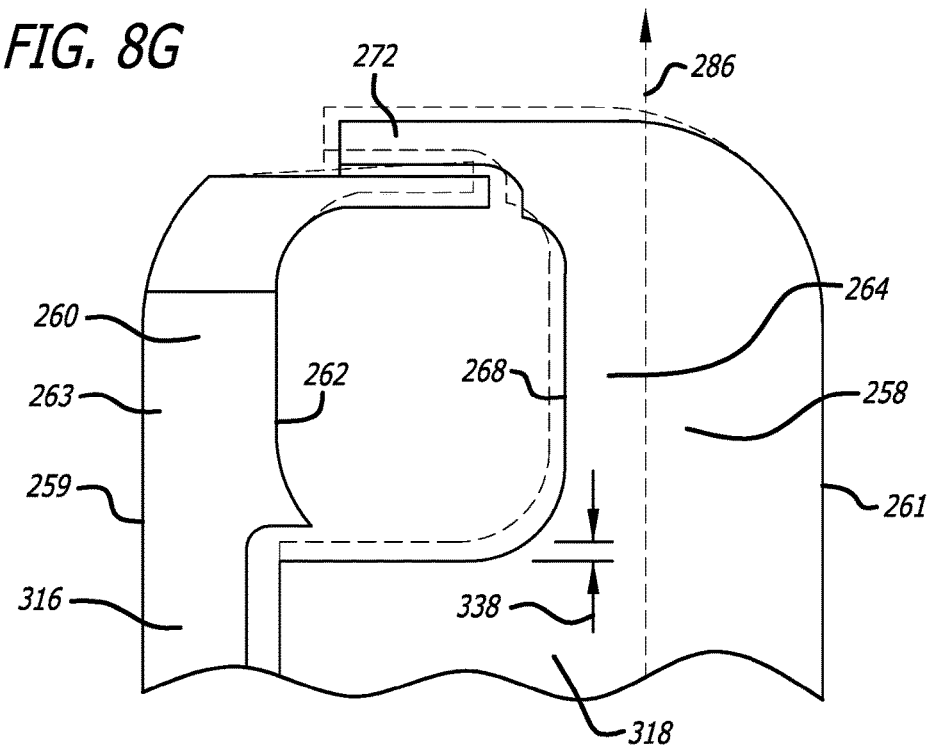
FIG. 8G is an elevation view of the piezoelectric actuator and the actuator frame both of FIG. 8F, showing the piezoelectric actuator in an elongated state and the actuator frame in a deformed state.
Figure 8H:
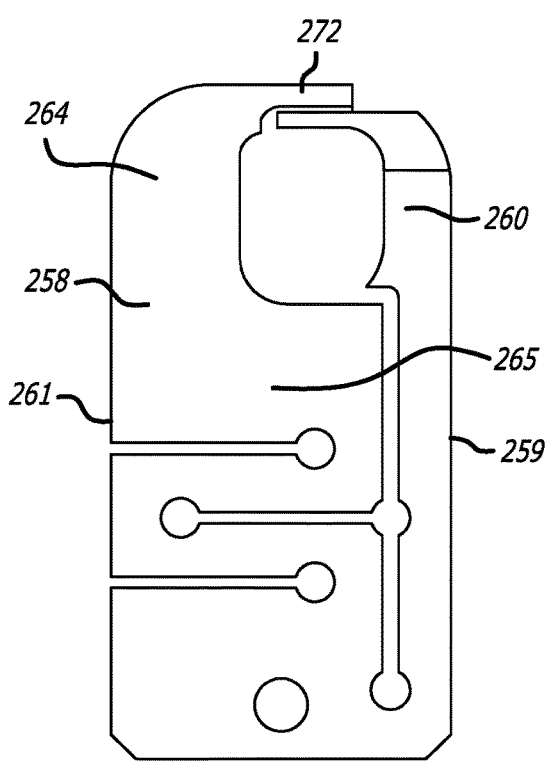
FIG. 8H is an elevation view of the actuator frame of FIG. 8A.
Figure 8I:
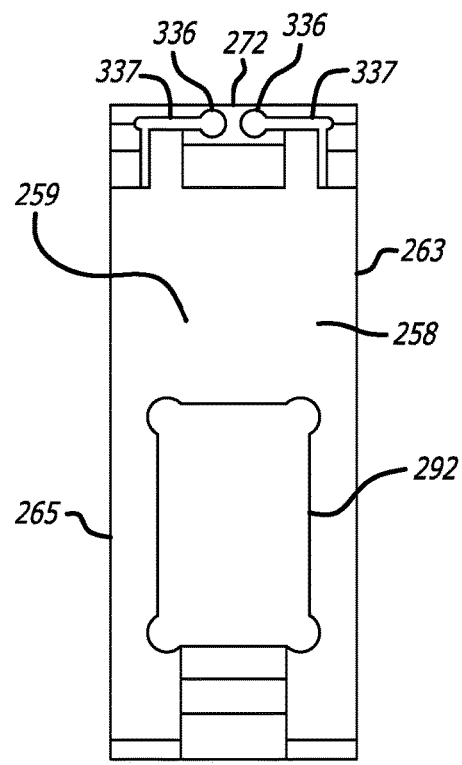
FIG. 8I is an elevation view of the actuator frame of FIG. 8A.

As shown in FIGS. 8A-8I, the bias band 272 incorporates a first bias band portion 274 that extends distally from a distal portion 276 of the first support element 260 and towards the second support element 264. The bias band 272 also incorporates a second bias band portion 278 that extends distally from a distal portion 280 of the second support element 264 towards the first support element 260 so as to longitudinally overlap the first bias band portion 274. The bias band 272 also incorporates a longitudinally oriented rib 282 that extends from the first bias band portion 274 to the second bias band portion 278 in an overlapped section 284 where the first bias band portion 274 overlaps the second bias band portion 278. The overlapped section 284 is configured such that it allows for the flexure of the bias band 272 along a longitudinal axis 286 which is shown in FIGS. 8G and 8F.

The bias band 272 may be configured such that the resilient restoring force which it provides to the contact surfaces during a drive cycle can be adjusted with a bias adjust mechanism. One embodiment of a bias adjust mechanism could include one or more adjustable set screws 288 which are disposed in contact with the bias band 272 or between other components of the actuator frame 258 such as the arm section 316 and body section 318 discussed below. The adjustable set screw 288 is shown in FIG. 8A.

The piezoelectric actuator 256 may include a piezoelectric element 290 which is configured as a piezoelectric crystal as discussed above. The piezoelectric element 290 is shown disposed within the actuator frame 258 in a piezoelectric element cavity 292 of the actuator frame 258 as shown in FIG. 8B. The piezoelectric element 290 has a first end 294 which is secured to a first mount surface 296 and a second end 298 which is secured to a second mount surface 300 of the actuator frame 258. The space 302 between the first mount surface 296 and second mount surface 300 may serve to define the piezoelectric element cavity 292 in some cases.

The piezoelectric actuator 256 may also include an adjustable piezoelectric mount support 304 which is also shown in FIG. 8B. The adjustable piezoelectric mount support 304 may be threadably engaged within a threaded channel 306 of the actuator frame 258. The threaded channel 306 of the actuator frame 258 has a longitudinal axis that is parallel to or coextensive with the longitudinal axis 286 of the actuator frame 258. The adjustable piezoelectric mount support 304 may be rotated within the threaded channel 306 with the threaded outer surface 308 of the adjustable piezoelectric mount support 304 engaged with the threaded inner surface 310 of the threaded channel 306. Such relative rotation may be used to position of the first mount surface 296 (which is disposed on a flat distal surface 312 of the adjustable piezoelectric mount support 304 in this embodiment) relative to the second mount surface 300 before, during and after assembly of the piezoelectric element 290 into the piezoelectric element cavity 292.

Such an arrangement may be useful in order to provide a piezoelectric element cavity 292 that is longer than the piezoelectric element 290 for insertion of the piezoelectric element 290 and any desired adhesives etc. Thereafter, the adjustable piezoelectric mount support 304 may be rotated so as to reduce the effective axial length of the piezoelectric element cavity 292 and bring both the first mount surface 296 and second mount surface 300 into contact with corresponding surfaces of the piezoelectric element 290 with a desired amount of preload or clamping type force, if any. The contact force which is applied to the piezoelectric element 290 by the mount surfaces can be adjusted by altering the position of the adjustable piezoelectric mount support 304 within the threaded channel 306 along a central axis of the threaded channel 306 which is parallel to the longitudinal axis 286.

The actuator frame embodiment 258 may also include one or more hinge sections of reduced material cross section of the actuator frame 258 which may have similar features and functions as those of the hinge sections discussed above. For example, a first arm hinge section 314 may be disposed between a frame arm section 316 of the actuator frame 258 and a frame body section 318 of the actuator frame 258 so as to allow a hinged-type rotational displacement between the frame arm section 316 and frame body section 318. The actuator frame embodiment 258 may also include a second arm hinge section 320 which is disposed between the first arm hinge section 314 and the first support element 260. The actuator frame 258 may also include a frame slot 322 which is disposed distally of the first arm hinge section 314. The frame slot 322 includes a gap 324 in the frame material between the frame arm section 316 and the frame body section 318 so as to allow substantially independent relative motion between the frame arm section 316 and frame body section 318.

The hinge sections of the actuator frame embodiment are configured to allow for the relative reciprocating parallel displacement between the first contact surface 262 and the second contact surface 268 by the elastic deformation of the actuator frame 258 material in the hinge sections (and possibly elsewhere in the frame structure to a lesser degree). The first arm hinge section 314 may be formed by a reduced cross section or moment of inertia of material in the frame structure at the first arm hinge section 314. The reduced cross section provides a section in which strain of the frame structure as a result of forces applied to the frame structure by the expansion or contraction of the piezoelectric element 290 may be concentrated. The concentration of strain at the reduced cross section of material may result in a known or predictable movement between the various components of the actuator frame 258 such as the first contact surface 262 and the second contact surface 268. The first arm hinge section 314 only allows for the hinged type rotational displacement of the frame body section 318 with respect to the frame arm section 316, the rotational displacement being centered around the first arm hinge section 314 where a concentration of strain will occur.

The frame body section 318 includes a plurality of hinge sections 326 in a zig-zag portion 328 that are configured to facilitate axial expansion and contraction of the frame body section 318 along the longitudinal axis 286 of the frame body section 318. The body hinge sections 326 may be formed by a reduced cross section of actuator frame 258 material and function as discussed above with respect to the first arm hinge section 314. The body hinge sections 326 may be disposed on the frame structure which extends from the first mount surface 296 to the second mount surface 300. This zig-zag portion 328 of the frame structure of the frame body section 318 may include flexible connector sections 330 disposed between the body hinge sections 326. The body hinge sections 326 allow for the deflection (such as axial extension or contraction) of the frame body section 318 along the longitudinal axis 286 through the elastic deformation of the body hinge sections 326 as well as flexible connector sections 330 which are relatively thin frame elements that extend between body hinge sections 326. In some cases, the axial extension and contraction of the frame body section 318 may include elastic deformation of the body hinge sections 326, the flexible connector sections 330 or such deformation of both the body hinge sections 326 and flexible connector sections 330. Axial stress on the frame body section 318 due to actuation of the piezoelectric element 290 may result in deformation of the flexible connector sections 330. This stress on the flexible connector sections 330 may also result in a concentration of strain at each body hinge section 326. The deflection (such as axial expansion or contraction) of the frame body section 318 along the longitudinal axis 286 is substantially isolated from the frame arm 316 section by the frame slot 322, which allows the frame arm section 316 to remain relatively motionless during the deflection of the frame body section 318.

As discussed above, the torque generated by the reciprocating movement of the contact surfaces on the threaded shaft 270 may result in a torque on the actuator frame 258 about a longitudinal axis of the threaded shaft 270. A frame guide 332, which may have the same or similar features, dimensions and materials of the frame guide 172 discussed above, may be used to counteract this torque on the actuator frame 258. The frame guide 332 may be secured within a frame guide hole 334 of the actuator frame 258 using any suitable method, such as the methods discussed above with regard to the frame guide 172. For example any suitable adhesive or epoxy 333 may be used as is shown in FIG. 8B. The frame guide 332 may be coupled between the optical mount 24 and the actuator frame 258 such that the frame guide 332 effectively eliminates or at least minimizes any rotation of the actuator frame 258 about the threaded shaft 270 with respect to the optical mount 24. The frame guide 332 may also be coupled to the optical mount 24 such that the frame guide 332 allows for the axial displacement (axial expansion and contraction) of the frame body section 318 along the longitudinal axis 286. The configuration of the connections between the frame guide 332, the actuator frame 258, and the slot 63 (see FIG. 4B) of the base plate 61 of the optical mount 24 may be the same as or similar to the configuration of the connections between the frame guide 172, the actuator frame 104, and the slot 63 discussed above for the embodiments shown in FIGS. 6A-6I and FIG. 4B.

For the embodiment shown, the second support element 264 extends distally from the frame body section 318, and the first support element 260 extends distally from the frame arm section 316. Because the second support element 264 is contiguous with the frame body section 318, a deflection of the frame body section 318 along the longitudinal axis 286 results in a motion of the second support element 264 along the longitudinal axis 286. Because the first support element 260 is contiguous with the frame arm section 316 which is substantially isolated from a deflection of the frame body section 318 along the longitudinal axis 286 by the frame gap 324, a deflection of the frame body section 318 along the longitudinal axis 286 may be transmitted as a minimal rotation of the frame arm section 316 by the first arm hinge section 314. The frame arm section 316 may undergo a nominal amount of rotation caused by the deflection of the frame body section 318 along the longitudinal axis 286 which may be transmitted through the first arm hinge section 314. The result of a deflection of the frame body section 318 along the longitudinal axis 286 is a net reciprocating motion of the first support element 260 and the second support element 264, and therefore a net reciprocating motion between the first contact surface 262 and the second contact surface 268. The bias band 272, which connects the first support element 260 to the second support element 264, is also deflected and provides a resilient restoring force to counter separation of the first contact surface 262 and the second contact surface 268 as well as a restoring force which resists this reciprocating motion of the first contact surface 262 and the second contact surface 268.

During a deflection of the bias band 272, the overlap section 284 of the bias band facilitates the flexure of the bias band 272 in the direction of the deflection of the bias band 272. For the embodiment shown, the overlap section 284 of the bias band 272 contains two band hinge sections 336. The band hinge sections 336 include band hinge slots 337 which extend transversely across the bias band 272 in a direction corresponding to a direction from the front exterior surface 259 of the actuator frame 180 to the back exterior surface 261 of the actuator frame 180. A deflection of the bias band 272 results in the concentration of strain at the band hinge sections 336. The concentration of strain at the band hinge section 336 facilitates the deflection of the bias band 272 by reducing the bending moment of the bias band 272 in the direction of the deflection of the bias band 272.

The elastic deformation of the actuator frame 258 from a neutral state to a deflected state is illustrated in FIGS. 8F and 8G. The actuator frame 258 is shown with the piezoelectric element 290 disposed within the piezoelectric element cavity 292, but for purposes of clarity the threaded shaft 270 of the adjustable optical mount 24 is not shown in FIG. 8F or FIG. 8G. If a first electrical driver signal is transmitted to the piezoelectric element 290 from the electronic controller 48 shown in FIG. 1, the piezoelectric element 290 (which is secured to the second mount surface 300) may expand which in turn causes additional separation and displacement between the first mount surface 296 and the second mount surface 300. The displacement of the second mount surface 300 results in the deflection of the frame body section 318 along the longitudinal axis 286 which causes a motion of the second support element 264 along the longitudinal axis 286 while the first support element 260 remains substantially motionless. This results in a relative reciprocating motion between the first contact surface 262 and the second contact surface 268 as is indicated by the dashed lines in FIGS. 8F and 8G. The magnitude of the deflection of the second support element is indicated by dimension 338 in FIG. 8G.

A second electrical driver signal transmitted to the piezoelectric element 290 from the electronic controller 48 may cause the piezoelectric element 290 to return to its neutral state, which results in the frame body section 318 reverting to its neutral state as indicated by the solid lines in FIGS. 8F and 8G. The bias band 272 recovers from its deflected state (indicated by the dashed lines in FIGS. 8F and 8G) and provides a resilient restoring force to the second support element 264 such that the second support element 264 returns to its neutral position as indicated by the solid lines in FIGS. 8F and 8G.

Another embodiment of a piezoelectric actuator 340 which may be used in the adjustable optical mount 24 discussed above as well as in other suitable optical embodiments is shown in FIGS. 9A-9I. The piezoelectric actuator 340 may have similar features, materials and/or dimensions to those of the piezoelectric actuator embodiment 102 discussed above and shown in FIGS. 6A-6I.

Figure 9A:
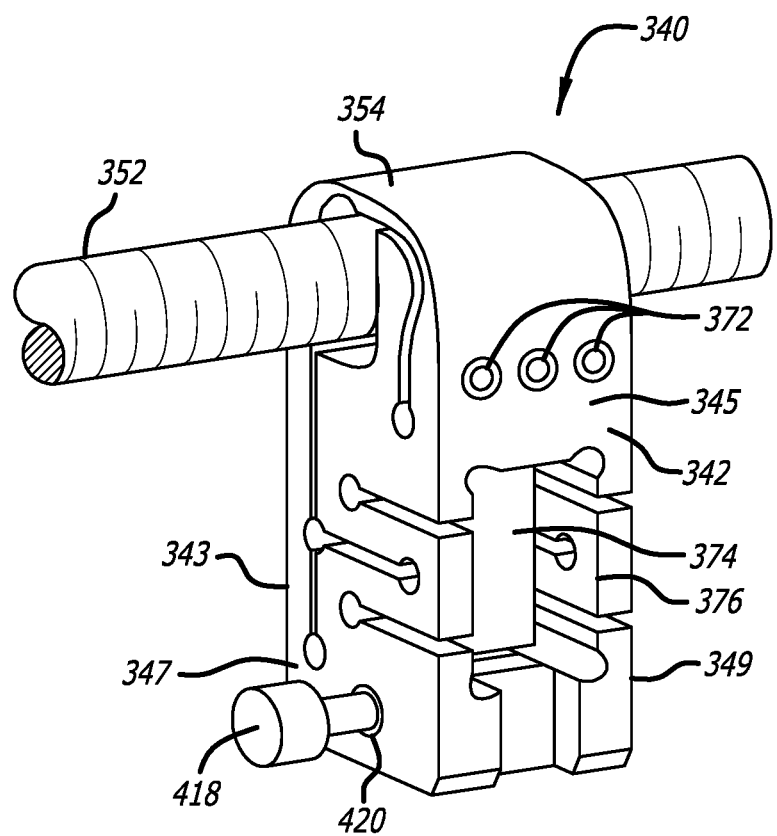
FIG. 9A is a perspective view that depicts a piezoelectric actuator assembly embodiment comprising an actuator frame, an actuator shaft, and a piezoelectric actuator.
Figure 9B:
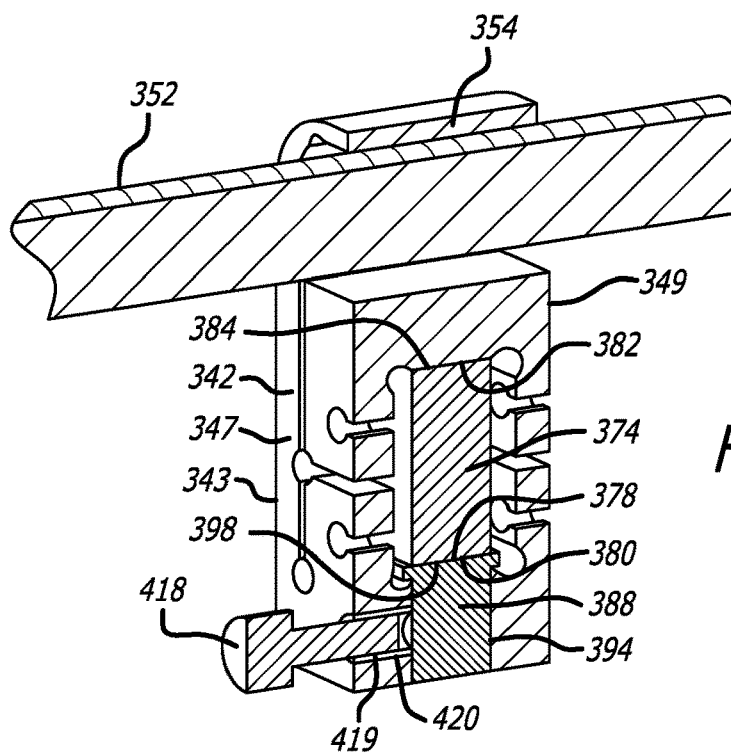
FIG. 9B is a perspective view in section of the piezoelectric actuator assembly of FIG. 9A.
Figure 9C:
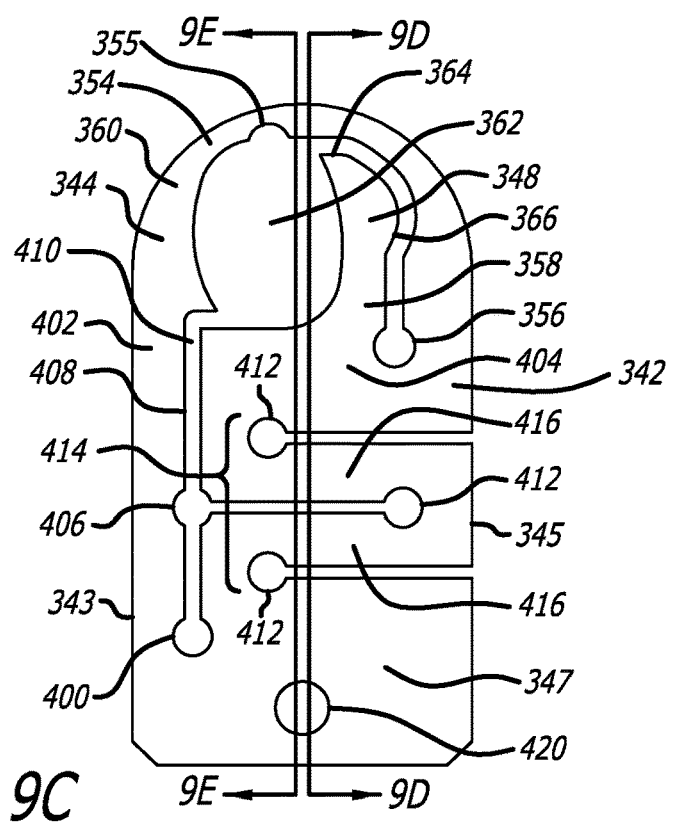
FIG. 9C is an elevation view of an embodiment of an actuator frame showing a first support element, a second support element, a hinge section, and a bias band.
Figure 9D:
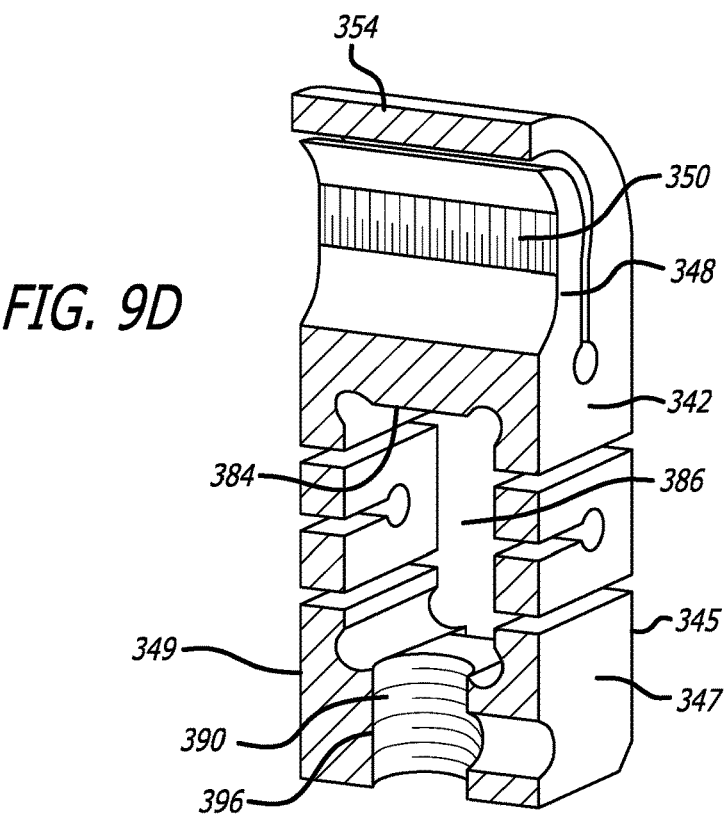
FIG. 9D is a perspective view in section of the actuator frame embodiment of FIG. 9C showing a second contact surface.
Figure 9E:
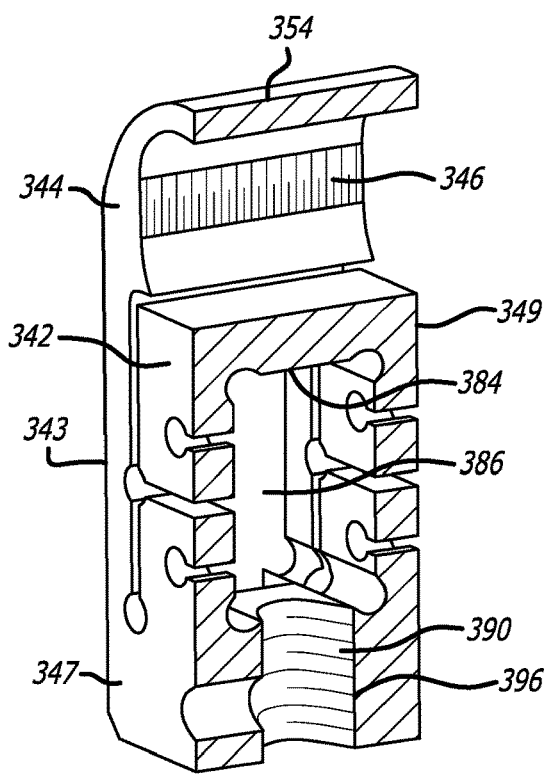
FIG. 9E is a perspective view in section of the actuator frame embodiment of FIG. 9C showing a first contact surface.

The piezoelectric actuator embodiment 340 shown in FIGS. 9A-9I may include an actuator frame 342 which has a monolithic configuration with all of the elements of the actuator frame 342 being formed (such as being cut) from a single piece of continuous uninterrupted material as discussed above. The actuator frame 342 may include first support element 344 having a first contact surface 346 and a second support element 348 having a second contact surface 350. The first contact surface 346 is disposed in a spaced and substantially opposed relation relative to the second contact surface 350. The first contact surface 346 and the second contact surface 350 may be configured to selectively engage a threaded shaft 352 of an optical mount which may be rotationally secured between the first contact surface 346 and the second contact surface 350. The first contact surface 346 and the second contact surface 350 may optionally be configured as threaded surfaces as is shown in FIGS. 9D and 9E in order to effectively engage the threaded shaft 352. A reciprocating motion of the first contact surface 346 and the second contact surface 350 may be used to selectively engage with and rotate the threaded shaft 352.

Some exterior surfaces of the actuator frame 342 may be used as reference surfaces in order to discuss features of and/or dimensions of the actuator frame embodiment 342. In this case, the actuator frame 342 may incorporate a front exterior surface 343 of the actuator frame 342 and a back exterior surface 345 of the actuator frame 342. The front exterior surface 343 of the actuator frame 342 may be disposed in a spaced and substantially opposite relation relative to the back exterior surface 345 of the actuator frame 342 and may also be substantially parallel to the back exterior surface 345. The actuator frame 342 may also incorporate a first lateral exterior surface 347 which is disposed such that it is substantially perpendicular to both the front exterior surface 343 and the back exterior surface 345. The actuator frame 342 may also incorporate a second lateral exterior surface 349 which is disposed in a spaced and substantially opposite relation relative to the first lateral exterior surface 347 and may also be substantially parallel to the first lateral exterior surface 347.

As with the previous embodiments a consistent resilient restoring force between the first contact surface 346 and the second contact surface 350 may be required in some cases in order to allow for the selective engagement of the contact surfaces 346 and 350 with the threaded shaft 352 to provide rotational motion in a desired direction. The actuator frame 342 of the piezoelectric actuator embodiment 340 of FIGS. 9A-9G incorporates an integrally formed bias band portion 354 which may be disposed between and coupled to the first support element 344 and a second band hinge section 356 which is disposed at a proximal section 358 of the second support element 348. The bias band may also include a first band hinge section 355 which is disposed on the bias band 354 between a distal portion 360 of the first support element 344 and a distal portion 364 of the second support element 348. The bias band 354 may be configured to provide a resilient restoring force which will resist the perpendicular displacement of the second contact surface 350 towards or away from a neutral position of the first contact surface 346. The bias band 354 is configured to provide a consistent resilient restorative force between the contact surfaces.

As shown in FIGS. 9A-9I, the bias band 354 extends distally from the distal portion 360 of the first support element 344 around a space 362 which is disposed between the first contact surface 346 and the second contact surface 350. The bias band 354 also extends around the distal portion 364 of the second support element 348 along an outer surface 366 of the second support element 348 which is disposed substantially opposite the second contact surface 350. The bias band 354 terminates at the proximal section 358 of the second support element 348 at the second band hinge section 356 on the outside surface 366 of the second support element 348.

The bias band 354 may also be configured such that the restoring force which it provides to the contact surfaces during a drive cycle can be adjusted with a bias adjust mechanism. One embodiment of a bias adjust mechanism could include one or more adjustable set screws 372 which are disposed in contact between the bias band 354 and another portion of the actuator frame 342, such as the second support element 348 or body section 404 discussed below. A plurality of adjustable set screws 372 are shown in FIG. 9A.

The piezoelectric actuator 340 may also include a piezoelectric element 374 which is configured as a piezoelectric crystal as discussed above. The piezoelectric element 374 is shown disposed within the actuator frame 342 in a piezoelectric element cavity 376 of the actuator frame 342 of FIG. 9B. The piezoelectric element 374 has a first end 378 which is secured to a first mount surface 380 and a second end 382 which is secured to a second mount surface 384 of the actuator frame 342. The space 386 between the first mount surface 380 and second mount surface 384 may serve to define the piezoelectric element cavity 376 in some cases. The piezoelectric actuator 340 may also include an adjustable piezoelectric mount support 388 which is also shown in FIG. 9B. The adjustable piezoelectric mount support 388 may be threadably engaged within a threaded channel 390 of the actuator frame 342. The threaded channel 390 of the actuator frame 342 has a longitudinal axis that is parallel to or coextensive with a longitudinal axis 392 (see FIGS. 9F and 9G) of the actuator frame 342. The adjustable piezoelectric mount support 388 may be rotated within the threaded channel 390 with a threaded outer surface 394 of the adjustable piezoelectric mount support 388 engaged with the threaded inner surface 396 of the threaded channel 390. Such relative rotation may be used to position of the first mount surface (which is disposed on a flat distal surface 398 of the adjustable piezoelectric mount support 388 in this embodiment) relative to the second mount surface 384 before, during and after assembly of the piezoelectric element 374 into the piezoelectric element cavity 376. Such an arrangement may be useful in order to provide a piezoelectric element cavity 376 that is longer than the piezoelectric element 374 for insertion of the piezoelectric element 374 and any desired adhesives etc. Thereafter, the adjustable piezoelectric mount support 388 may be rotated so as to reduce the effective axial length of the piezoelectric element cavity 376 and bring both the first mount surface 380 and second mount surface 384 into contact with corresponding surfaces of the piezoelectric element 374 with a desired amount of preload or clamping type force, if any. The contact force which is applied to the piezoelectric element 374 by the mount surfaces can be adjusted by altering the position of the adjustable piezoelectric mount support 388 within the threaded channel 390 substantially parallel to the longitudinal axis 392.

The actuator frame embodiment 342 may also include one or more hinge sections of reduced material cross section of the actuator frame 342 as discussed above. For example, a first arm hinge section 400 may be disposed between a frame arm section 402 of the actuator frame 342 and a frame body section 404 of the actuator frame 342 so as to allow a hinged-type rotational displacement between the frame arm section 402 and frame body section 404. The actuator frame embodiment 342 may also include a second arm hinge section 406 which is disposed between the first arm hinge section 400 and the first support element 344. The actuator frame 342 may also include a frame slot 408 which is disposed distally of the first arm hinge section 400. The frame slot 408 includes a gap 410 in the frame material between the frame arm section 402 and the frame body section 404 so as to allow substantially independent relative motion between the frame arm section 402 and frame body section 404.

The hinge sections of the actuator frame embodiment are configured to allow for the relative reciprocating parallel displacement between the first contact surface 346 and the second contact surface 350 by the elastic deformation of the actuator frame 342 material in the hinge sections (and possibly elsewhere in the frame structure to a lesser degree). The first arm hinge section 400 may be formed by a reduced cross section or moment of inertia of material in the frame structure at the first arm hinge section 400. The reduced cross section provides a section in which strain of the frame structure as a result of forces applied to the frame structure by the expansion or contraction of the piezoelectric element 374 may be concentrated. The concentration of strain at the reduced cross section of material may result in a known or predictable movement between the various components of the actuator frame 342 such as the first contact surface 346 and the second contact surface 350. The first arm hinge section 400 only allows for the hinged type rotational displacement of the frame body section 404 with respect to the frame arm section 402, the rotational displacement being centered around the first arm hinge section 400 where a concentration of strain will occur.

The frame body section 404 includes a plurality of body hinge sections 412 in a zig-zag portion 414 that are configured to facilitate axial expansion and contraction of the frame body section 404 along the longitudinal axis 392 of the frame body section 404. The body hinge sections 412 may be formed by a reduced cross section of actuator frame 342 material and function as discussed above with respect to the first arm hinge section 400. The body hinge sections 412 may be disposed on the frame structure which extends from the first mount surface 380 to the second mount surface 384.

This zig-zag portion 414 of the frame structure of the frame body section 404 may include flexible connector sections 416 disposed between the body hinge sections 412. The body hinge sections 412 allow for the deflection (such as axial extension or contraction) of the frame body section 404 along the longitudinal axis 392 through the elastic deformation of the body hinge sections 412 as well as flexible connector sections 416 which are relatively thin frame elements that extend between body hinge sections 412. In some cases, the axial extension and contraction of the frame body section 404 may include elastic deformation of the body hinge sections 412, the flexible connector sections 416 or such deformation of both the body hinge sections 412 and flexible connector sections 416. Axial stress on the frame body section 404 due to actuation of the piezoelectric element 374 may result in deformation of the flexible connector sections 416. This stress on the flexible connector section 416 may also result in a concentration of strain at each body hinge section 412. The deflection (such as axial expansion or contraction) of the frame body section 404 along the longitudinal axis 392 is substantially isolated from the frame arm section 402 by the frame slot 408, which allows the frame arm section 402 to remain relatively motionless during the deflection of the frame body section 404.

As discussed above, the torque generated by the reciprocating movement of the contact surfaces on the threaded shaft 352 may result in a torque on the actuator frame 342 about a longitudinal axis of the threaded shaft 352. A frame guide 418, which may have the same or similar features, dimensions and materials of the frame guide 172 discussed above, may be used to counteract this torque on the actuator frame 342. The frame guide 418 may be secured within a frame guide hole 420 of the actuator frame 342 using any suitable method, such as the methods discussed above with regard to the frame guide 172. For example any suitable adhesive or epoxy 419 may be used as is shown in FIG. 9B. The frame guide 418 may be coupled between the optical mount 24 and the actuator frame 342 such that the frame guide 418 effectively eliminates or at least minimizes any rotation of the actuator frame 342 about the threaded shaft 352 with respect to the optical mount 24. The frame guide 418 may also be coupled to the optical mount 24 such that the frame guide 418 allows for the axial displacement (axial expansion and contraction) of the frame body section 404 along the longitudinal axis 392. The configuration of the connections between the frame guide 418, the actuator frame 342, and the slot 63 (see FIG. 4B) of the base plate 61 of the optical mount 24 may be the same as or similar to the configuration of the connections between the frame guide 172, the actuator frame 104, and the slot 63 discussed above for the embodiments shown in FIGS. 6A-6I and FIG. 4B.

For the embodiment shown, the second support element 348 extends distally from the frame body section 404, and the first support element 344 extends distally from the frame arm section 402. Because the second support element 348 is contiguous with the frame body section 404, a deflection of the frame body section 404 along the longitudinal axis 392 results in a motion of the second support element 348 along the longitudinal axis 392. Because the first support element 344 is contiguous with the frame arm section 402 which is substantially isolated from a deflection of the frame body section 404 along the longitudinal axis 392 by the frame gap 410, a deflection of the frame body section 404 along the longitudinal axis 392 may be transmitted as a minimal rotation of the frame arm section 402 by the first arm hinge section 406. The frame arm section 402 may undergo a nominal amount of rotation caused by the deflection of the frame body section 404 along the longitudinal axis 392 which may be transmitted through the first arm hinge section 400. The result of a deflection of the frame body section 404 along the longitudinal axis 392 is a net reciprocating motion of the first support element 344 and the second support element 348, and therefore a net reciprocating motion between the first contact surface 346 and the second contact surface 350. The bias band 354, which connects the first support element 344 to the second band hinge section 356, is also deflected and provides a resilient restoring force to counter separation of the first contact surface 346 and the second contact surface 350 as well as a restoring force which resists this reciprocating motion of the first contact surface 346 and the second contact surface 350.

During a deflection of the bias band 354, the first band hinge section 355 and the second band hinge section 356 facilitate the flexure of the bias band 354 in the direction of the deflection of the bias band 354. For the embodiment shown, the second band hinge section 356 of the bias band 354 is disposed on an outer surface 366 of the second support element 348, and the first band hinge section 355 is disposed on an inner surface of the bias band 354 which is adjacent to the space 362 disposed between the first support element 344 and the second support element 348. A deflection of the bias band 354 results in a concentration of strain at the first band hinge section 355 and the second band hinge section 356. The concentration of strain at the first band hinge section 355 and the second band hinge section 356 facilitates the deflection of the bias band 354 by reducing the bending moment of the bias band 354 in the direction of the deflection of the bias band 354.

Figure 9F:
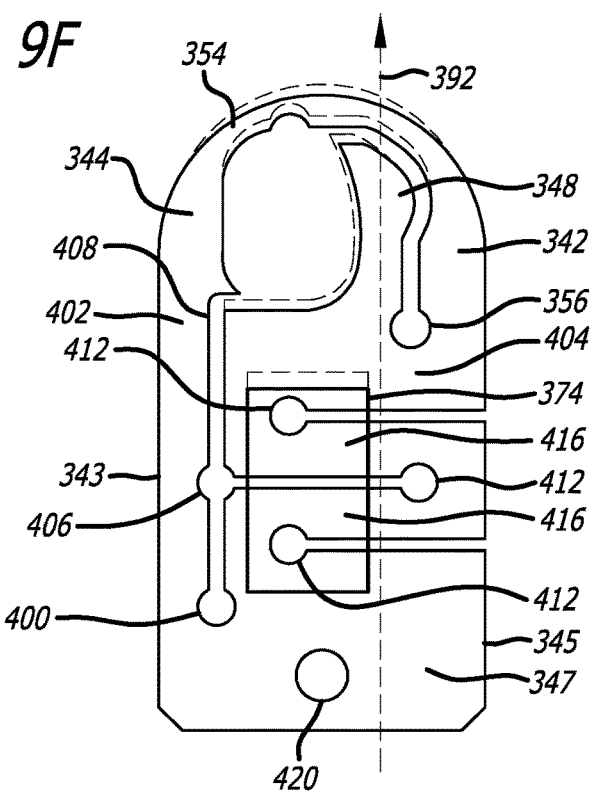
FIG. 9F is an elevation view of the piezoelectric actuator and the actuator frame both of FIG. 9A, showing the piezoelectric actuator in a neutral state and the actuator frame in a neutral state.
Figure 9G:
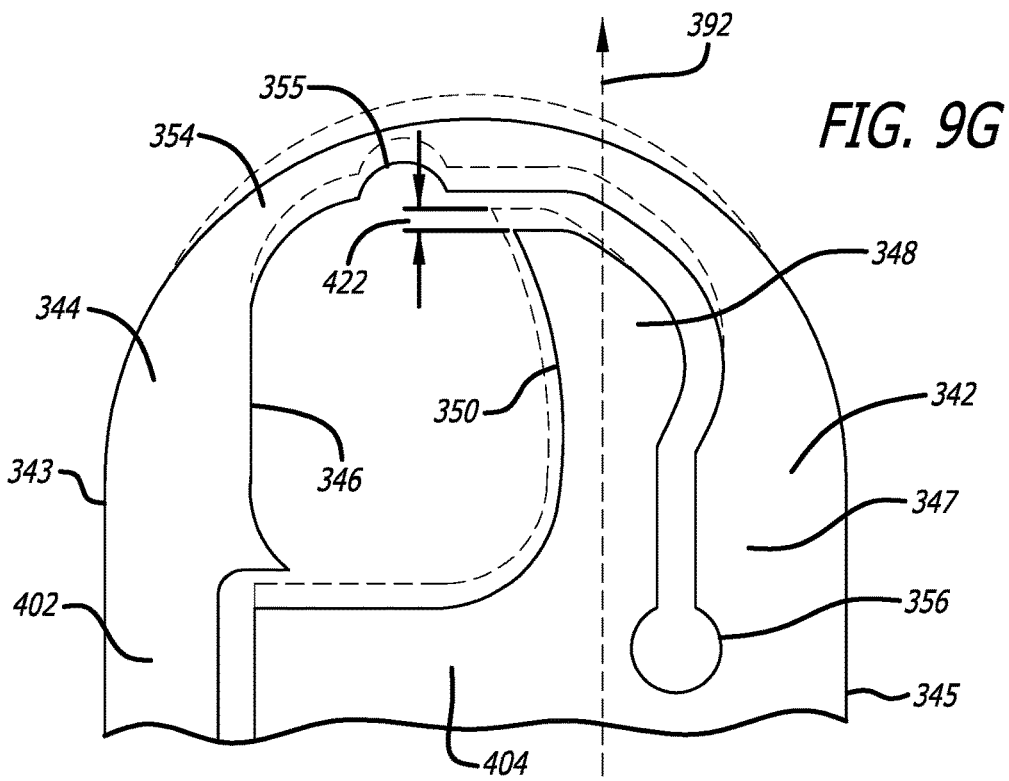
FIG. 9G is an elevation view of the piezoelectric actuator and the actuator frame both of FIG. 9F, showing the piezoelectric actuator in an elongated state and the actuator frame in a deformed state.
Figure 9H:
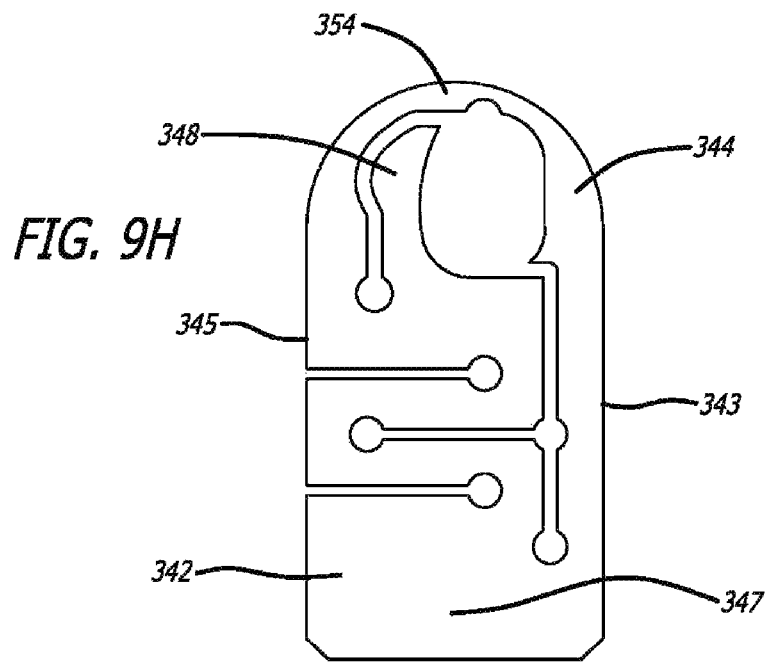
FIG. 9H is an elevation view of the actuator frame of FIG. 9A.
Figure 9I:
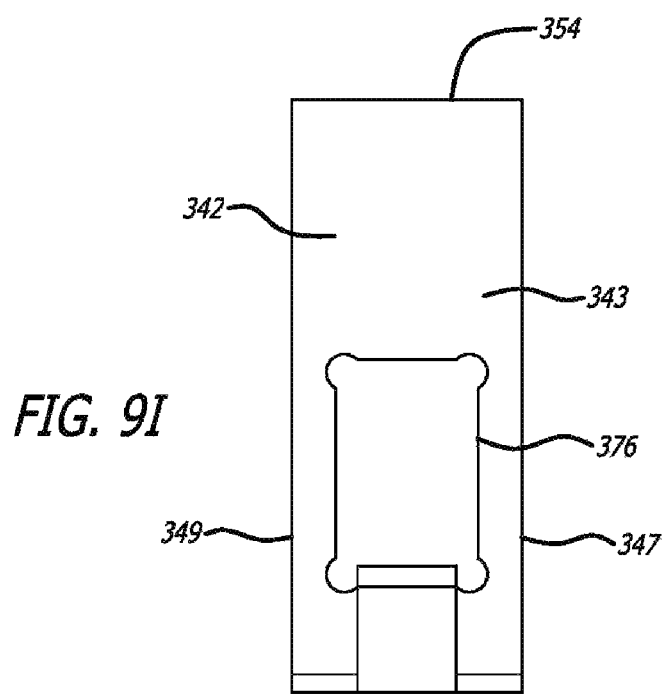
FIG. 9I is an elevation view of the actuator frame of FIG. 9A.

The elastic deformation of the actuator frame 342 from a neutral state to a deflected state is illustrated in FIGS. 9F and 9G. The actuator frame 342 is shown with the piezoelectric element 374 disposed within the piezoelectric element cavity 376, but for purposes of clarity the threaded shaft 352 of the adjustable optical mount 24 is not shown in FIG. 9F or FIG. 9G. If a first electrical driver signal is transmitted to the piezoelectric element 374 from the electronic controller 48 shown in FIG. 1, the piezoelectric element 374 (which is secured to the second mount surface 384) may expand which in turn causes additional separation and displacement between the first mount surface 380 and the second mount surface 384. The displacement of the second mount surface 384 results in the deflection of the frame body section 404 along the longitudinal axis 392 which causes a motion of the second support element 348 along the longitudinal axis 392 while the first support element 344 remains substantially motionless. This results in a relative reciprocating motion between the first contact surface 346 and the second contact surface 350 as is indicated by the dashed lines in FIGS. 9F and 9G. The magnitude of the deflection of the second support element is indicated by dimension 422 in FIG. 9G.

A second electrical driver signal transmitted to the piezoelectric element 374 from the electronic controller 48 may cause the piezoelectric element 374 to return to its neutral state, which results in the frame body section 404 reverting to its neutral state as indicated by the solid lines in FIGS. 9F and 9G. The bias band 354 recovers from its deflected state (indicated by the dashed lines in FIGS. 9F and 9G) and provides a resilient restoring force to the second support element 348 such that the second support element 348 returns to its neutral position as indicated by the solid lines in FIGS. 9F and 9G.

Another embodiment of a piezoelectric actuator 424 which may be used in the adjustable optical mount 24 discussed above as well as in other suitable optical embodiments is shown in FIGS. 10A-10I. The piezoelectric actuator 424 may have similar features, materials and/or dimensions to those of the piezoelectric actuator embodiment 102 discussed above and shown in FIGS. 6A-6I.

Figure 10A:
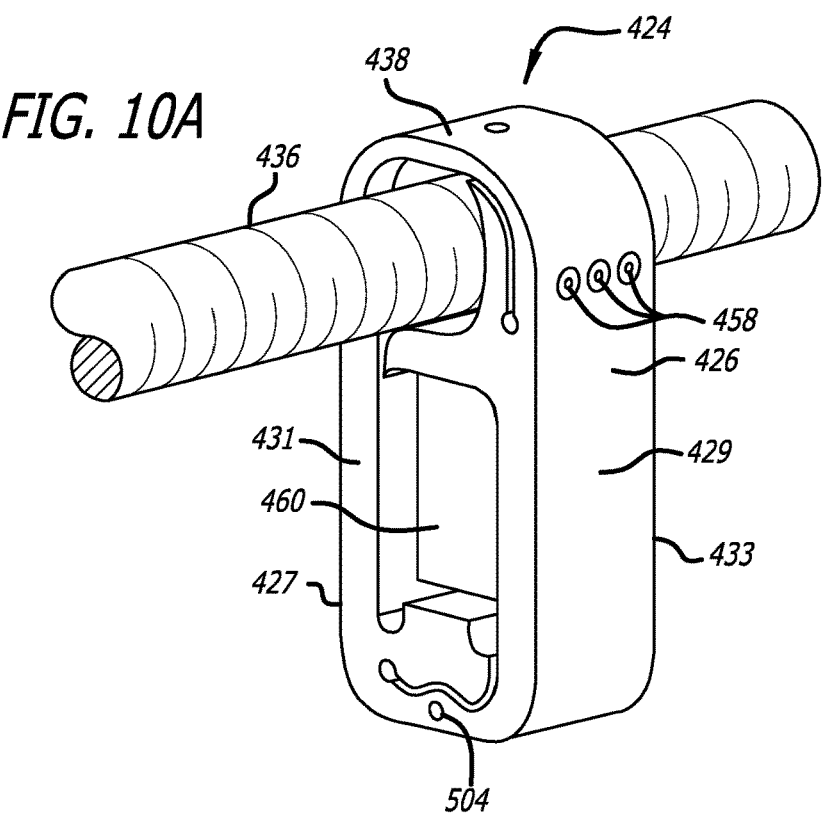
FIG. 10A is a perspective view that depicts a piezoelectric actuator assembly embodiment comprising an actuator frame, an actuator shaft, and a piezoelectric actuator.
Figure 10B:
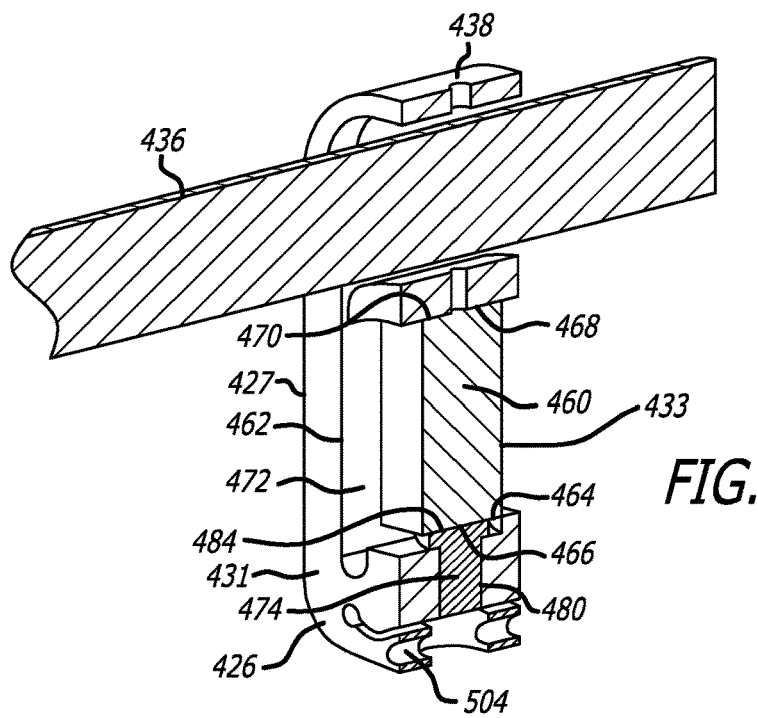
FIG. 10B is a perspective view in section of the piezoelectric actuator assembly of FIG. 10A.
Figure 10C:
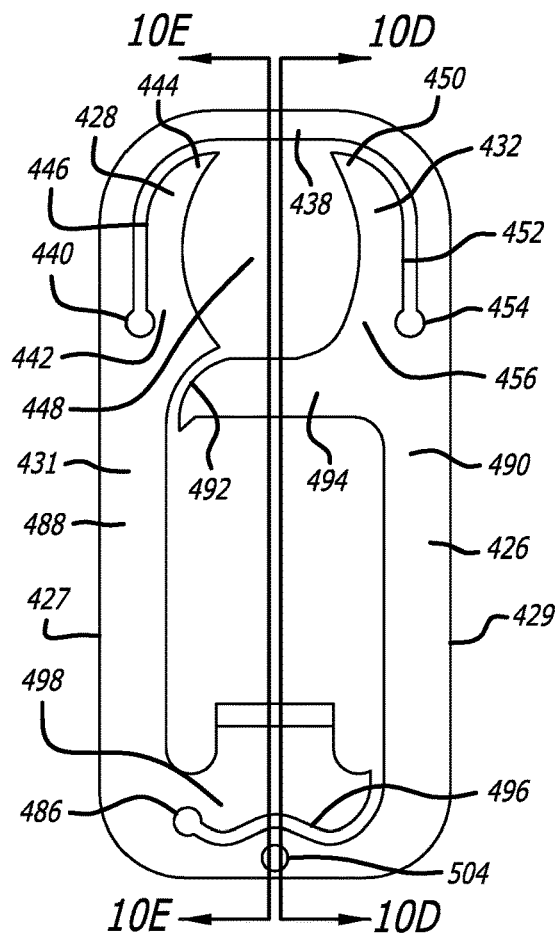
FIG. 10C is an elevation view of an embodiment of an actuator frame showing a first support element, a second support element, a hinge section, and a bias band.
Figure 10D:
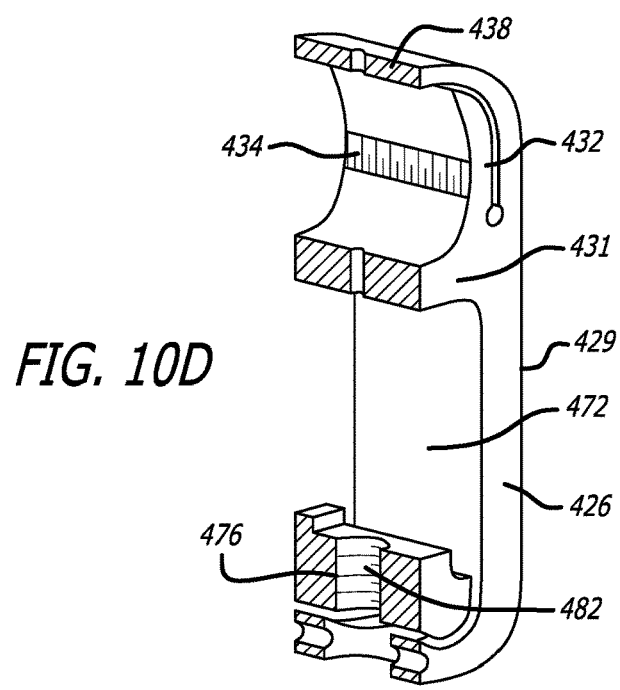
FIG. 10D is a perspective view in section of the actuator frame embodiment of FIG. 10C showing a second contact surface.
Figure 10E:
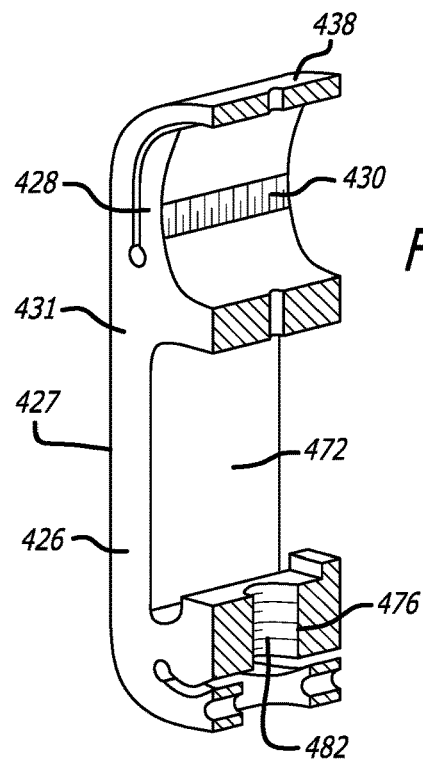
FIG. 10E is a perspective view in section of the actuator frame embodiment of FIG. 10C showing a first contact surface.

The piezoelectric actuator embodiment 424 shown in FIGS. 10A-10I may include an actuator frame 426 which has a monolithic configuration with all of the elements of the actuator frame 426 being formed (such as being cut) from a single piece of continuous uninterrupted material. The actuator frame 426 may include first support element 428 having a first contact surface 430 and a second support element 432 having a second contact surface 434. The first contact surface 430 is disposed in a spaced and substantially opposed relation relative to the second contact surface 434. The first contact surface 430 and the second contact surface 434 may be configured to selectively engage a threaded shaft 436 of an optical mount which may be rotationally secured between the first contact surface 430 and the second contact surface 434. The first contact surface 430 and the second contact surface 434 may optionally be configured as threaded surfaces as is shown in FIGS. 10D and 10E in order to effectively engage the threaded shaft 436. A reciprocating motion of the first contact surface 430 and the second contact surface 434 may be used to selectively engage with and rotate the threaded shaft 436.

Some exterior surfaces of the actuator frame 426 may be used as reference surfaces in order to discuss features of and/or dimensions of the actuator frame embodiment 426. In this case, the actuator frame 426 may incorporate a front exterior surface 427 of the actuator frame 426 and a back exterior surface 429 of the actuator frame 426. The front exterior surface 427 of the actuator frame 426 may be disposed in a spaced and substantially opposite relation relative to the back exterior surface 429 of the actuator frame 426 and may be substantially parallel to the back exterior surface 429. The actuator frame 426 may also incorporate a first lateral exterior surface 431 which is disposed such that it is substantially perpendicular to both the front exterior surface 427 and the back exterior surface 429. The actuator frame 426 may also incorporate a second lateral exterior surface 433 which is disposed in a spaced and substantially opposite relation relative to the first lateral exterior surface 431 and which may be substantially parallel to the first lateral exterior surface 431.

As with the previous embodiments a consistent restoring force between the first contact surface 430 and the second contact surface 434 may be required in some cases in order to allow for the selective engagement of the contact surfaces with the threaded shaft 436 to provide rotational motion in a desired direction. The actuator frame 426 of the piezoelectric actuator embodiment 424 of FIGS. 10A-10G incorporates an integral bias band portion 438 which may be disposed between the first support element 428 and the second support element 432 and which may be configured to provide restoring force which will resist the perpendicular displacement of the second contact surface 434 towards or away from a neutral position of the first contact surface 430. The bias band 438 is configured to provide a consistent resilient restorative force between the contact surfaces 430 and 434.

As shown in FIGS. 10A-10I, the bias band 438 extends distally from a first band hinge 440 disposed on a proximal section 442 of the first support element 428 around a distal portion 444 of the first support element 428 and along an outer surface 446 of the first support element 428 which is disposed substantially opposite the first contact surface 430.

The bias band also extends around a space 448 which is disposed between the first contact surface 430 and the second contact surface 434. The bias band 438 also extends around a distal portion 450 of the second support element and along an outer surface of the second support element 452 which is disposed substantially opposite the second contact surface 434. The bias band 438 terminates at a second band hinge section 454 disposed on a proximal section 456 of the second support element 432.

The bias band 438 may also be configured such that the restoring force which it provides to the contact surfaces during a drive cycle can be adjusted with a bias adjust mechanism. One embodiment of a bias adjust mechanism could include one or more adjustable set screws 458 which are disposed in contact between the bias band 438 and another portion of the actuator frame 426 such as the second support element 432 or frame body section 490 discussed below. For such an arrangement, or any similar arrangement discussed above, the set screws 458 can be in threaded engagement with a threaded bore of one portion of the actuator frame 426 and have a tip of the screw or screws 458 in contact with another portion of the actuator frame 426. In this way, by adjusting the screw or screws 458 the nominal separation or preload between the two portions of the actuator frame can be adjusted. For the embodiment 426 shown in FIG. 10A, the screws 458 are threadedly engaged in respective threaded bores of the bias band 438 with tips of the screws 458 in contact with the outside surface of the second support element 432. In this embodiment, the screws 458 can be used to adjust the nominal separation and/or preload between the second support element 432 and the bias band 438 which can in turn adjust the nominal force exerted by the contact surfaces 430 and 432 against a threaded shaft 436. A plurality of adjustable set screws 458 are shown in FIG. 10A.

The piezoelectric actuator 424 may also include a piezoelectric element 460 which is configured as a piezoelectric crystal as discussed above. The piezoelectric element 460 is shown disposed within the actuator frame 426 in a piezoelectric element cavity 462 of the actuator frame 426 in FIG. 10B. The piezoelectric element 460 has a first end 464 which is secured to a first mount surface 466 and a second end 468 which is secured to a second mount surface 470 of the actuator frame 426. The space 472 between the first mount surface 466 and second mount surface 470 may serve to define the piezoelectric element cavity 462 in some cases. The piezoelectric actuator 424 may also include an adjustable piezoelectric mount support 474 which is also shown in FIG. 10B. The adjustable piezoelectric mount support 474 may be threadably engaged within a threaded channel 476 of the actuator frame 426. The threaded channel 476 of the actuator frame 426 has a longitudinal axis that is parallel to or coextensive with a longitudinal axis 478 (see FIGS. 10F and 10G) of the actuator frame 426. The adjustable piezoelectric mount support 474 may be rotated within the threaded channel 476 with a threaded outer surface 480 of the adjustable piezoelectric mount support 474 engaged with a threaded inner surface 482 of the threaded channel 476. Such relative rotation may be used to position of the first mount surface 466 (which is disposed on a flat distal surface 484 of the adjustable piezoelectric mount support 474 in this embodiment) relative to the second mount surface 470 before, during and after assembly of the piezoelectric element 460 into the piezoelectric element cavity 462. Such an arrangement may be useful in order to provide a piezoelectric element cavity 462 that is longer than the piezoelectric element 460 for insertion of the piezoelectric element 460 and any desired adhesives etc. Thereafter, the adjustable piezoelectric mount support 474 may be rotated so as to reduce the effective axial length of the piezoelectric element cavity 462 and bring both the first mount surface 466 and second mount surface 470 into contact with corresponding surfaces of the piezoelectric element 460 with a desired amount of preload or clamping type force, if any. The contact force which is applied to the piezoelectric element 460 by the mount surfaces can be adjusted by altering the position of the adjustable piezoelectric mount support 474 within the threaded channel 476 substantially parallel to the longitudinal axis 478.

The actuator frame embodiment 426 may also include one or more hinge sections of reduced material cross section of the actuator frame 426. For example, an arm hinge section 486 may be disposed between a frame arm section 488 of the actuator frame 426 and a frame body section 490 of the actuator frame 426 so as to allow a hinged-type rotational displacement between the frame arm section 488 and frame body section 490. The actuator frame 426 may also include one or more frame slots. For example a first frame slot 492 may be disposed between a proximal section 442 of the first support element 428 and a central portion 494 of the frame body section 490. A second frame slot 496 may be disposed along a proximal section 498 of the actuator frame 426. Each frame slot includes a gap in the frame material between the frame arm section 488 and the frame body section 490 so as to allow substantially independent relative motion between the frame arm section 488 and frame body section 490.

The arm hinge section 486 of the actuator frame embodiment 426 is configured to allow for the relative reciprocating parallel displacement between the first contact surface 430 and the second contact surface 434 by the elastic deformation of the actuator frame 426 material in the arm hinge section 486. The arm hinge section 486 may be formed by a reduced cross section or moment of inertia of material in the frame structure at the arm hinge section 486. The reduced cross section provides a section in which strain of the frame structure as a result of forces applied to the frame structure by the expansion or contraction of the piezoelectric element 460 may be concentrated. The concentration of strain at the reduced cross section of material may result in a known or predictable movement between the various components of the actuator frame 426 such as the first contact surface 430 and the second contact surface 434. The arm hinge section 486 only allows for the hinged type rotational displacement of the frame body section 490 with respect to the frame arm section 488, the rotational displacement being centered around the arm hinge section 486 where a concentration of strain will occur. The deflection (such as axial expansion or contraction) of the frame body section 490 along the longitudinal axis 478 is substantially isolated from the frame arm section 488 by the first frame slot 492 and the second frame slot 496, which allow the frame arm section 488 to remain relatively motionless during the deflection of the frame body section 490.

A frame guide hole 504 may be disposed within the actuator frame 426 as shown in FIG. 10A. The frame guide hole 504 may be coupled to the optical mount 24 using a pin (not shown) such that the coupling between the actuator frame 426 and the optical mount 24 using such a pin effectively eliminates or at least minimizes rotation of the actuator frame 426 about the threaded shaft 436 with respect to the optical mount 24. This coupling arrangement between the actuator frame 426 and optical mount 24 may also be configured using a pin such that axial displacement (axial expansion and contraction) of the frame body section 490 along the longitudinal axis 478 is permitted. This coupling arrangement may also be the same as or similar to the configuration of the connections between the frame guide 172, the actuator frame 104, and the optical mount 24 discussed above for the embodiments shown in FIGS. 6A-6I and in FIG. 4B.

For the embodiment shown, the second support element 432 extends distally from the frame body section 490, and the first support element 428 extends distally from the frame arm section 488. Because the second support element 432 is contiguous with the frame body section 490, a deflection of the frame body section 490 along the longitudinal axis 478 results in a motion of the second support element 432 along the longitudinal axis 478. Because the first support element 428 is contiguous with the frame arm section 488 which is substantially isolated from a deflection of the frame body section 490 along the longitudinal axis 478 by the frame slots, a deflection of the frame body section 490 along the longitudinal axis 478 may be transmitted as a minimal rotation of the frame arm section 488 by the arm hinge section 486. The frame arm section 488 may undergo a nominal amount of rotation caused by the deflection of the frame body section 490 along the longitudinal axis 478 which may be transmitted through the arm hinge section 486. The result of a deflection of the frame body section 490 along the longitudinal axis 478 is a net reciprocating motion of the first support element 428 and the second support element 432, and therefore a net reciprocating motion between the first contact surface 430 the second contact surface 434. The bias band 438, which connects the first band hinge section 440 to the second band hinge section 454, is also deflected and provides a restoring force to counter separation of the first contact surface 430 and the second contact surface 434 as well as a restoring force which resists this reciprocating motion of the first contact surface 430 and the second contact surface 434.

During a deflection of the bias band 438, the first band hinge section 440 and the second band hinge section 454 facilitate the flexure and elastic deformation of the bias band 438 in the direction of the deflection of the bias band 438. The first band hinge section 440 is disposed at a proximal section 442 of the first support element 428, and the second band hinge section 454 is disposed at a proximal section 456 of the second support element 432. A deflection of the bias band 438 results in the bias band 438 elastically deforming thereby resulting in strain at the band hinge sections. The reduced thickness configuration of the band hinge sections results in a concentration of strain in the band hinge sections. The concentration of strain at the band hinge sections facilitates the deflection of the bias band 438 by reducing the bending moment of the bias band 438 in the direction of the deflection of the bias band 438.

Figure 10F:
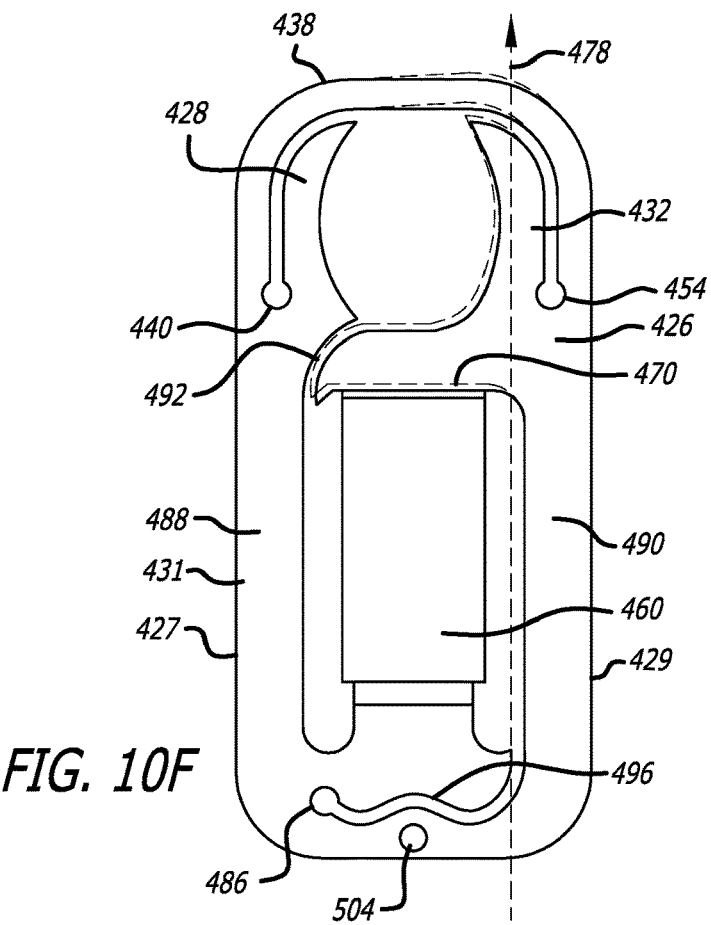
FIG. 10F is an elevation view of the piezoelectric actuator and the actuator frame both of FIG. 10A, showing the piezoelectric actuator in a neutral state and the actuator frame in a neutral state.

The elastic deformation of the actuator frame 426 from a neutral state to a deflected state is illustrated in FIGS. 10F and 10G. The actuator frame 426 is shown with the piezoelectric element 460 disposed within the piezoelectric element cavity 462, but for purposes of clarity the threaded shaft 436 of the adjustable optical mount 24 is not shown in FIG. 10F or FIG. 10G. If a first electrical driver signal is transmitted to the piezoelectric element 460 from the electronic controller 48 shown in FIG. 1, the piezoelectric element 460 (which is secured to the second mount surface 470) may expand which in turn causes additional separation and displacement between the first mount surface 466 and the second mount surface 470. The displacement of the second mount surface 470 results in the deflection of the frame body section 490 along the longitudinal axis 478 which causes a motion of the second support element 432 along the longitudinal axis 478 while the first support element 428 remains substantially motionless. This results in a relative reciprocating motion between the first contact surface 430 and the second contact surface 434 as is indicated by the dashed lines in FIGS. 10F and 10G. The magnitude of the deflection of the second support element is indicated by dimension 506 in FIG. 10G.

A second electrical driver signal transmitted to the piezoelectric element 460 from the electronic controller 48 may cause the piezoelectric element 460 to return to its neutral state, which results in the frame body section 490 reverting to its neutral state as indicated by the solid lines in FIGS. 10F and 10G. The bias band 438 recovers from its deflected state (indicated by the dashed lines in FIGS. 10F and 10G) and provides a restoring force to the second support element 432 such that the second support element 432 returns to its neutral position as indicated by the solid lines in FIGS. 10F and 10G.

With regard to the above detailed description, like reference numerals used therein may refer to like elements that may have the same or similar dimensions, materials and configurations. While particular forms of embodiments have been illustrated and described, it will be apparent that various modifications can be made without departing from the spirit and scope of the embodiments discussed. Accordingly, it is not intended that the invention be limited by the forgoing detailed description.

The entirety of each patent, patent application, publication and document referenced herein is hereby incorporated by reference. Citation of the above patents, patent applications, publications and documents is not an admission that any of the foregoing is pertinent prior art, nor does it constitute any admission as to the contents or date of these documents.

Modifications may be made to the foregoing embodiments without departing from the basic aspects of the technology. Although the technology may have been described in substantial detail with reference to one or more specific embodiments, changes may be made to the embodiments specifically disclosed in this application, yet these modifications and improvements are within the scope and spirit of the technology. The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" may refer to one of or a plurality of the elements it modifies (e.g., "a reagent" can mean one or more reagents) unless it is contextually clear either one of the elements or more than one of the elements is described. Although the present technology has been specifically disclosed by representative embodiments and optional features, modification and variation of the concepts herein disclosed may be made, and such modifications and variations may be considered within the scope of this technology.

Certain embodiments of the technology are set forth in the claim(s) that follow(s).

What is claimed is:

1. A method of manufacturing a monolithic actuator frame for a piezoelectric actuator, comprising cutting an actuator frame from a piece of continuous high strength material, the cut actuator frame including (i) a monolithic configuration with all elements of the actuator frame being formed from a single piece of continuous uninterrupted material, (ii) a first support element including a first contact surface, (iii) a second support element including a second contact surface, the second contact surface being disposed in a spaced and opposed relation relative to the first contact surface, (iv) a bias band which extends distally from a distal portion of the first support element, which is disposed between the first support element and the second support element and which is configured to provide a resilient restoring force that resists perpendicular displacement of the first contact surface away from the second contact surface, and (v) a piezoelectric element cavity disposed between a first mount surface of the actuator frame and a second mount surface of the actuator frame.

2. The method of claim 1 wherein the piece of continuous high strength material comprises stainless steel and cutting the actuator frame from the piece of continuous high strength material comprises cutting the stainless steel.

3. The method of claim 1 wherein cutting the actuator frame comprises cutting the piece of continuous high strength material by an EDM process.

4. The method of claim 1 wherein cutting the actuator frame comprises cutting the piece of continuous high strength material by a laser machining process.

5. The method of claim 1 wherein cutting the actuator frame comprises cutting the piece of continuous high strength material by a water jet machining process.

6. The method of claim 1 wherein cutting the actuator frame comprises cutting the piece of continuous high strength material by a CNC machining process.

* * * * *